US010523277B2

(12) United States Patent
Miyabayashi et al.

(10) Patent No.: US 10,523,277 B2
(45) Date of Patent: *Dec. 31, 2019

(54) POWER TRANSMISSION DEVICE, POWER TRANSMISSION METHOD, AND POWER TRANSMISSION SYSTEM

(71) Applicant: SONY CORPORATION, Tokyo (JP)

(72) Inventors: Naoki Miyabayashi, Tokyo (JP); Yasuharu Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,707

(22) Filed: Apr. 17, 2018

(65) Prior Publication Data

US 2018/0241437 A1    Aug. 23, 2018

Related U.S. Application Data

(63) Continuation of application No. 15/225,277, filed on Aug. 1, 2016, now Pat. No. 10,003,385, which is a
(Continued)

(30) Foreign Application Priority Data

Feb. 21, 2011  (JP) ................................. 2011-035046

(51) Int. Cl.
*H04B 5/00*    (2006.01)
*H02J 50/12*   (2016.01)
(Continued)

(52) U.S. Cl.
CPC ............ *H04B 5/0037* (2013.01); *H02J 5/005* (2013.01); *H02J 7/025* (2013.01); *H02J 50/05* (2016.02);
(Continued)

(58) Field of Classification Search
CPC .... H02J 17/00; H02J 5/005; H02J 2007/0001; H02J 7/0008; H02J 50/05; H02J 50/12;
(Continued)

(56) References Cited

U.S. PATENT DOCUMENTS 9,054,746 B2    6/2015  Miyabayashi et al.
2005/0127869 A1 6/2005  Calhoon et al.
(Continued)

FOREIGN PATENT DOCUMENTS

CN    102217163 A    10/2011
EP    2359454 A1     8/2011
(Continued)

OTHER PUBLICATIONS

Office Action of JP Patent Application No. 2015-034751, dated Aug. 2, 2016, 7 pages.
(Continued)

*Primary Examiner* — Yong Hang Jiang
(74) *Attorney, Agent, or Firm* — Chip Law Group

(57) ABSTRACT

A power transmission device includes a communication unit that transmits a power capability information transmission request via a communication channel and receives power capability information in response to the power capability information transmission request. The power transmission device also includes a processing unit that sets a parameter based on the power capability information. Further, the power transmission device includes a power transmission unit that wirelessly transmits power using the parameter. The communication unit transmits the power capability information transmission request before the power transmission unit wirelessly transmits the power.

18 Claims, 32 Drawing Sheets

Related U.S. Application Data continuation of application No. 13/399,660, filed on Feb. 17, 2012, now Pat. No. 9,461,712.

(51) Int. Cl.
| | |
|---|---|
| *H02J 50/80* | (2016.01) |
| *H02J 7/02* | (2016.01) |
| *H02J 50/90* | (2016.01) |
| *H04W 52/28* | (2009.01) |
| *H02J 50/40* | (2016.01) |
| *H02J 5/00* | (2016.01) |
| *H02J 50/05* | (2016.01) |

(52) U.S. Cl.
CPC .............. *H02J 50/12* (2016.02); *H02J 50/40* (2016.02); *H02J 50/80* (2016.02); *H02J 50/90* (2016.02); *H04B 5/0075* (2013.01); *H04W 52/283* (2013.01); *Y02D 70/00* (2018.01)

(58) Field of Classification Search
CPC .. H02J 50/40; H02J 50/80; H02J 50/90; H02J 7/025; H04B 5/0037; H04B 5/0075; H04W 52/283; Y02D 70/00
USPC .... 340/4.2, 10.1, 10.34, 13.23, 13.24, 13.25
See application file for complete search history.

(56) References Cited

U.S. PATENT DOCUMENTS

| | | | |
|---|---|---|---|
| 2006/0103534 A1* | 5/2006 | Arms | E01F 13/12 340/572.1 |
| 2009/0058361 A1* | 3/2009 | John | A61N 1/3785 320/128 |
| 2009/0254766 A1 | 10/2009 | Yamasuge | |
| 2009/0284083 A1* | 11/2009 | Karalis | H01Q 1/02 307/104 |
| 2010/0036773 A1 | 2/2010 | Bennett | |
| 2010/0181843 A1* | 7/2010 | Schatz | B60L 11/007 307/104 |
| 2010/0181961 A1* | 7/2010 | Novak | H02J 7/025 320/108 |
| 2011/0018496 A1 | 1/2011 | Kozakai | |
| 2011/0270462 A1 | 11/2011 | Amano et al. | |

FOREIGN PATENT DOCUMENTS

| | | |
|---|---|---|
| EP | 2416467 A2 | 2/2012 |
| EP | 3285359 A2 | 2/2018 |
| JP | 09-103037 A | 4/1997 |
| JP | 2006-517378 A | 7/2006 |
| JP | 2006-517778 A | 7/2006 |
| JP | 2006-201959 A | 8/2006 |
| JP | 2006-353042 A | 12/2006 |
| JP | 2009-253762 A | 10/2009 |
| JP | 2010-028937 A | 2/2010 |
| JP | 2010-104203 A | 5/2010 |
| JP | 2010-284006 A | 12/2010 |
| JP | 5258521 B2 | 8/2013 |
| KR | 10-2011-0069869 A | 6/2011 |
| RU | 2011119488 A | 12/2012 |
| WO | 2010/055381 A1 | 5/2010 |

OTHER PUBLICATIONS

Office Action for JP Patent Application No. 2015-034751, dated Aug. 8, 2017, 6 pages of Office Action and 7 ages of English Translation.
Office Action for JP Patent Application No. 2016-214014, dated Aug. 29, 2017, 3 pages of Office Action and 2 pages of English Translation.
Non-Final Office Action for U.S. Appl. No. 15/225,277, dated Jul. 25, 2017, 16 pages.
Notice of Allowance for U.S. Appl. No. 15/225,277, dated Jan. 18, 2018, 9 pages.
Notice of Allowance for U.S. Appl. No. 15/225,277, dated Feb. 13, 2018, 8 pages.
Notice of Allowance for U.S. Appl. No. 15/225,277, dated Apr. 2, 2018, 4 pages.
Non-Final Office Action for U.S. Appl. No. 13/399,660, dated Jul. 1, 2015, 18 pages.
Final Office Action for U.S. Appl. No. 13/399,660, dated Nov. 27, 2015, 16 pages.
Notice of Allowance for U.S. Appl. No. 13/399,660, dated Jun. 6, 2016, 8 pages.
Extended European Search Report of EP Patent Application No. 18203317.5, dated Jan. 24, 2019, 9 pages.
Office Action for CN Patent Application No. 201610454981.6, dated Sep. 20, 2018, 06 pages of Office Action and 11 pages of English Translation.

* cited by examiner

TARGET OF POWER TRANSMISSION

NON-TARGETS OF POWER TRANSMISSION

TARGET OF POWER TRANSMISSION

FIG. 18

The measurement result indicates that the standard power transmission efficiency is 70% to 80%.
The power can be transmitted at 125 to 148 yen per kW.
※The power transmission is automatically stopped when it is less than the standard range during the power transmission.

| OK | RE-MEASURE |

FIG. 19

The measurement result indicates that the power can be transmitted at 125 yen per kW.
The power transmission is stopped when the transmission efficiency does not satisfy the standard.

| OK | RE-MEASURE |

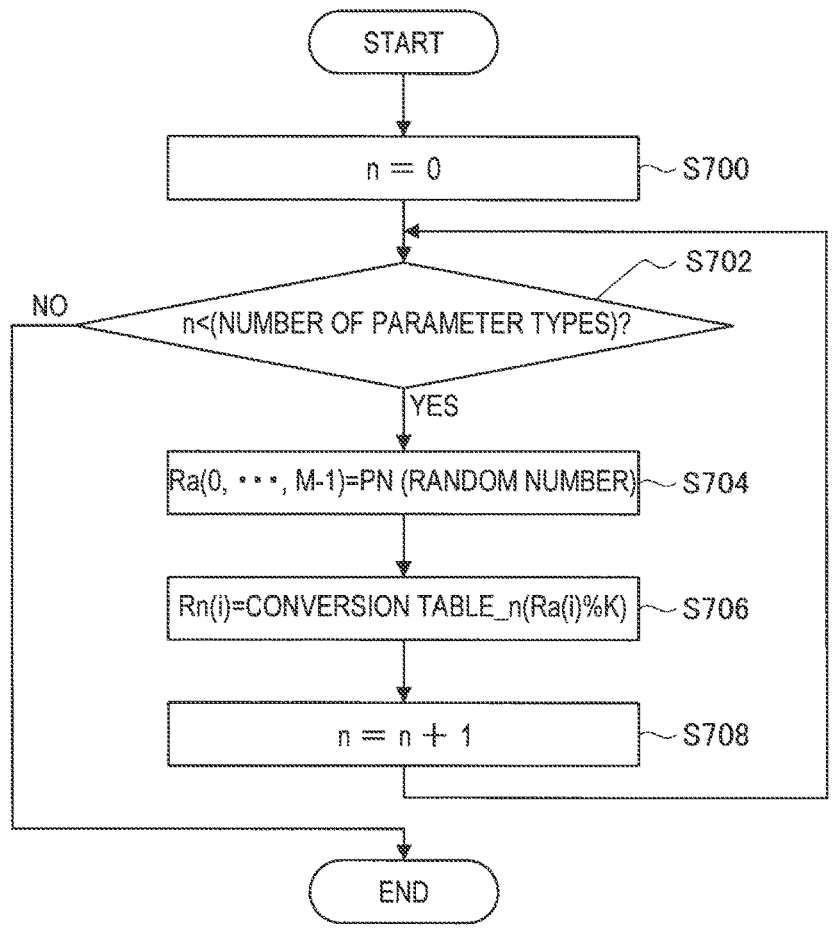

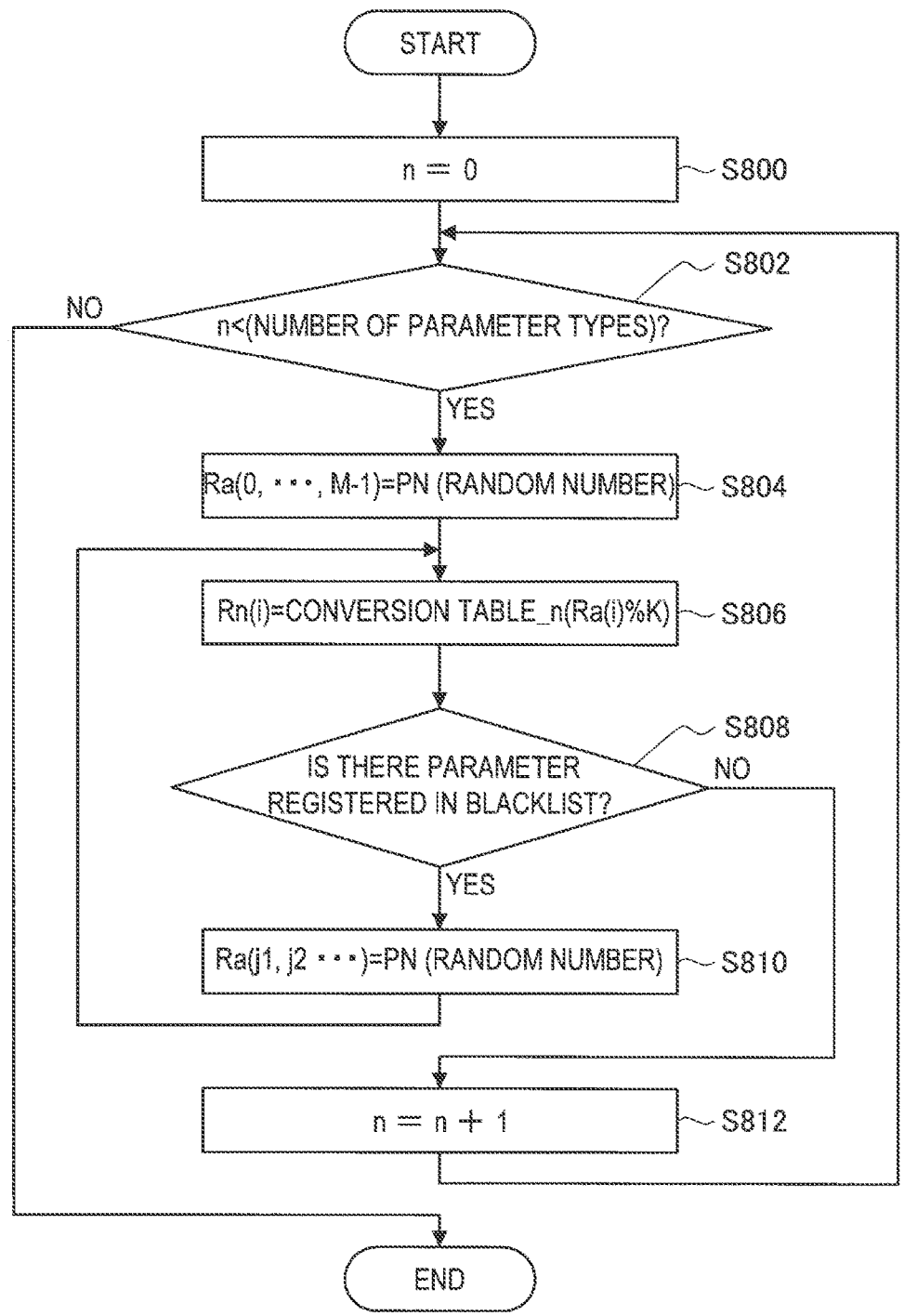

FIG. 37

| INDEX | PARAMETER (FREQUENCY) | BLACKLIST CANDIDATE | BLACKLIST |
|---|---|---|---|
| 0 | 300kHz | 2 | 0 |
| 1 | 330kHz | — | 1 |
| 2 | 360kHz | 5 | 1 |
| 3 | 390kHz | 1 | 0 |
| ⋮ | ⋮ | ⋮ | ⋮ |
| K-1 | 600kHz | 0 | 0 |

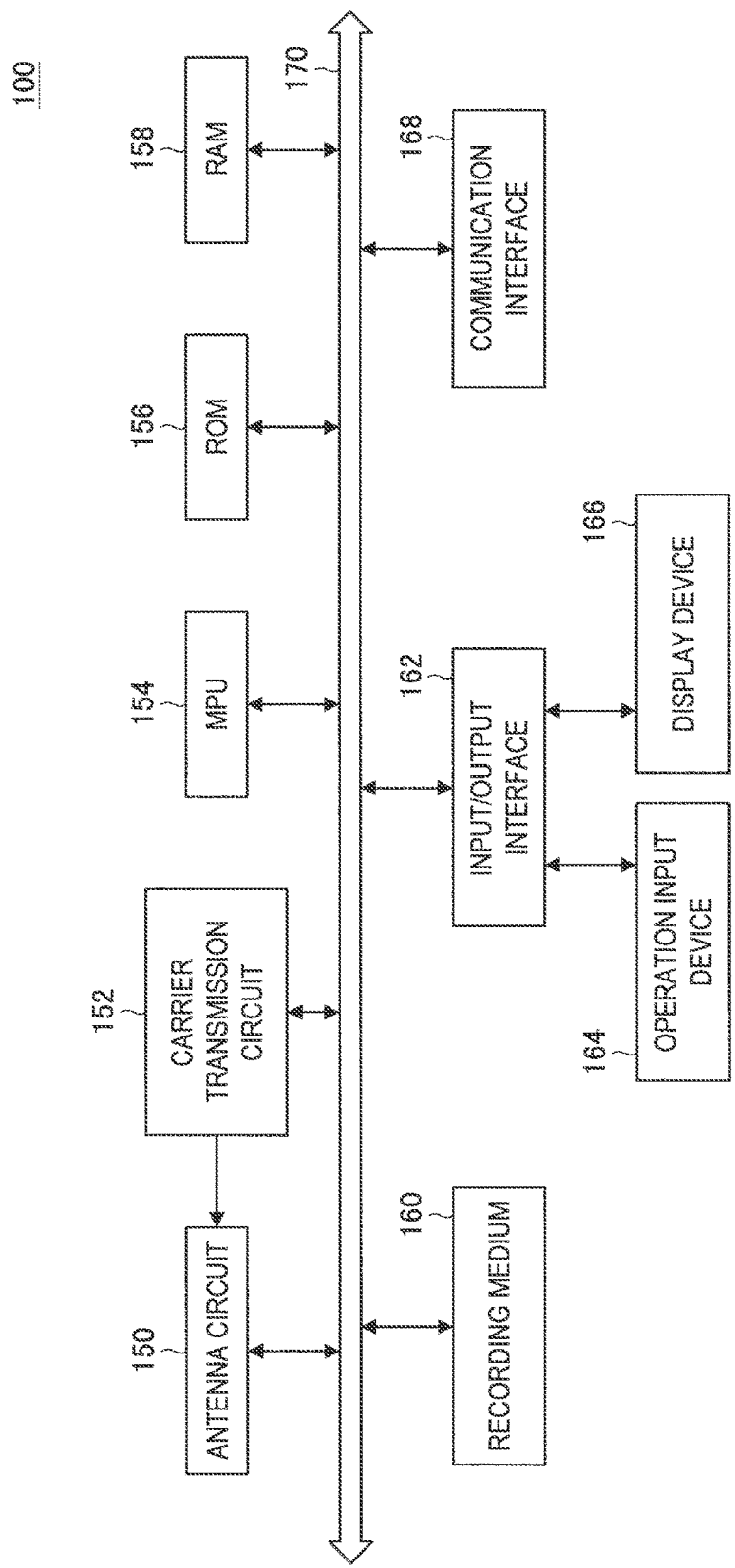

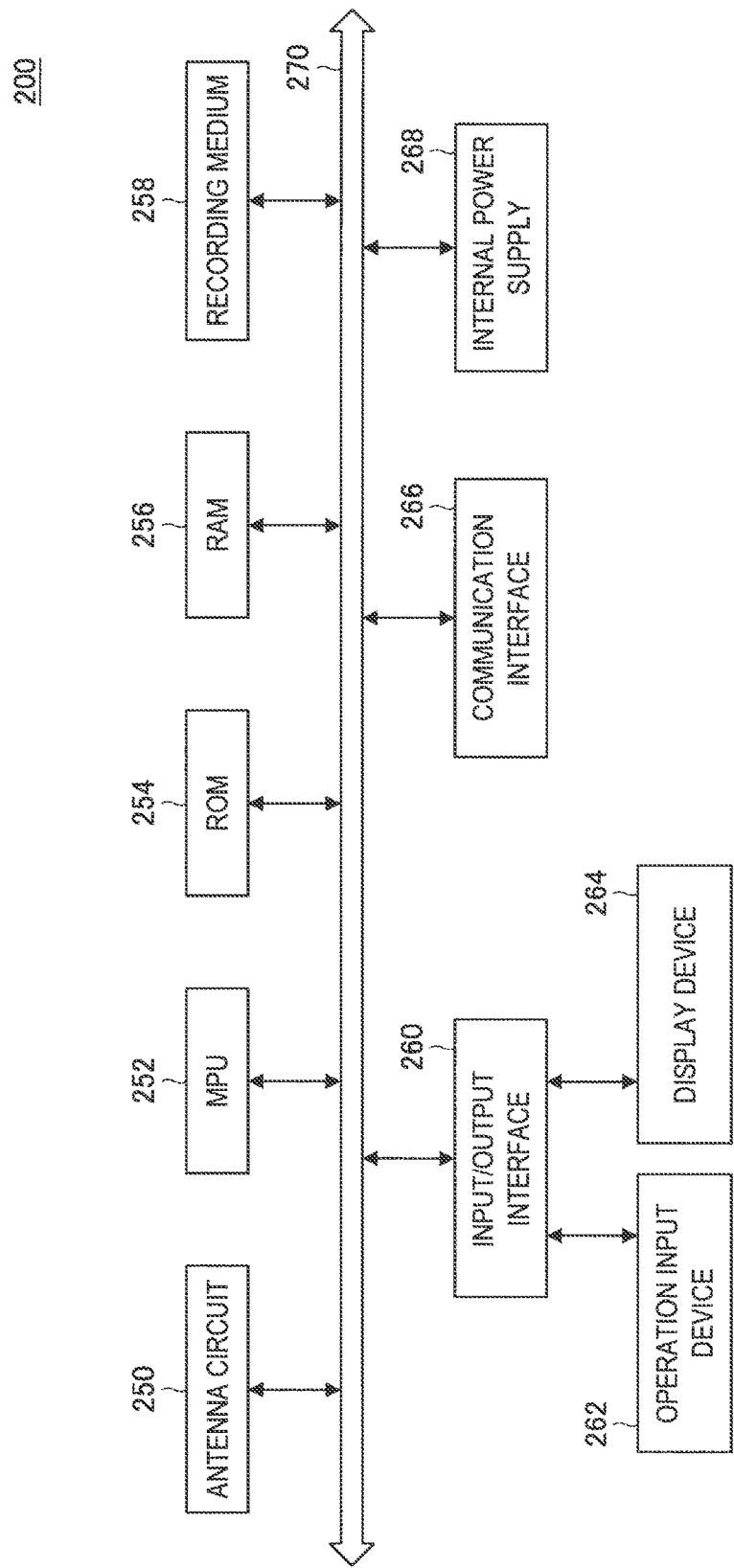

POWER TRANSMISSION DEVICE, POWER TRANSMISSION METHOD, AND POWER TRANSMISSION SYSTEM

CROSS-REFERENCE TO RELATED APPLICATIONS

The present application is a continuation application of U.S. patent application Ser. No. 15/225,277 filed on Aug. 1, 2016, which is a continuation application of U.S. patent application Ser. No. 13/399,660 filed on Feb. 17, 2012, which claims the benefit of the priority from prior Japanese Priority Patent Application JP 2011-035046 filed in the Japan Patent Office on Feb. 21, 2011, the entire content of which is hereby incorporated by reference.

BACKGROUND

The present disclosure relates to a power transmission device, a power transmission method, and a power transmission system.

Recently, power transmission systems capable of wirelessly transmitting power between devices have come into use. Examples of the above-described power transmission systems may be an electronic money system, a ticket gate system of a transportation facility, a system for entrance/admission using an employee identification (ID) card or the like, and an integrated chip (IC) card system using a reader/writer (an example of a power transmission device) and an IC card (an example of a power reception device). As a technology for wirelessly transmitting a larger amount of power to a greater distance, a technology for transmitting power, for example, by use of electric- or magnetic-field resonance, has also been developed.

Under these circumstances, a technology for wirelessly transmitting power to a specific device has been developed. An example of a technology for wirelessly transmitting power to a specific device by controlling directivity may be found in Japanese Patent Application Laid-Open No. 2009-253762.

SUMMARY

In the technology of the related art for wirelessly transmitting power to a specific device (hereinafter simply referred to as the "related art"), a power transmission device for transmitting power acquires position information indicating a position of a power reception device of a target to receive the transmitted power, and controls directivity of the power to be transmitted on the basis of the position information. Because the power transmission device to which the related art is applied (hereinafter referred to as the "power transmission device of the related art") transmits the power in a direction of a power reception device, it is possible to further reduce the possibility of other devices receiving the power, even when there are other devices capable of receiving the power. Consequently, the power is likely to be wirelessly transmitted to a specific power reception device by use of the related art.

The power transmission device of the related art controls directivity or a transmission power level on the basis of reception level information transmitted from the power reception device to which the related art is applied (hereinafter referred to as the "power reception device of the related art"). Consequently, the power transmission device of the related art is likely to transmit power to the power reception device of the related art efficiently to a certain extent.

However, it is possible to perform only ex post control because the power transmission device of the related art controls the directivity or the transmission power level on the basis of the reception level information, transmitted from the power reception device of the related art, only after transmitting power (hereinafter referred to as "power transmission"). Thus, there is a problem in that a loss of power transmission (hereinafter referred to as "power transmission loss") occurs when the power transmission device of the related art transmits the power to the power reception device of the related art.

It is desirable to provide a power transmission device, power transmission method, and power transmission system, which are novel and improved, and which are capable of reducing power transmission loss.

In a first embodiment, a power transmission device includes a communication unit that transmits a power capability information transmission request via a communication channel and receives power capability information in response to the power capability information transmission request, a processing unit configured to set a parameter based on the power capability information, and a power transmission unit that wirelessly transmits power using the parameter, wherein the communication unit transmits the power capability information transmission request before the power transmission unit wirelessly transmits the power.

Preferably, the power capability information indicates a transmission type and a parameter type.

Preferably, the transmission type is defined by at least one of an electromagnetic induction, electric waves, a magnetic-field resonance, and an electric-field resonance, and the power transmission unit wirelessly transmits the power using the at least one of the electromagnetic induction, the electric waves, the magnetic-field resonance, and the electric-field resonance Preferably, the parameter type is defined by at least one of a frequency, a voltage, and an azimuth angle, and the power transmission unit wirelessly transmits the power using the at least one of the frequency, the voltage, and the azimuth angle.

The power transmission device preferably includes a storage unit that stores transmission power capability information, wherein the processing unit sets the parameter by comparing the parameter type indicated by the received power capability information and a parameter type indicated by the transmission power capability information to add the parameter type indicated by the received power capability information to a parameter type list.

Preferably, the processing unit is configured to calculate a plurality of power transmission efficiencies for each of a plurality of parameters of the parameter type and to set a standard efficiency range based on a maximum power transmission efficiency of the plurality of power transmission efficiencies.

Preferably, the communication channel is encrypted.

Preferably, the communication unit receives first power reception amount information for the parameter after transmitting the power, and the processing unit is configured to calculate a first power transmission efficiency based on the first power reception amount information and causes the power transmission unit not to transmit the power if the first power transmission efficiency is less than a predetermined value.

Preferably, the communication unit receives first power reception amount information for the parameter after transmitting the power, and the processing unit is configured to calculate a second power transmission efficiency based on the first power reception amount information and to generate parameter information excluding the parameter if the second power transmission efficiency is less than a predetermined value.

Preferably, if the communication unit receives additional first power reception amount information for the parameter, the processing unit calculates an additional second power transmission efficiency based on the additional first power reception amount information, and, if the additional second power transmission efficiency is less than the predetermined value a predetermined number of times in a predetermined period corresponding to the first power reception amount information and the additional first power reception amount information, the processing unit excludes the parameter from the parameter information.

Preferably, the processing unit periodically or aperiodically includes the parameter in the parameter information after the processing unit has excluded the parameter from the parameter information.

Preferably, the parameter does not exceed a power reception capability indicated by the power capability information, the communication unit transmits parameter information, the communication unit receives second power reception amount information after the power transmission unit wirelessly transmits the power, and the processing unit is configured to calculate a plurality of third power transmission efficiencies of a plurality of parameters based on the second power reception amount information, to set a standard range based on the plurality of third power transmission efficiencies, and to exclude one of the plurality of parameters from the parameter information if the third power transmission efficiency of the one of the plurality of parameters is outside the standard range.

Preferably, the processing unit is configured to calculate a power transmission unit price corresponding to the standard range, the communication unit transmits information indicating the power transmission unit price, and the power transmission unit wirelessly transmits the power using the parameter if the communication unit receives a power transmission start request in response to the information indicating the power transmission unit price.

Preferably, if the third power transmission efficiency of the one of the plurality of parameters is outside the standard range, the power transmission unit stops wirelessly transmitting the power.

Preferably, the communication unit transmits or receives connection information for forming the communication channel via a non-contact communication using a carrier of a predetermined frequency.

Preferably, the communication unit transmits the power capability information transmission request via the non-contact communication, the communication unit receives the power capability information via the non-contact communication, and the parameter does not exceed a power reception capability indicated by the power capability information.

Preferably, the processing unit is configured to generate parameter information indicating the parameter, based on parameter candidates of the power, corresponding to an environment where the power is transmitted, set on the basis of the power capability information.

In a second embodiment, a power transmission method includes transmitting a power capability information transmission request via a communication channel, receiving power capability information in response to the power capability information transmission request, setting a parameter based on the power capability information, and wirelessly transmitting power using the parameter, wherein the transmitting the power capability information transmission request is performed before the wirelessly transmitting the power.

In a third embodiment, a program causes a computer to execute transmitting a power capability information transmission request via a communication channel, receiving power capability information in response to the power capability information transmission request, setting a parameter based on the power capability information, and wirelessly transmitting power using the parameter, wherein the transmitting the power capability information transmission request is performed before the wirelessly transmitting the power.

In a fourth embodiment, a power reception device includes a storage unit that stores power capability information, a communication unit that receives a power capability information transmission request via a communication channel, transmits the power capability information in response to the power capability information transmission request, and receives parameter information based on the power capability information, and a power reception unit that wirelessly receives power using a parameter indicated by the parameter information, wherein the communication unit receives the power capability information transmission request before the power reception unit wirelessly receives the power.

According to the embodiments of the present disclosure described above, it is possible to reduce a power transmission loss.

BRIEF DESCRIPTION OF THE DRAWINGS

FIG. 18 is an explanatory diagram showing an example of a display screen presented to a user in the calibration process of the power transmission device according to an embodiment;

FIG. 19 is an explanatory diagram showing another example of the display screen presented to the user in the calibration process of the power transmission device according to an embodiment;

FIG. 34 is a flowchart showing an example of a parameter setting process of the power transmission device according to an embodiment;

FIG. 35 is an explanatory diagram showing an example of a conversion table used by the power transmission device to derive a parameter corresponding to a certain parameter type according to an embodiment;

FIG. 36 is a flowchart showing another example of the parameter setting process of the power transmission device according to an embodiment;

FIG. 37 is an explanatory diagram showing another example of the conversion table used by the power transmission device to derive a parameter corresponding to a certain parameter type according to an embodiment;

FIG. 39 is an explanatory diagram showing an example of a hardware configuration of the power transmission device according to an embodiment; and FIG. 40 is an explanatory diagram showing an example of a hardware configuration of the power reception device according to an embodiment.

DETAILED DESCRIPTION

Figure 1:
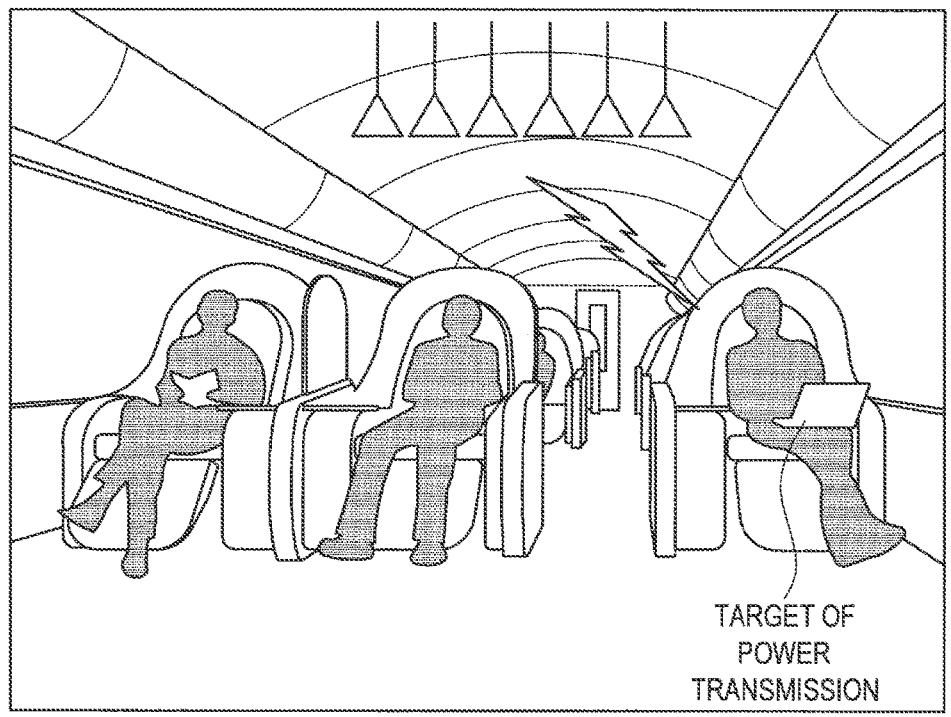
FIG. 1 is an explanatory diagram illustrating a problem occurring in wireless power transmission in which power is wirelessly transmitted.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, description will be given in the following order.
1. Approach According to One Embodiment
2. Power Transmission System According to One Embodiment
3. Program According to One Embodiment
(Approach According to One Embodiment)

Before the description of a configuration of the power transmission system (which may hereinafter be referred to as a power transmission system 1000) according to this embodiment, a power transmission approach according to this embodiment will be described. A process related to the power transmission approach according to this embodiment to be described later can be treated as a process related to a power transmission method (a method of transmitting power) according to this embodiment.
[Problems Occurring in Use of Related Art]

Figure 2:
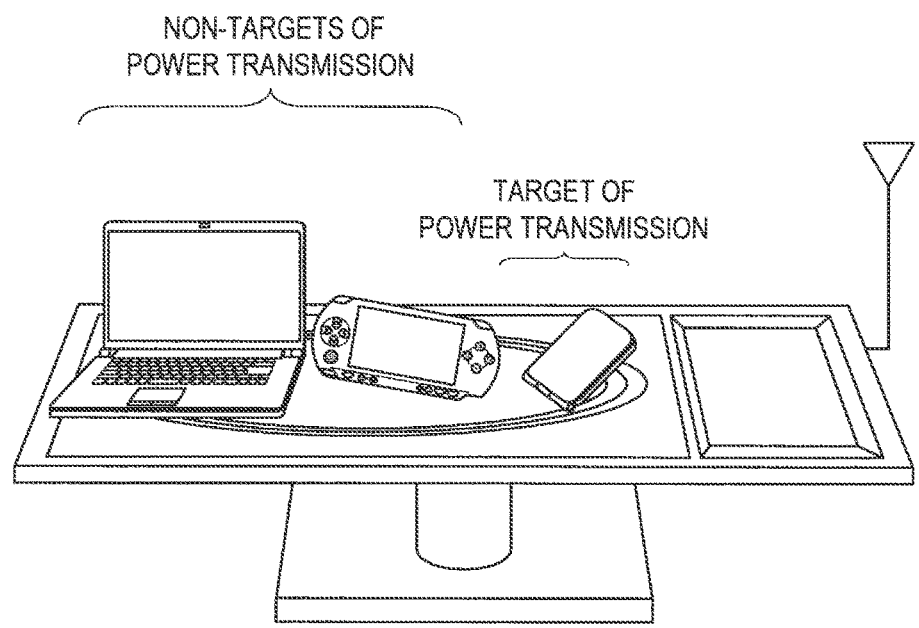
FIG. 2 is an explanatory diagram illustrating a problem occurring in wireless power transmission in which power is wirelessly transmitted.

Before the description of the power transmission approach according to this embodiment, problems occurring in wireless power transmission for wirelessly transmitting power will be more specifically described. FIGS. 1 and 2 are explanatory diagrams illustrating problems occurring in a wireless power transmission for wirelessly transmitting power. Here, FIG. 1 shows a use case of the wireless power transmission to a specific device (power reception device) of a target of power transmission, for example, within a vehicle such as an electric train. FIG. 2 shows a use case of the wireless power transmission from a table to a specific device (power reception device) of a target of power transmission placed on a table provided, for example, in a coffee shop or the like.

In the use case shown in FIG. 1, for example, as in the related art, the power transmission device acquires position information indicating a position of the power reception device and controls a directivity of power to be transmitted by the power transmission device on the basis of the position information, thereby transmitting power to the power reception device. However, when there are devices (which may hereinafter be referred to as "non-target devices of power transmission") other than the power reception device in a power transmission range, the power is received by the non-target devices of the power transmission, so that the power to be received in the power reception device is reduced. That is, power corresponding to the reduction of power to be received becomes a power transmission loss.

Here, for example, the power transmission device of the related art controls directivity or a level of transmission power on the basis of reception level information to be transmitted from the power reception device of the related art after the power is transmitted as described above, and thereby transmits power so that the power reception device of the related art can receive the power equal to or greater than a certain fixed level. However, the power transmission loss is further increased if the power transmission device transmits power by setting up the power transmission level, for example, as in the power transmission device of the related art, when the power transmission loss occurs as described above.

Because the power transmission device of the related art can control the directivity, for example, it is possible to avoid non-target devices of power transmission from receiving power and reduce the power transmission loss by controlling the directivity. However, because the power transmission device of the related art controls the directivity on the basis of the reception level information transmitted from the power reception device of the related art, the control of the directivity in the power transmission device of the related art is ex post facto. The control of the directivity in the power transmission device of the related art gives no guarantee, in terms of whether directivity after a change is suitable for power transmission (for example, whether the power transmission loss is less than a predetermined value, or the like).

The power transmission loss is not expected to be reduced even when the related art is applied to the transmission of power in the use case shown in FIG. 1.

As in the use case shown in FIG. 2, the non-target devices of power transmission are more likely to be included in a power transmission range even if the directivity of power to be transmitted as in the related art is controlled when there are the power reception device and the non-target devices of power transmission on the table that functions as the power transmission device. Consequently, as in the use case shown in FIG. 1 described above, the power transmission loss is not expected to be reduced even when the related art is applied to the use case shown in FIG. 2.

As described above, the power transmission loss is not expected to be reduced when power is wirelessly transmitted even when the related art is used.

[Overview of Power Transmission Approach]

In the power transmission system 1000, the power transmission device (which may hereinafter be referred to as the "power transmission device 100") according to this embodiment constituting the power transmission system 1000 sets parameter candidates of power to be transmitted according to an environment where the power is transmitted before the power is transmitted to the power reception device. The power transmission device 100 reduces the power transmission loss by transmitting power using any one parameter of the set parameter candidates of the power.

More specifically, before starting the transmission of power, the power transmission device 100 transmits a power capability information transmission request to the power reception device (which may hereinafter be referred to as the "power reception device 200"), which is a target of the power transmission according to this embodiment, constituting the power transmission system 1000, using an encrypted communication channel (which may hereinafter be referred to as a "first communication channel"). Here, the power capability information transmission request according to this embodiment is a type of command for causing a device receiving the power capability information transmission request to transmit power capability information indicating a capability regarding the transmission/reception of power in the device. The power transmission device 100 sets a parameter, in which a power transmission efficiency equal to or greater than a certain fixed level can be acquired in an actual environment where power is transmitted, as a parameter candidate of the power among parameters of the power that does not exceed a power reception capability indicated by the power capability information transmitted from the power reception device 200 in response to the power capability information transmission request.

The power transmission device 100 generates parameter information indicating parameters of power to be sequentially transmitted in a power transmission period for every power transmission period on the basis of set parameter candidates of the power, and sequentially transmits the generated parameter information to the power reception device 200, which is the target of the power transmission, by use of the first communication channel. In each power transmission period, the power transmission device 100 transmits the power by use of the parameters of the power indicated by the corresponding parameter information. Although examples of the parameters of the power according to this embodiment may be a frequency, a voltage, an azimuth angle, and the like, the parameters of the power according to this embodiment are not limited to the above.

Hereinafter, the power transmission period in which the power transmission is performed between the power transmission device 100 and the power reception device 200 may be referred to as a "session," and a transmission unit of power to be sequentially transmitted in the power transmission period may be referred to as a "step." That is, the step according to this embodiment is a minimum unit of the power transmission in the power transmission system 1000, and the session according to this embodiment is a standard unit of the power transmission in the power transmission system 1000 including a plurality of steps.

The power reception device 200 receives the parameter information via the encrypted first communication channel. Consequently, even when the power transmission device 100 transmits the power using any one parameter among the parameter candidates of the power, the power reception device 200 can efficiently receive the power transmitted on the basis of the parameter indicated by the parameter information. Thus, because it is possible to further increase the power transmission efficiency in the power transmission system 1000, the power transmission loss can be reduced.

Because a non-target device of the power transmission does not receive power on the basis of the parameter information as in the power reception device 200, it is difficult to efficiently receive the power transmitted from the power transmission device 100 even if it is in the power transmission range. Consequently, the power transmission device 100 transmits the power using any one parameter among the parameter candidates of the power, thereby further reducing unauthorized power reception by the non-target device of the power transmission.

Therefore, the power transmission device 100 transmits the power to the power reception device 200 using a parameter corresponding to an environment where the power is transmitted, so that a power transmission system capable of reducing the power transmission loss is implemented.

The power transmission approach according to this embodiment is not limited to the transmission of power using any one parameter among the set parameter candidates of the power by the power transmission device 100. For example, the power transmission device 100 further calculates a power transmission efficiency (which may hereinafter be referred to as "first power transmission efficiency") in a power transmission period in which the power has been transmitted, and stops the power transmission if the calculated first power transmission efficiency is less than a predetermined value. Here, an example of the first power transmission efficiency according to this embodiment may be a power transmission efficiency in the entire power transmission period in which the power has been transmitted, or may be a power transmission efficiency in only some power transmission periods among power transmission periods in which the power has been transmitted. Hereinafter, an example in which the first power transmission efficiency according to this embodiment is the power transmission efficiency in the entire power transmission period in which the power has been transmitted will be described.

More specifically, the power transmission device 100 receives first power reception amount information, indicating a power reception amount (a measurement value measured in the power reception device 200) for every parameter of the power indicated by the parameter information in the power reception device 200, from the power reception device 200 via the first communication channel. Here, the power transmission device 100 can recognize the power transmission amount for every parameter, for example, by measuring a transmission power for every parameter in each power transmission period. Consequently, the power transmission device 100 can calculate the first power transmission efficiency, for example, by carrying out arithmetic operations of the following Equations 1 to 7. Hereinafter, the power transmission efficiency in each power transmission period, that is, the power transmission efficiency in each session, may be referred to as "second power transmission efficiency."

Here, E(i) denotes a power transmission efficiency in step i, Ps(i) denotes a power transmission amount in step i, and Pr(i) denotes a power reception amount in step i. Esec(j) denotes a power transmission efficiency in session j, that is, second power transmission efficiency, Pssec(j) denotes a power transmission amount in session j, and Prsec(j) denotes a power reception amount in session j. Eall denotes a first power transmission efficiency, Psall denotes an integrated power transmission amount into which power transmission amounts are integrated in all power transmission periods in which power has been transmitted, and Prall denotes an integrated power reception amount into which power reception amounts are integrated in all the power transmission periods in which the power has been transmitted.

$$E(i) = Pr(i)/Ps(i) \quad \text{(Equation 1)}$$

$$E\sec(j) = Pr\sec(j)/Ps\sec(j) \quad \text{(Equation 2)}$$

$$Ps\sec(j) = \sum_{i=1}^{M} Ps(i) \quad \text{(Equation 3)}$$

$$Pr\sec(j) = \sum_{i=1}^{M} Pr(i) \quad \text{(Equation 4)}$$

$$Eall = Prall/Psall \quad \text{(Equation 5)}$$

$$Psall = \sum_{j=1}^{L} Ps\sec(j) \quad \text{(Equation 6)}$$

$$Prall = \sum_{j=1}^{L} Ps\sec(j) \quad \text{(Equation 7)}$$

For example, when the first power transmission efficiency calculated according to Equation 5 is less than a predetermined value, the power transmission device 100 stops the transmission of the power. Here, an example of the predetermined value to be used by the power transmission device 100 to make a comparison with the first power transmission efficiency may be a lower limit of a standard range of the power transmission efficiency to be described later. A comparison between the first power transmission efficiency and the above-described predetermined value in the power transmission device 100 corresponds to a determination of whether or not the power transmission loss is greater than the predetermined value.

Here, if the calculated first power transmission efficiency (the power transmission efficiency in the power transmission period in which the power has been transmitted) is less than the predetermined value, for example, it indicates that the power transmitted by the power transmission device 100 is not received normally in the power reception device 200. As a factor for which the power reception device 200 does not normally receive, for example, it is assumed that an environment-dependent power loss occurs due to an obstacle, a transmission distance, a collision of a frequency band, or the like, that power loss occurs due to dissipation of energy during wireless transmission, or that the power is received by a non-target device of the power transmission.

The power transmission device 100 can automatically stop the power transmission even when the transmitted power is received by the non-target device of the power transmission and the power transmitted by the power transmission device 100 is not received normally in the power reception device 200. Therefore, the power transmission device 100 stops the power transmission if the calculated first power transmission efficiency (the power transmission efficiency in the power transmission period in which the power has been transmitted) is less than the predetermined value, thereby preventing the power from being continuously transmitted in a state in which the power transmission loss is greater than the predetermined value. The power transmission device 100 can prevent the power from being received by the non-target device of the power transmission by stopping the power transmission if the calculated first power transmission efficiency is less than the predetermined value.

[Example of Process Related to Power Transmission Approach]

Next, the process related to the power transmission approach according to this embodiment will be more specifically described. In the power transmission system 1000, the process related to the above-described power transmission approach is implemented, for example, by a process (communication channel establishment process) of (1) to a process (power transmission process) of (3) to be described later.

(1) Communication Channel Establishment Process

The power transmission device 100 and the power reception device 200 establish a communication channel (first communication channel) encrypted to transmit/receive various information (data) such as parameter information. By performing the process of (1), the power transmission device 100 and the power reception device 200 can transmit and receive various information (that is, information for implementing the power transmission approach) such as parameter information via a secure communication channel. Here, an example of the first communication channel according to this embodiment may be a communication channel formed by a wireless communication using Institute of Electrical and Electronics Engineers (IEEE) 802.15.1, a communication channel formed by a wireless communication (which may hereinafter be referred to as "Wi-Fi") using a wireless local area network (LAN) such as IEEE 802.11b, a communication channel formed by a wireless communication using IEEE 802.15.4, or the like. An example of the first communication channel according to this embodiment may be based on a wired communication by a LAN or the like.

[1] First Example of Communication Channel Establishment Process

Figure 3:
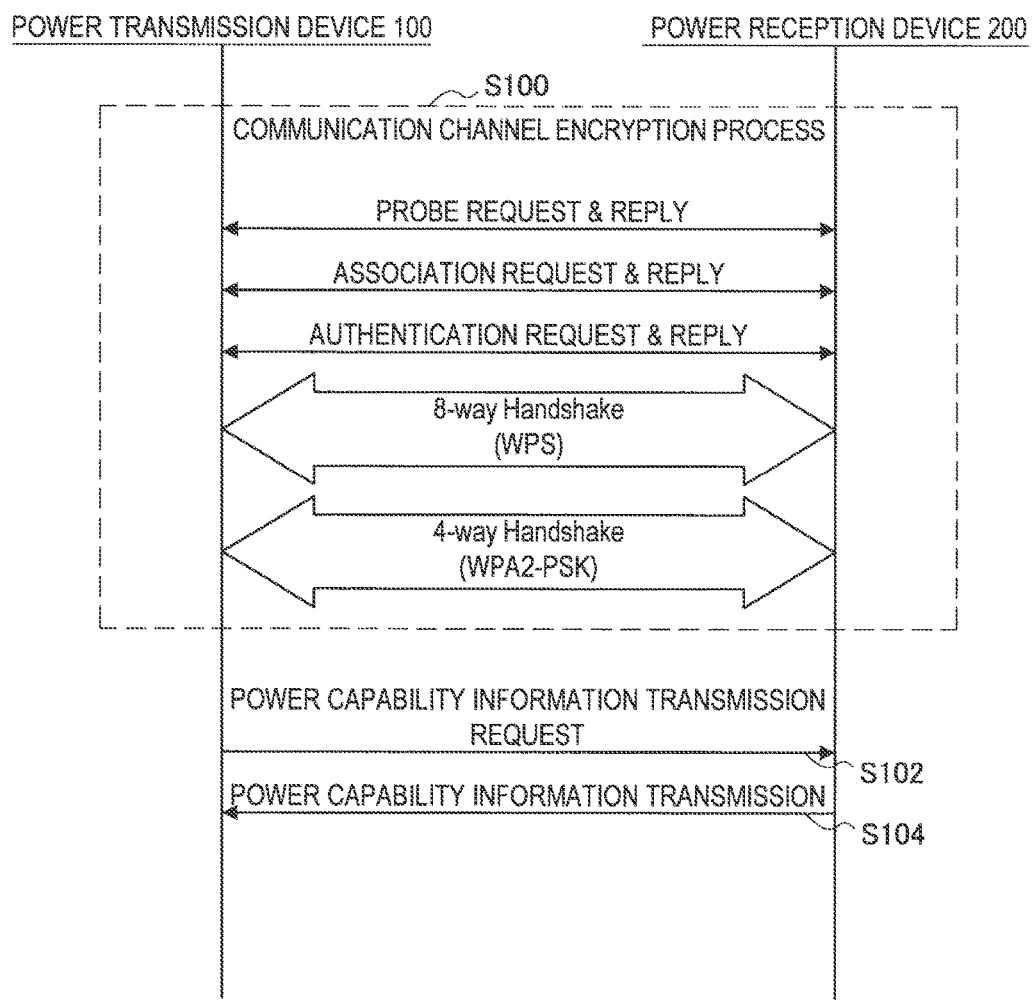
FIG. 3 is an explanatory diagram showing a first example of a communication channel establishment process in a power transmission system according to an embodiment.

FIG. 3 is an explanatory diagram showing the first example of the communication channel establishment process in the power transmission system 1000 according to this embodiment. Hereinafter, an example in which the first communication channel is a communication channel formed by a wireless communication using the wireless LAN such as IEEE 802.11b will be described.

The power transmission device 100 and the power reception device 200 perform a communication encryption process of forming the first communication channel and encrypting the first communication channel (S100). More specifically, for example, a user of the power reception device 200 selects the power transmission device 100 as a connection destination device from a search list of connection device candidates by operating the power reception device 200, and inputs a one-time key (personal identification number (PIN)) for authentication. If the above-described operation is performed by the user of the power reception device 200, the power transmission device 100 and the power reception device 200 perform an authentication and a communication channel encryption, for example, according to 8-way handshake and Wi-Fi protected access 2 (WPA2) standards.

If the communication encryption process is performed in step S100, the power transmission device 100 transmits a power capability information transmission request to the power reception device 200 (S102). Here, the process of step S102 is a process in which the power transmission device 100 acquires power capability information from the power reception device 200. For example, the power transmission device 100 determines a power transmission type and parameter candidates of the power to be transmitted to the power reception device 200 on the basis of power capability information stored in a storage section of the power transmission device itself (to be described later) and the power capability information acquired from the power reception device 200. In a process using the power capability information in the power transmission device 100, a process (power-parameter candidate determination process) of (2) will be described later.

The power reception device 200 receiving the power capability information transmission request transmitted from the power transmission device 100 in step S102 transmits, for example, the power capability information stored in the storage section of the power reception device 200 (to be described later) to the power transmission device 100 according to the receipt of the power capability information transmission request (S104).

Figure 4:
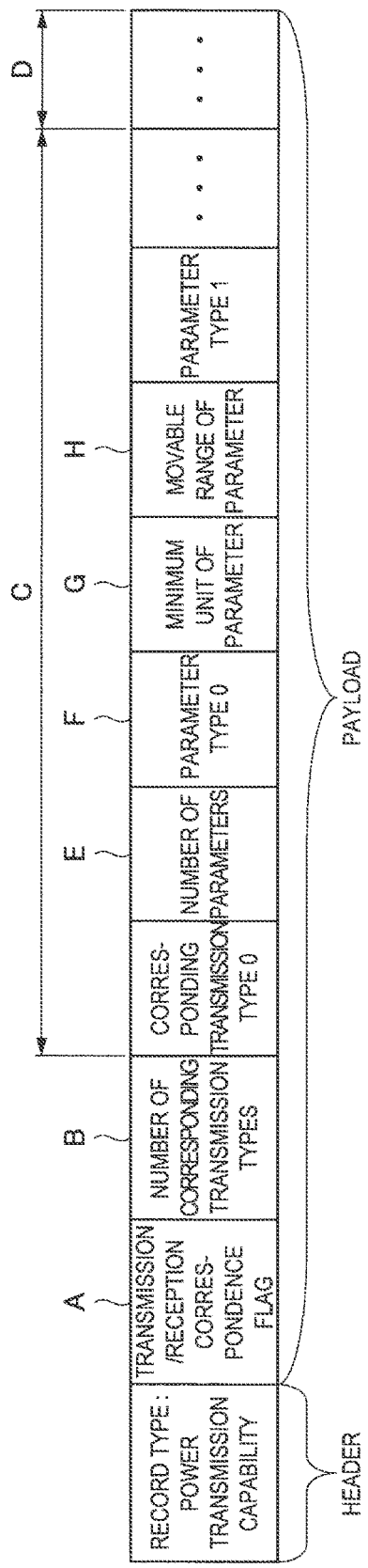
FIG. 4 is an explanatory diagram showing an example of power capability information according to an embodiment.

FIG. 4 is an explanatory diagram showing an example of the power capability information according to this embodiment. The power capability information includes, for example, a header and a payload, and the payload has a flag (A of FIG. 4) indicating whether or not a power transmission/reception is possible, information (B of FIG. 4) indicating the number of corresponding power transmission types, and information of every corresponding power transmission type (C and D of FIG. 4). An example of the information of every corresponding power transmission type may be the number of parameters (E of FIG. 4), information of a type of parameter (F of FIG. 4) such as a frequency, a voltage, or an azimuth angle, information (G of FIG. 4) indicating whether a parameter is fixed or indicating a variation unit of the parameter, for example, such as 50 kHz, information (H of FIG. 4) indicating a possible range of a parameter such as 300 kHz to 600 kHz, or the like. Needless to say, the power capability information according to this embodiment is not limited to the example shown in FIG. 4.

[Power Transmission Type According to this Embodiment]

Here, the power transmission type according to this embodiment will be described. Hereinafter, an example of the power transmission type will be described focusing on a power transmission section (which may hereinafter be referred to as a "power transmission section 106" to be described later) included in the power transmission device 100 and a power reception section (which may hereinafter be referred to as a "power reception section 206" to be described later) included in the power reception device 200.

[A] First Transmission Type: Power Transmission Using Electromagnetic Induction

Figure 5:
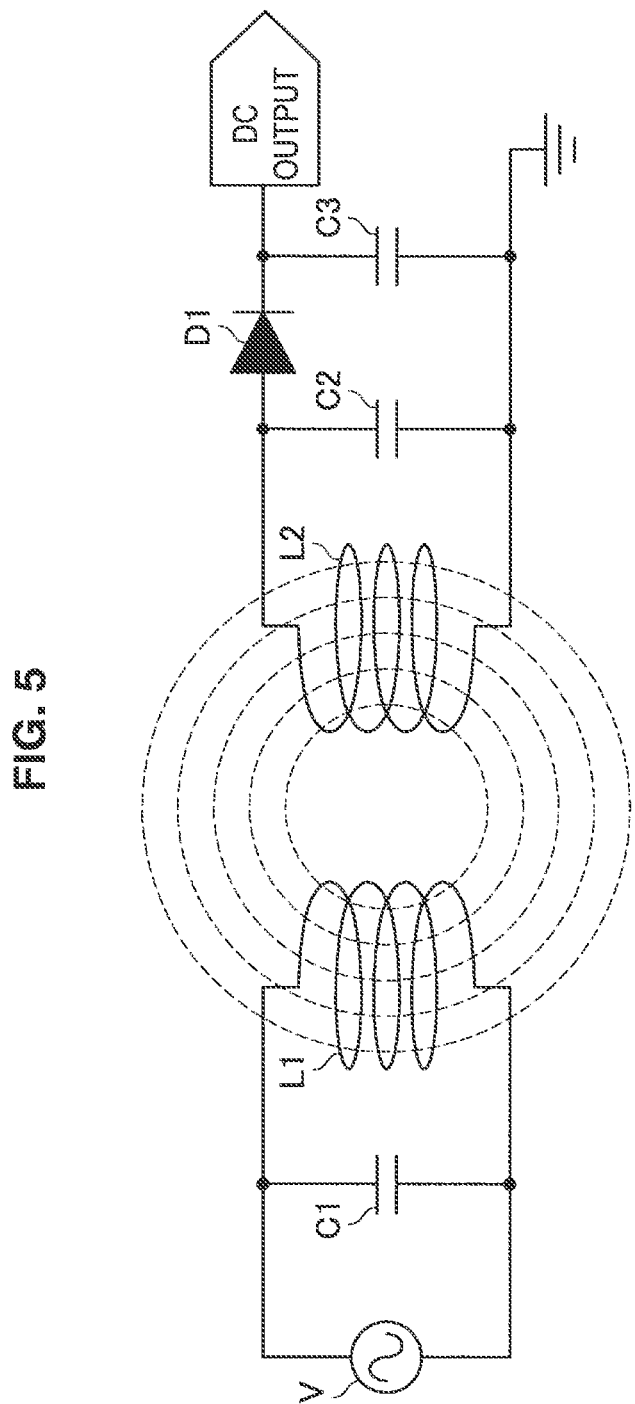
FIG. 5 is an explanatory diagram illustrating a first power transmission type according to an embodiment.

FIG. 5 is an explanatory diagram illustrating the first power transmission type according to this embodiment. Here, FIG. 5 shows a configuration example of the power transmission section 106 of the power transmission device 100 and the power reception section 206 of the power reception device 200 when power is transmitted using electromagnetic induction.

Referring to FIG. 5, the power transmission section 106 has an alternating current (AC) power supply V, a capacitor C1, and an inductor L1. The power reception section 206 has an inductor L2, a capacitor C2, a capacitor C3, and a diode D1. In the power transmission section 106, an AC flows through the inductor L1 by the AC power supply V, and a magnetic flux is generated around the inductor L1. In the power reception section 206, the diode D1 and the capacitor C3 rectify an AC flowing through the inductor L2 by the above-described magnetic flux, thereby obtaining a direct current (DC). Therefore, the power reception device 200 to which the first transmission type is applied can receive power transmitted from the power transmission device 100.

If the power transmission type using the electromagnetic induction as shown in FIG. 5 is used, it is possible to fluctuate and optimize a power transmission efficiency, for example, by varying the number of turns or arrangement positions of the inductors L1 and L2.

[B] Second Transmission Type: Power Transmission Using Electric Waves (Microwaves)

Figure 6:
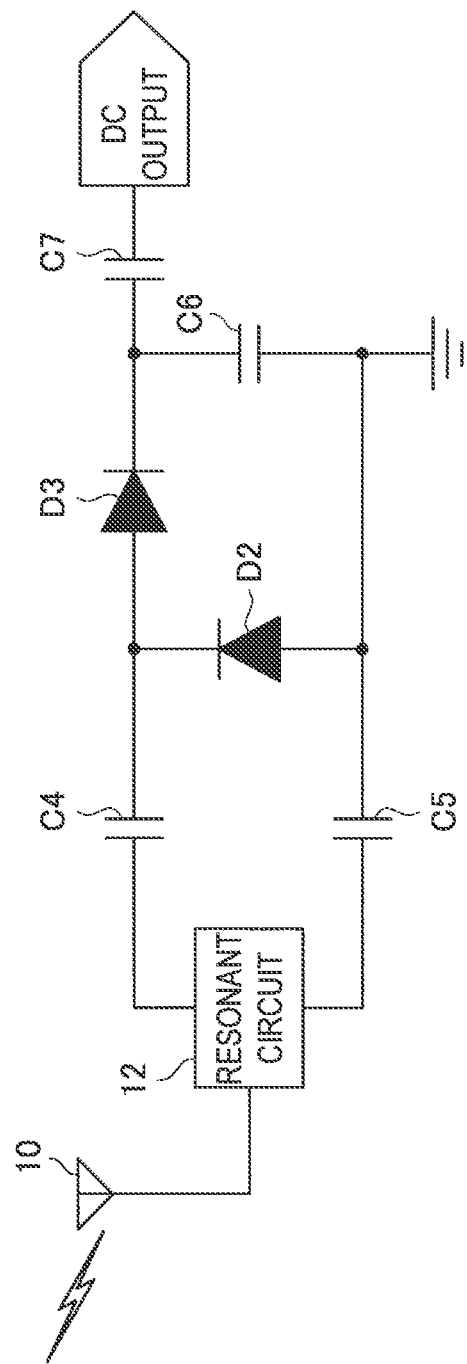
FIG. 6 is an explanatory diagram illustrating a second power transmission type according to an embodiment.

FIG. 6 is an explanatory diagram illustrating the second power transmission type according to this embodiment. Here, FIG. 6 shows a configuration example of the power reception section 206 of the power reception device 200 that receives power by use of electric waves.

As shown in FIG. 6, the power reception section 206 has an antenna 10, a resonant circuit 12, a capacitor C4, a capacitor C5, a diode D2, a diode D3, a capacitor C6, and a capacitor C7. Here, the resonant circuit 12 includes, for example, a capacitor having a predetermined electrostatic capacitance and an inductor having a predetermined inductance. In the above-described configuration, if the antenna 10 receives electric waves transmitted from the power transmission section 106 of the power transmission device 100, an AC is supplied from the antenna 10 to the resonant circuit 12, and the resonant circuit 12 amplifies the AC by resonance. Furthermore, in the power reception section 206, a rectifying circuit including the diode D3 and the capacitor C6 rectifies the amplified AC, extracts a DC component, and obtains a DC. Therefore, the power reception device 200 to which the second transmission type is applied can receive power transmitted from the power transmission device 100.

Figure 7:
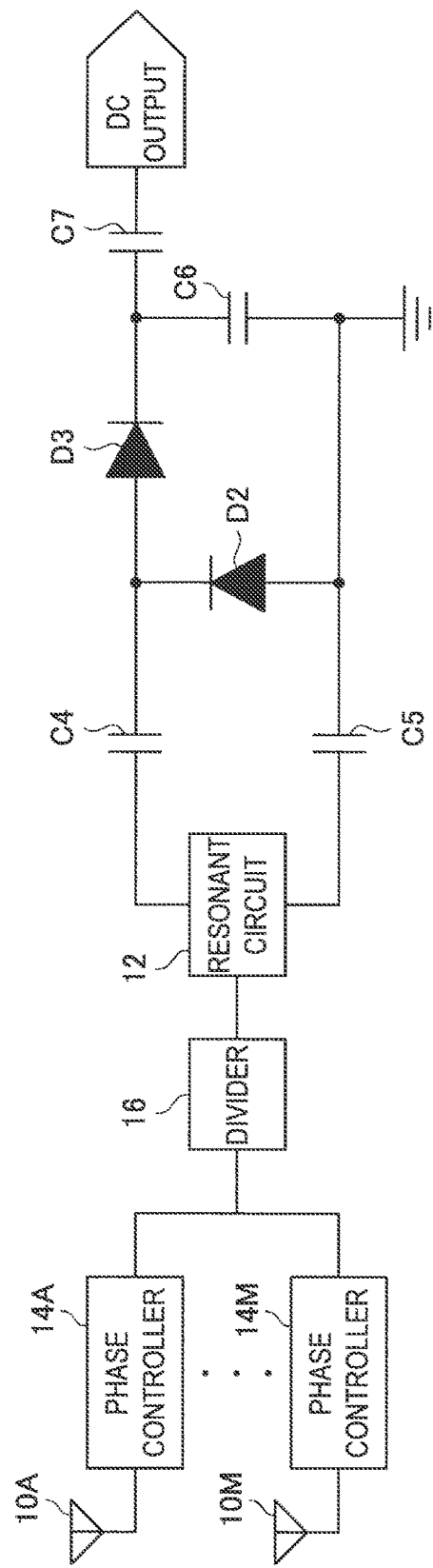
FIG. 7 is an explanatory diagram also illustrating the second power transmission type according to an embodiment.

A configuration related to the second power transmission type according to this embodiment is not limited to the configuration shown in FIG. 6. FIG. 7 is an explanatory diagram also illustrating the second power transmission type according to this embodiment. Here, FIG. 7 shows a configuration example of the power reception section 206 of the power reception device 200 that receives power using the electric waves as in FIG. 6.

The power reception section 206 shown in FIG. 7 basically has the same configuration as the power reception section 206 shown in FIG. 6, but the antenna 10 shown in FIG. 6 is replaced with a plurality of antennas 10A to 10M, a plurality of phase control circuits 14A to 14M, and a divider 16. FIG. 7 shows the case where a beam is formed, and the power reception section 206 having the configuration shown in FIG. 7 can receive beam-shaped electric waves.

[C] Third Transmission Type: Power Transmission Using Magnetic-Field Resonance

Figure 8:
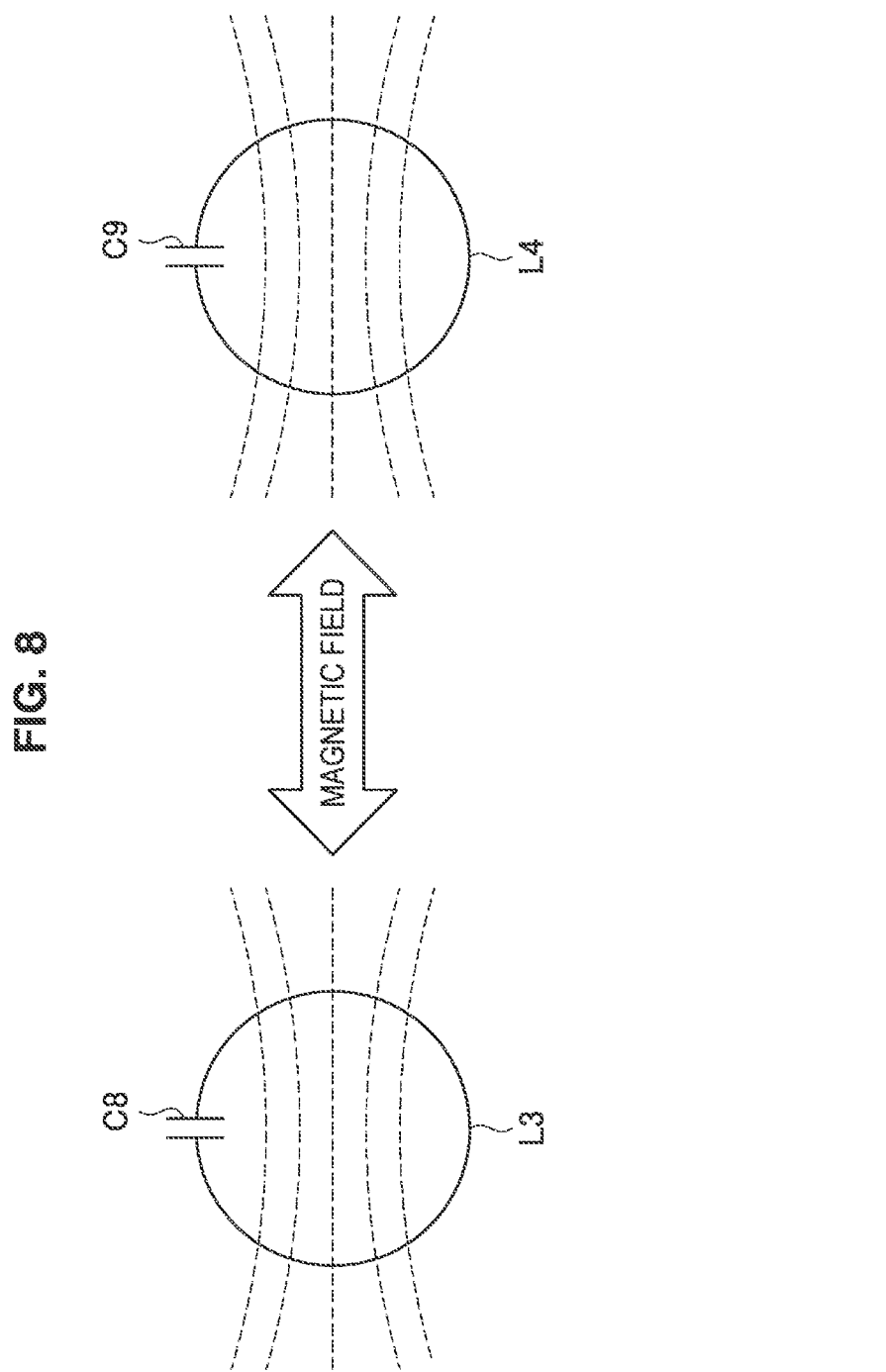
FIG. 8 is an explanatory diagram illustrating a third power transmission type according to an embodiment.

FIG. 8 is an explanatory diagram illustrating the third power transmission type according to this embodiment. Here, FIG. 8 shows a configuration example of the power transmission section 106 of the power transmission device 100 and the power reception section 206 of the power reception device 200 when power is received using magnetic-field resonance.

The power transmission section 106 includes a resonant circuit having a capacitor C8 and an inductor L3 as shown in FIG. 8, and the resonant circuit is connected, for example, to an AC power supply (not shown). The power reception section 206 has a capacitor C9 and an inductor L4. Here, the third transmission type uses the principle of resonance in which a vibration added to one side is also transferred to the other side when two vibrators each having a specific number of vibrations are arranged. Consequently, it is possible to optimize the transmission efficiency by adjusting each electrostatic capacitance and each inductance so that a resonant frequency of the capacitor C8 and the inductor L3 of the power transmission section 106 is more equal to a resonant frequency of the capacitor C9 and the inductor L4 of the power reception section 206. The power reception device 200 to which the third transmission type is applied using the principle of resonance as described above can receive power transmitted from the power transmission device 100.

Here, the power transmission using the principle of resonance (the power transmission by the third transmission type) as described above has a higher power transmission efficiency than the power transmission using the electromagnetic induction (the power transmission by the first transmission type) or the power transmission using the electric waves (the power transmission by the second transmission type). The power reception device 200 to which the third transmission type is applied can receive about several kilowatts of power, for example, if a distance from the power transmission device 100 is several meters.

[D] Fourth Transmission Type: Power Transmission Using Electric-Field Resonance

Figure 9:
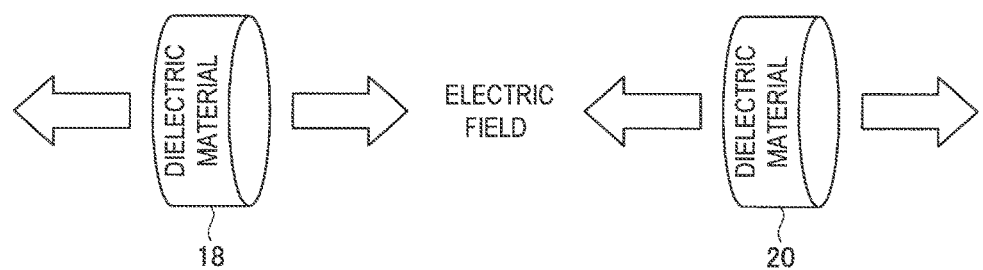
FIG. 9 is an explanatory diagram illustrating a fourth power transmission type according to an embodiment.

FIG. 9 is an explanatory diagram illustrating the fourth power transmission type according to this embodiment. Here, FIG. 9 shows a configuration example of the power transmission section 106 of the power transmission device 100, and the power reception section 206 of the power reception device 200, when power is received using electric-field resonance.

Like the above-described third transmission type, the fourth transmission type uses the principle of resonance in which a vibration added to one side is also transferred to the other side when two vibrators each having a specific number of vibrations (a dielectric material 18 and a dielectric material 20 in FIG. 9) are arranged. Consequently, it is possible to optimize the transmission efficiency by selecting each dielectric material so that a resonant frequency of the dielectric material 18 of the power transmission section 106 is more equal to a resonant frequency of the dielectric material 20 of the power reception section 206. Like the power reception device 200 to which the third transmission type is applied, the power reception device 200 to which the fourth transmission type is applied using the principle of resonance as described above can receive power transmitted from the power transmission device 100.

In the power transmission system 1000 according to this embodiment, power is transmitted from the power transmission device 100 to the power reception device 200, for example, using the first to fourth transmission types included in the above-described [A] to [D]. The power transmission type in the power transmission system 1000 according to this embodiment is not limited to the above-described first to fourth transmission types, and it is possible to apply any transmission type in which power can be wirelessly transmitted.

The power transmission device 100 and the power reception device 200 can form the encrypted first communication channel, for example, by performing the process shown in FIG. 3. The power transmission device 100 acquires the power capability information, for example, including information of a power transmission type corresponding to the power reception device 200, from the power reception device 200 via the formed first communication channel.

The communication channel establishment process in the power transmission system 1000 according to this embodiment is not limited to the example shown in FIG. 3. For example, because a predetermined connection setup operation (for example, an operation of selecting a device of a connection destination or an operation of inputting a one-time key (PIN) for authentication) performed by the user of the power reception device 200 for starting a communication by the first communication channel is unnecessary in the communication channel establishment process shown in FIG. 3, it is possible to improve the convenience of the user. More specifically, the power transmission device 100 and the power reception device 200 transmit and receive connection information for starting the communication by the first communication channel by performing a communication in a non-contact type by a second communication channel different from the first communication channel, thereby improving the convenience of the user. Here, the above-described second communication channel is formed by a communication type in which the power transmission device 100 and the power reception device 200 can perform one-to-one communication without a particular connection setup by the user. The second communication channel according to this embodiment may be a communication channel formed by a near field communication (NFC) using a magnetic field (carrier) of a specific frequency, for example, such as 13.56 MHz, in communication, a communication channel formed by an infrared communication in which an infrared ray is used in communication, or the like.

Next, a process capable of further improving the convenience of the user because the above-described operation by the user for starting a communication by the first communication channel is unnecessary will be described as a second example of the communication channel establishment process according to this embodiment.

[2] Second Example of Communication Channel Establishment Process

Figure 10:
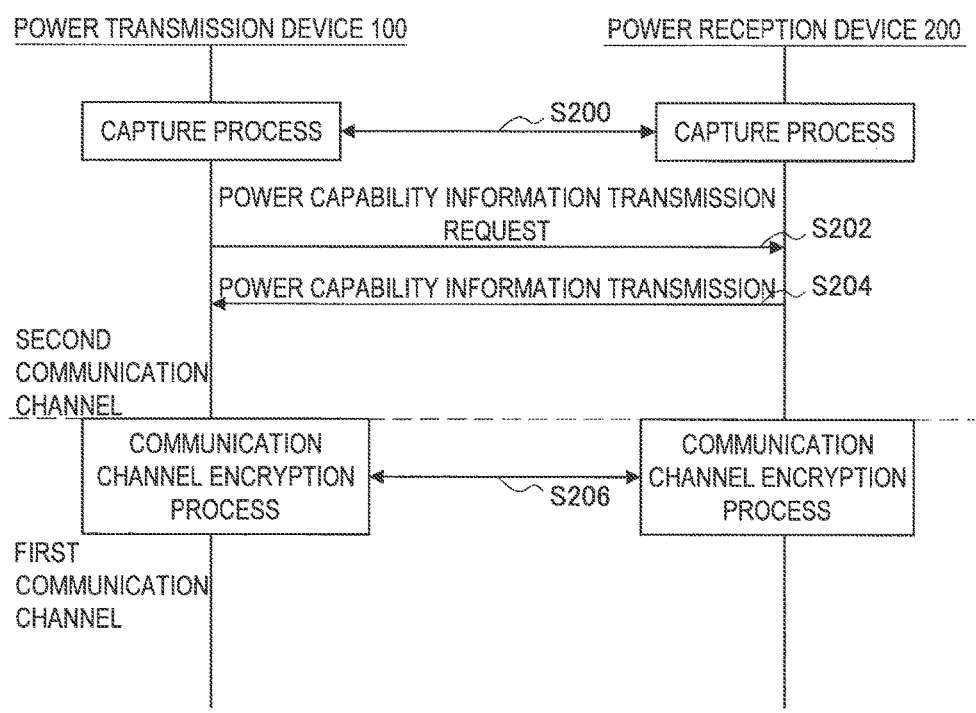
FIG. 10 is an explanatory diagram showing a second example of the communication channel establishment process in the power transmission system according to an embodiment.

FIG. 10 is an explanatory diagram showing the second example of the communication channel establishment process in the power transmission system 1000 according to this embodiment. Hereinafter, an example in which the first communication channel is formed by a wireless communication using a wireless LAN such as IEEE 802.11b as in the first example shown in FIG. 3 will be described. Hereinafter, an example in which the second communication channel is a communication channel formed by NFC using a carrier of 13.56 MHz (an example of a predetermined frequency) will be described. In processes of the power transmission device 100 and the power reception device 200 in FIG. 10, a process of steps S200 to S204 is related to a communication by the second communication channel, and a process of step S206 is related to a communication by the first communication channel.

A capture process is performed between the power transmission device 100 and the power reception device 200 (S200). Here, the process of step S200 is performed, for example, by a polling operation of capturing the power reception device 200 after the power transmission device 100 periodically or aperiodically transmits a specific carrier signal.

If the power reception device 200 is captured in step S200, the power transmission device 100 transmits a power capability information transmission request to the power reception device 200 as in step S102 of FIG. 3 (S202). Here, for example, connection information is further included in the power capability information transmission request transmitted in step S202. The power capability information transmission request transmitted in step S202 may have, for example, a data structure (format) in which power capability information shown in FIG. 11 to be described later is replaced with a command (substantial power capability information transmission request) for transmitting the power capability information.

The power reception device 200 receiving the power capability information transmission request transmitted from the power transmission device 100 in step S202 transmits the power capability information to the power transmission device 100 as in step S104 of FIG. 3 (S204). Here, if the second communication channel is formed by NFC, the second communication channel is an encrypted secure communication channel. If the communication by NFC is performed, a physical security is also improved because the power transmission device 100 and the power reception device 200 perform the communication at a distance of about 10 cm. Consequently, the power transmission device 100 can securely acquire the power capability information transmitted from the power reception device 200 in step S204.

Figure 11:
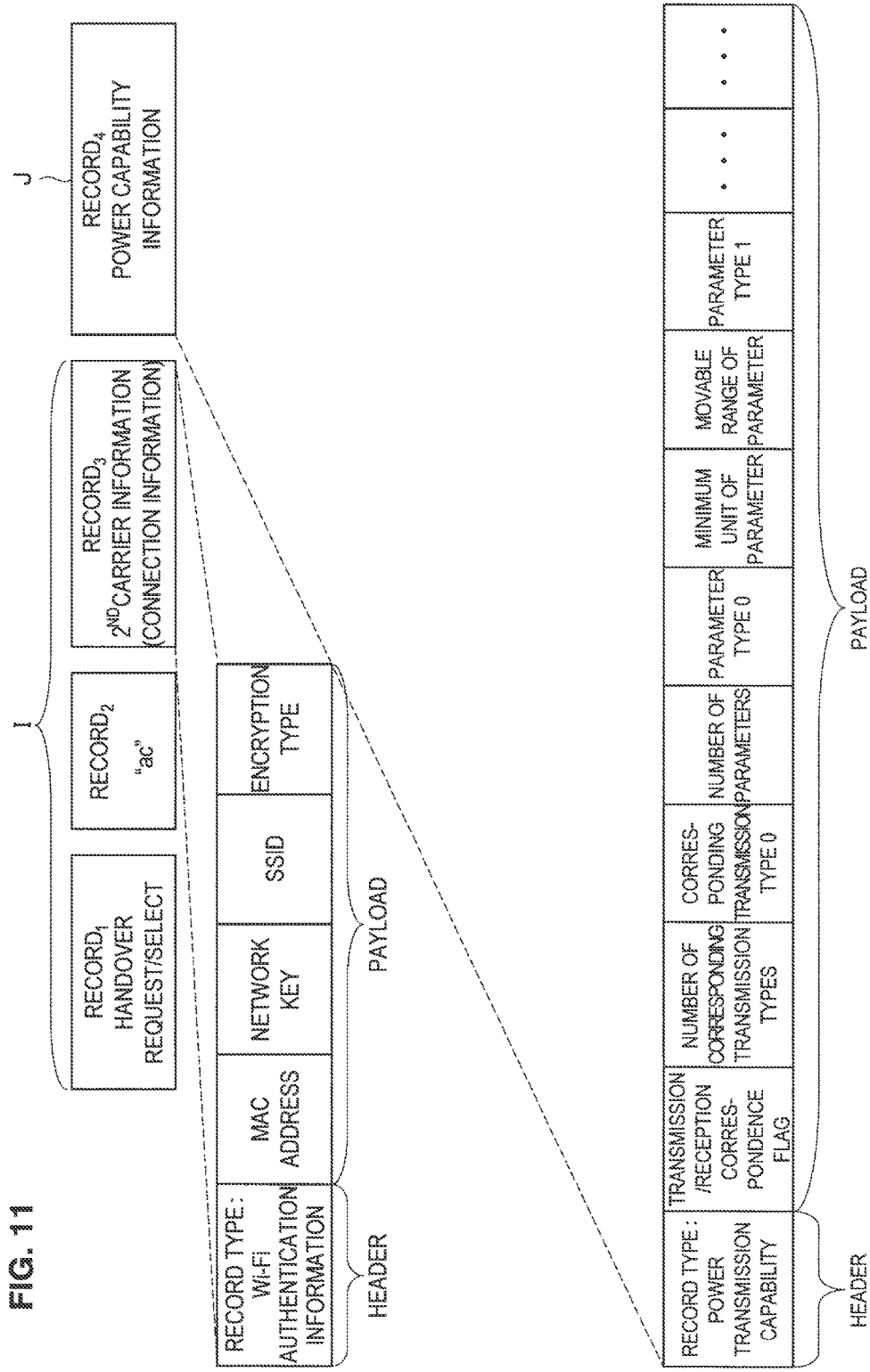
FIG. 11 is an explanatory diagram showing another example of power capability information according to an embodiment.

FIG. 11 is an explanatory diagram showing another example of the power capability information according to this embodiment. Here, a data structure in which the power capability information (J shown in FIG. 11) according to the embodiment shown in FIG. 4 is further added to a handover message format (I shown in FIG. 11) defined in an NFC format is shown in FIG. 11. Needless to say, the data structure of the power capability information according to this embodiment is not limited to the example shown in FIG. 11.

The second example of the communication channel establishment process of the power transmission system 1000 according to this embodiment will be described with reference back to FIG. 10. If the process of steps S202 and S204 is performed, the power transmission device 100 and the power reception device 200 perform a communication encryption process of forming and encrypting the first communication channel as in step S100 of FIG. 3 (S206).

Here, if authentication information included in the connection information shown in FIG. 11 is "OOB device password information" as defined in Wi-Fi protected setup (WPS), the power transmission device 100 and the power reception device 200 perform the 8-way handshake process. The power transmission device 100 and the power reception device 200 generate credential information in the 8-way handshake process, and perform an authentication and a communication channel encryption according to a WPA2 standard. If the authentication information included in the connection information shown in FIG. 11 is the "credential information," the power transmission device 100 and the power reception device 200 perform the authentication and the communication channel encryption according to the WPA2 standard without performing the 8-way handshake process. Consequently, the process shown in FIG. 10 is performed in which the user of the power reception device 200 does not perform a predetermined connection setup operation (for example, an operation of selecting a device of a connection destination or an operation of inputting a one-time key (PIN) for authentication), so that the encrypted first communication channel is formed between the power transmission device 100 and the power reception device 200.

For example, the process shown in FIG. 10 is performed, so that the power transmission device 100 can acquire the power capability information from the power reception device 200 via the second communication channel, and the power transmission device 100 and the power reception device 200 can form the encrypted first communication channel without the above-described operation by the user for starting the communication by the first communication channel.

In the power transmission system 1000, the encrypted first communication channel is established, for example, by the process related to the first example shown in FIG. 3 or the process related to the second example shown in FIG. 10.

Consequently, the process of (1) is performed, so that a transmission/reception of various information (that is, information for implementing the power transmission approach) such as parameter information can be securely performed in the power transmission system 1000.

The process (communication channel establishment process) of (1) according to this embodiment is not limited to the processes shown in FIGS. 3 and 10. Although the process in which the power transmission device 100 acquires the power capability information from the power reception device 200 is shown, for example, in FIGS. 3 and 10, the power transmission device 100 may transmit the power capability information, for example, stored by the power transmission device itself, to the power reception device 200. In the above-described case, the power capability information is exchanged between the power transmission device 100 and the power reception device 200.

(2) Power-Parameter Candidate Determination Process

If the encrypted first communication channel is formed by the above-described process (communication channel establishment process) of (1), the power transmission device 100 determines a power transmission type and parameter candidates of power to be transmitted to the power reception device 200, for example, on the basis of the power capability information corresponding to the power transmission device itself and the power capability information acquired from the power reception device 200. More specifically, the power transmission device 100 performs, for example, a process (arbitration process) of (2-1) and a process (calibration process) of (2-2) described below.

Although an example in which the power transmission device 100 performs the process (arbitration process) of (2-1) will be described below, the process (power-parameter candidate determination process) of (2) according to this embodiment is not limited to the above. For example, if the power transmission device 100 and the power reception device 200 exchange the power capability information in the above-described process (communication channel establishment process) of (1), both the power transmission device 100 and the power reception device 200 may perform the process of (2-1), or the power reception device 200 may perform the process of (2-1). In the above-described case, the power transmission device 100 performs the process (calibration process) of (2-2), for example, by acquiring a result of the process of (2-1) in the power reception device 200 from the power reception device 200.

(2-1) Arbitration Process

The power transmission device 100 determines a power transmission type and a parameter type of power to be transmitted to the power reception device 200, for example, on the basis of power capability information corresponding to the power transmission device itself stored in a storage section of the power transmission device itself (to be described later) and the power capability information acquired from the power reception device 200. Here, because the power parameter type determined in the process of (2-1) is determined on the basis of the power capability information acquired from the power reception device 200, the power transmission device 100 can determine parameter candidates of power that does not exceed a power reception capability of the power reception device 200 in the process (calibration process) of (2-2) to be described later.

[Specific Example of Arbitration Process]

Figure 12:
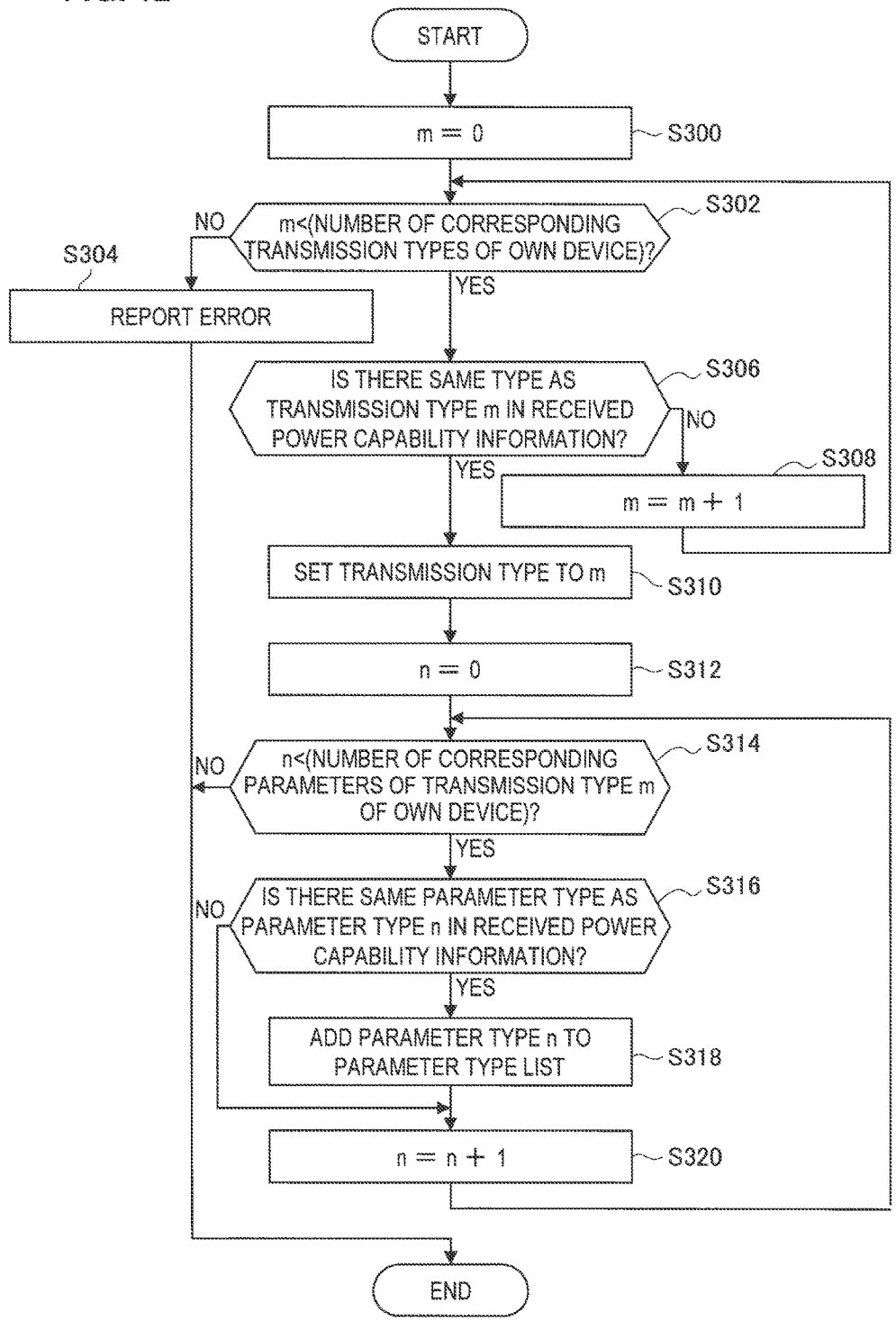
FIG. 12 is a flowchart showing an example of an arbitration process according to an embodiment.

FIG. 12 is a flowchart showing an example of the arbitration process according to this embodiment. Hereinafter, the process shown in FIG. 12, which is performed by the power transmission device 100, will be described. In the above-described process (communication channel establishment process) of (1) in FIG. 12, an example in which the power transmission device 100 acquires the power capability information shown in FIG. 4 from the power reception device 200 and the power transmission device 100 stores the power capability information shown in FIG. 4 will be described.

The power transmission device 100 sets a value of m (where m is an integer equal to or greater than 0) to m=0 (zero) (S300). Here, m is a value for specifying a transmission type of the power transmission device itself, and, for example, corresponds to a number indicating a corresponding transmission type included in a payload of the power capability information shown in FIG. 4. The process of step S300 corresponds to, for example, a process of setting to a minimum value a number indicating the corresponding transmission type included in the payload of the power capability information shown in FIG. 4.

If the process of step S300 is performed, the power transmission device 100 determines whether or not the value of m is less than the number of corresponding transmission types (S302). Here, the power transmission device 100 specifies the number of corresponding transmission types of the power transmission device itself, for example, by referring to the number of corresponding transmission types (B shown in FIG. 4) included in the power capability information corresponding to the power transmission device itself.

If the value of m is determined not to be less than the number of corresponding transmission types of the power transmission device itself in step S302, it indicates that there is no transmission type consistent with the transmission type corresponding to the power transmission device itself and the transmission type corresponding to the power reception device 200 in spite of a process performed for all transmission types corresponding to the power transmission device itself. Consequently, the power transmission device 100 reports an error (S304) and ends the arbitration process. Here, the power transmission device 100 visually reports the error to the user of the power transmission device 100 and/or the user of the power reception device 200 (may be collectively referred to hereinafter as the "user"), for example, by causing a display device (for example, a display section to be described later) included in the power transmission device 100, an external display device, or a display device included in the power reception device 200 to display an error screen. The process of step S304 in the power transmission device 100 is not limited to the above, and for example, the error may be audibly reported to the user by causing an error sound (also including music) to be output from an audio output device included in the power transmission device 100, an external audio output device, or an audio output device included in the power reception device 200.

If the value of m is determined to be less than the number of corresponding transmission types of the power transmission device itself in step S302, the power transmission device 100 determines whether or not there is the same transmission type as transmission type m in the received power capability information (S306).

If it is determined that there is not the same transmission type as the transmission type m in the received power capability information in step S306, the power transmission device 100 updates the value of m to m=m+1 (S308). The power transmission device 100 iterates the process from step S302.

If it is determined that there is the same transmission type as the transmission type m in the received power capability information in step S306, the power transmission device 100 sets the transmission type of power to be transmitted to the power reception device 200 to the transmission type m (S310). Although not shown in FIG. 12, the power transmission device 100 transmits information indicating the transmission type m set in step S310 to the power reception device 200.

Figure 13:
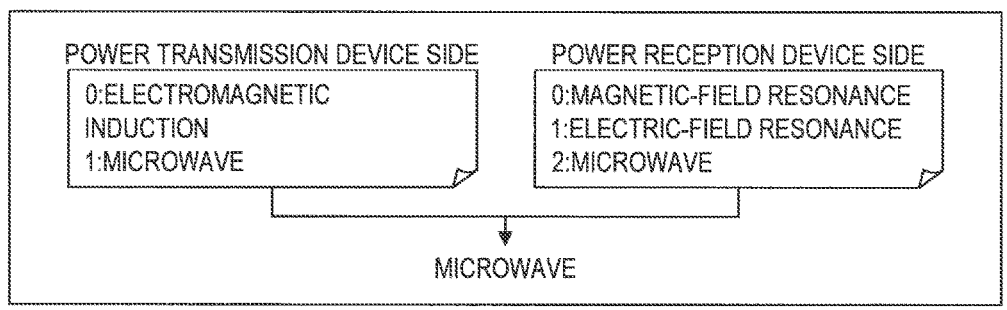
FIG. 13 is an explanatory diagram illustrating a method of determining a power transmission type in the arbitration process according to an embodiment.

FIG. 13 is an explanatory diagram illustrating a method of determining the power transmission type in the arbitration process according to this embodiment. Here, FIG. 13 shows an example of a power transmission type determined by the process of steps S300 to S310 shown in FIG. 12. FIG. 13 shows the case where the transmission type corresponding to the power transmission device 100 is the electromagnetic induction (the above-described first transmission type) and the microwaves (the above-described second transmission type), and the transmission type corresponding to the power reception device 200 is the magnetic-field resonance (the above-described third transmission type), the electric-field resonance (the above-described fourth transmission type), and the microwaves (the above-described second transmission type).

If the transmission types corresponding to the power transmission device 100 and the power reception device 200 are the same as shown in FIG. 13, the power transmission device 100 sets the microwaves (the above-described second transmission type), which is the consistent transmission type, as the transmission type m by performing the process of steps S300 to S310 shown in FIG. 12.

Although the power transmission device 100 sets a first consistent transmission type as the transmission type m if there are a plurality of consistent transmission types when the process of steps S300 to S310 shown in FIG. 12 is performed, the process when there are the plurality of consistent transmission types is not limited to the above. For example, the power transmission device 100 may set a transmission type having a highest priority among the consistent transmission types as the transmission type m on the basis of a priority in a transmission type corresponding to the power transmission device itself. For example, the priority set in the above-described transmission type may be preset, or may be set by the user.

The example of the arbitration process according to this embodiment will be described with reference back to FIG. 12. If the transmission type is set in step S310, the power transmission device 100 sets a value of n (where n is an integer equal to or greater than 0) to n=0 (zero) (S312). Here, n is a value for specifying a corresponding parameter of the transmission type m in the power transmission device itself, and, for example, corresponds to a number indicating a parameter type (for example, F shown in FIG. 4) included in a payload of the power capability information shown in FIG. 4. The process of step S312 corresponds to, for example, a process of setting to a minimum value a number indicating the parameter type included in the payload of the power capability information shown in FIG. 4.

If the process of step S312 is performed, the power transmission device 100 determines whether or not the value of n is less than the number of parameters of the power transmission device itself (S314). Here, the power transmission device 100 specifies the number of corresponding parameters, for example, by referring to the number of corresponding parameters (E shown in FIG. 4) included in the power capability information corresponding to the power transmission device itself.

If the value of n is determined not to be less than the number of corresponding parameters of the power transmission device itself in step S314, the power transmission device 100 ends the arbitration process by determining that the process is performed for all parameter types corresponding to the power transmission device itself.

If the value of n is determined to be less than the number of corresponding parameters of the power transmission device itself in step S314, the power transmission device 100 determines whether or not there is a same parameter type as a parameter type n in the received power capability information (S316).

If it is determined that there is not the same parameter type as the parameter type n in the received power capability information in step S316, a process of step S320 to be described later is performed.

If it is determined that there is the same parameter type as the parameter type n in the received power capability information in step S316, the power transmission device 100 adds information regarding the parameter type n to a parameter type list defining a parameter type of power to be transmitted (S318). Here, for example, the power transmission device 100 records information of a minimum unit of a parameter of the parameter type n (G shown in FIG. 4) included in the payload of the power capability information or information of a parameter movable range (H shown in FIG. 4), and the like as the information regarding the above-described parameter type n.

If it is determined that there is not the same parameter type as the parameter type n in the received power capability information in step S316, or if the process of step S318 is performed, the power transmission device 100 updates the value of n to n=n+1 (S320). The power transmission device 100 iterates the process from step S314.

Figure 14:
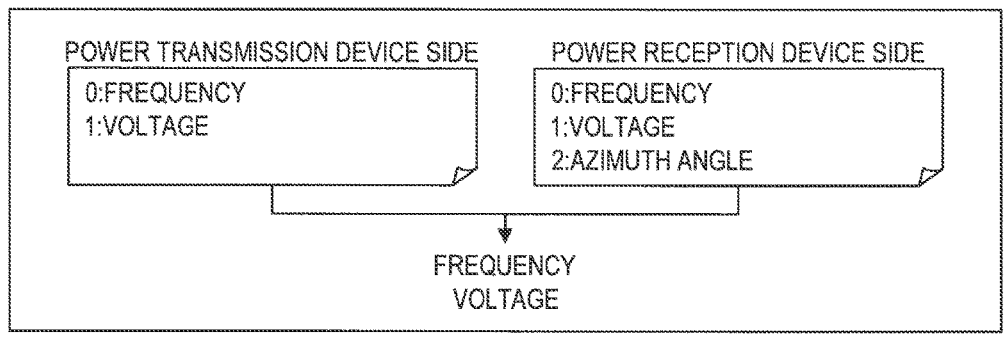
FIG. 14 is an explanatory diagram illustrating a method of determining a parameter type in the arbitration process according to an embodiment.

FIG. 14 is an explanatory diagram illustrating a method of determining a parameter type in the arbitration process according to this embodiment. Here, FIG. 14 shows an example of parameter types to be determined by the process of steps S312 to S320 shown in FIG. 12. In FIG. 14, the case where parameter types corresponding to the power transmission device 100 are a frequency and a voltage and parameter types corresponding to the power reception device 200 are a frequency, a voltage, and an azimuth angle is shown.

If the parameter types corresponding to the power transmission device 100 and the power reception device 200 are the same as shown in FIG. 14, the power transmission device 100 records information regarding the frequency and the voltage that are consistent parameter types in a parameter type list by performing the process of steps S312 to S320 shown in FIG. 12.

The power transmission device 100 determines a power transmission type and a parameter type of power to be transmitted to the power reception device 200, for example, by performing the process shown in FIG. 12. Needless to say, the arbitration process according to this embodiment is not limited to the process shown in FIG. 12.

(2-2) Calibration Process

If the above-described process (arbitration process) of (2-1) is performed, the power transmission device 100 determines parameter candidates of the power to be transmitted to the power reception device 200.

[Specific Example of Calibration Process]

Figure 15:
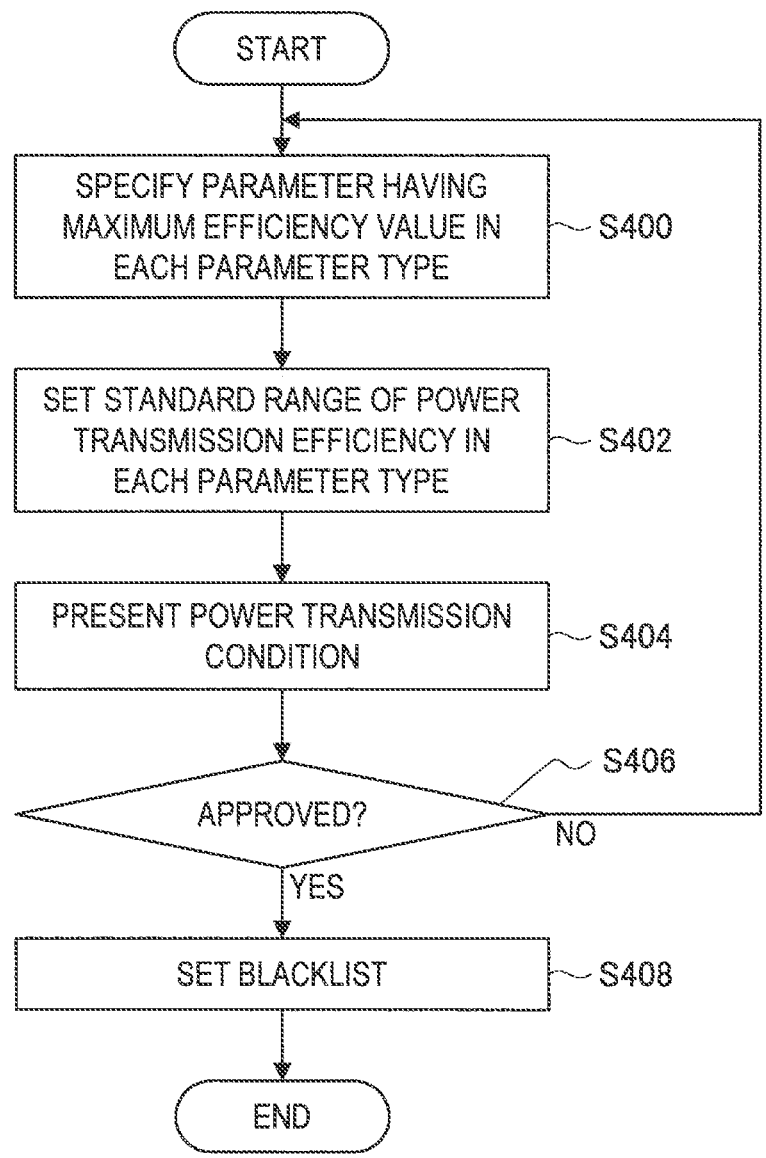
FIG. 15 is a flowchart showing an example of a calibration process in a power transmission device according to an embodiment.

FIG. 15 is a flowchart showing an example of the calibration process in the power transmission device 100 according to this embodiment.

The power transmission device 100 specifies a parameter having a maximum efficiency value in each power parameter type determined in the above-described process of (2-1)

(S400). More specifically, for example, the power transmission device 100 selects one of the parameter types recorded in the parameter type list, and calculates power transmission efficiencies in all possible parameters in the parameter type by carrying out an arithmetic operation shown in Equation 1. For example, the power transmission device 100 fixes a parameter corresponding to another parameter type recorded in the parameter type list when the above-described power transmission efficiency is calculated. The power transmission device 100 specifies a parameter having a maximum efficiency value in each parameter type of power by performing the above-described process for every parameter type recorded in the parameter type list.

Figure 16:
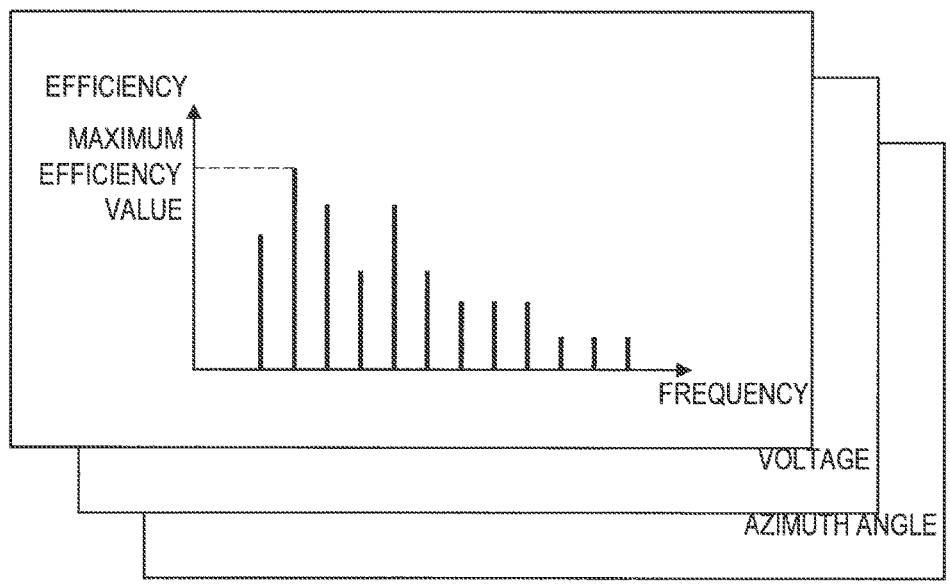
FIG. 16 is an explanatory diagram illustrating a process of specifying a parameter having a maximum efficiency value in a type of a parameter of power in the calibration process of the power transmission device according to an embodiment.

FIG. 16 is an explanatory diagram illustrating a process of specifying a parameter having a maximum efficiency value in a parameter type of power in the calibration process of the power transmission device 100 according to this embodiment. Here, FIG. 16 shows an example in which three parameter types of a frequency, a voltage, and an azimuth angle are recorded in the parameter type list.

For example, when 300 kHz to 600 kHz can be set in units of 30 kHz for a frequency (an example of a parameter type), the power transmission device 100 carries out measurement and arithmetic operations at 11 points in total for the frequency, and fixes the voltage or the azimuth angle, which is another parameter type, to one measurement value during measurement. Through the above, a parameter having the maximum efficiency value at the frequency is specified. The power transmission device 100 specifies parameters having maximum efficiency values by also performing the same process as the process for the above-described frequency for the voltage and the azimuth angle, which are the other parameter types.

Although an example in which a plurality of parameter types are recorded in the parameter type list, for example, as shown in FIG. 16, has been described above, the process in the power transmission device 100 according to this embodiment is not limited to the above. For example, even when one parameter type is recorded in the parameter type list, the power transmission device 100 can specify a parameter having a maximum efficiency value in the parameter type by calculating power transmission efficiencies for all possible parameters.

The example of the calibration process in the power transmission device 100 will be described with reference back to FIG. 15. If the maximum efficiency of each power parameter type is specified in step S400, the power transmission device 100 sets a standard range of the power transmission efficiency (which may hereinafter be referred to as a "standard efficiency range") in each parameter type of the power (S402).

More specifically, as in step S400, the power transmission device 100 selects one of the parameter types recorded in the parameter type list, and calculates power transmission efficiencies for all possible parameters in the selected parameter type. When the above-described power transmission efficiencies are calculated, the power transmission device 100 fixes a parameter of another parameter type recorded in the parameter type list to a parameter having a maximum efficiency value specified in step S400. The power transmission device 100 sets a standard efficiency range on the basis of efficiency distribution data in which the maximum efficiency value obtained by the above-described calculation is on the top. For example, if the top 50% of an efficiency distribution is designated as a standard and 50% is included in a range dropped by 10% from a peak efficiency value, the power transmission device 100 sets 80% to 70% as a standard efficiency range.

Figure 17:
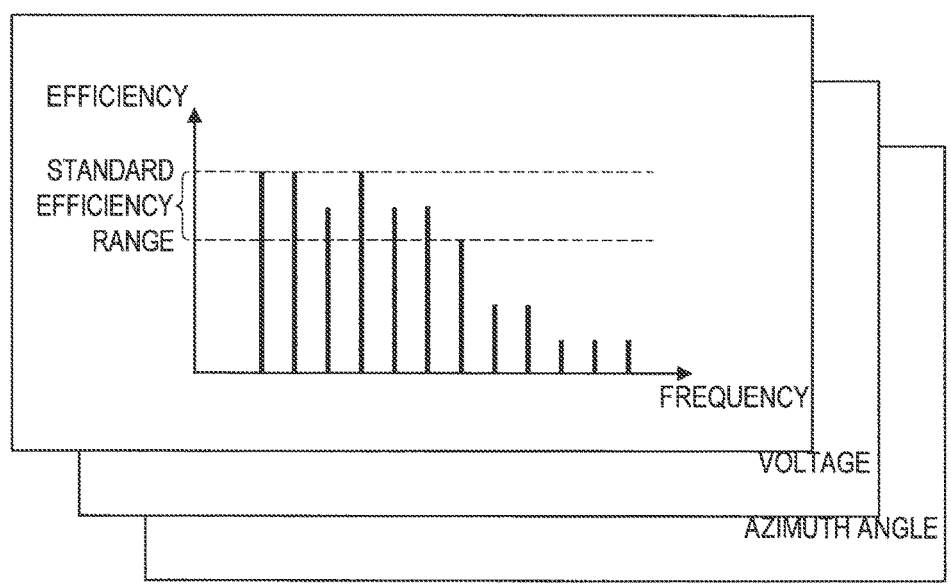
FIG. 17 is an explanatory diagram illustrating a process of setting a standard range of power transmission efficiency in a type of a parameter of power in the calibration process of the power transmission device according to an embodiment.

FIG. 17 is an explanatory diagram illustrating a process of setting a standard range of the power transmission efficiency in a power parameter type in the calibration process of the power transmission device 100 according to this embodiment. Here, FIG. 17 shows an example in which three parameter types of a frequency, a voltage, and an azimuth angle are recorded in the parameter type list as in FIG. 16.

The power transmission device 100 sets the standard range of the power transmission efficiency, for example, by performing the process of steps S400 and S402. In the process of steps S400 and S402, the power transmission device 100 calculates the power transmission efficiency by carrying out an arithmetic operation of the above-described Equation 1 on the basis of the parameter type list created in the above-described process of (2-1). Here, for example, the power to be transmitted in the process related to the calculation of the above-described power transmission efficiency corresponds to the experimental transmission of power by the power transmission device 100 on the basis of a parameter of power that does not exceed the power reception capability of the power reception device 200 indicated by the power capability information. For example, the power transmission efficiency calculated in the process related to the calculation of the above-described power transmission efficiency corresponds to a power transmission efficiency (hereinafter referred to as "third power transmission efficiency") in each parameter of power on the basis of power reception amount information (hereinafter referred to as "second power reception amount information") indicating a power reception amount for every parameter of the power corresponding to the experimentally transmitted power, the power reception amount information having been transmitted from the power reception device 200.

Although an example in which a plurality of parameter types are recorded in the parameter type list, for example, as shown in FIG. 17, has been described above, a process of the power transmission device 100 according to this embodiment is not limited to the above. For example, if one parameter type is recorded in the parameter type list, the power transmission device 100 may not perform the process related to the calculation of the power transmission efficiency in step S402. In the above-described case, the power transmission device 100 can set the standard efficiency range on the basis of efficiency distribution data related to the power transmission efficiency calculated in step S400.

The example of the calibration process of the power transmission device 100 will be described with reference back to FIG. 15. If the standard efficiency range is set in step S402, the power transmission device 100 presents power transmission conditions to the user (S404). Here, examples of the above-described power transmission conditions may be a power transmission unit price and the like.

More specifically, for example, the power transmission device 100 calculates the power transmission unit price corresponding to the set standard efficiency range. The power transmission device 100 transmits information indicating the calculated power transmission unit price to the power reception device 200, so that a power transmission condition is presented, for example, by causing a display device included in the power reception device 200 or an external display device to display the power transmission unit price on a display screen. The power transmission device 100 may present the power transmission condition to the display device (for example, the display section to be described later) included in the power transmission device 100.

FIG. 18 is an explanatory diagram showing an example of the display screen presented to the user in the calibration process of the power transmission device 100 according to this embodiment. FIG. 18 shows an example in which the power transmission device 100 reports the set standard efficiency range to the user and charges a fee for a total amount of power transmission. That is, an example shown in FIG. 18 is an example of a display screen (an example of a power reception side risk-taking type) displayed when payment for a fluctuation of power transmission loss is made at the side of the power reception device 200. As shown in FIG. 18, for example, the fact that power transmission is stopped if the first power transmission efficiency calculated by the above-described Equation 7 is less than a lower limit of the standard efficiency range (an example of a predetermined value) is expressed in the power transmission conditions presented in step S404.

For example, if the standard efficiency range is 70% to 80% when the power can be transmitted at 100 yen per kW, the power transmission device 100 presents 125 yen (100/0.8) to 148 yen (100/0.7) as the power transmission condition. If the first power transmission efficiency is less than 0.7, the power transmission device 100 stops the power transmission in the process (power transmission process) of (3) to be described later.

The display screen to be presented to the user in the calibration process according to this embodiment is not limited to the example shown in FIG. 18 (an example of a power reception side risk-taking type). FIG. 19 is an explanatory diagram showing another example of the display screen presented to the user in the calibration process of the power transmission device 100 according to this embodiment.

FIG. 19 shows an example in which the power transmission device 100 sets a unit price per kW (a uniform unit price not depending upon a fluctuation in actual power transmission) on the basis of the standard efficiency range, and charges a fee corresponding to the set unit price for a total amount of power transmission. That is, an example shown in FIG. 19 is an example of the display screen (an example of a power transmission side risk-taking type) displayed when payment for a fluctuation of power transmission loss is made at the side of the power transmission device 100. As shown in FIG. 19, for example, the fact that power transmission is stopped if the first power transmission efficiency calculated by the above-described Equation 7 is less than a lower limit of the standard efficiency range (an example of a predetermined value) is manifested in the power transmission conditions presented in step S404.

For example, if the standard efficiency range is 70% to 80% when the power can be transmitted at 100 yen per kW, the power transmission device 100 presents 125 yen (100/0.8) as the power transmission condition. If the first power transmission efficiency is less than 0.7 corresponding to the lower limit of the standard efficiency range, the power transmission device 100 stops the power transmission in the process (power transmission process) of (3) to be described later. Needless to say, a unit price to be set when the power transmission device 100 sets a power transmission side risk-taking type of the display screen is not limited to that set on the basis of an upper limit of the standard efficiency range as shown in FIG. 19.

In step S404, the power transmission device 100 presents the power transmission conditions, for example, by presenting the display screen as shown in FIG. 18 or 19, to the user. The power transmission device 100 can also audibly report the power transmission conditions through a sound.

If the power transmission condition is presented in step S404, the power transmission device 100 determines whether or not the presented power transmission condition has been approved (S406). For example, if the power transmission device 100 has received a power transmission start request, transmitted from the power reception device 200, for requesting the transmission of power according to transmitted information indicating a power transmission unit price, the presented power transmission condition is determined to have been approved. Here, the power reception device 200 transmits the power transmission start request, for example, by the user of the power reception device 200 operating the power reception device 200 and selecting an OK button shown in FIG. 18 or 19. The power transmission device 100 starts the process (power transmission process) of (3) to be described later after the process of step S408 to be described later by receiving the power transmission start request.

If it is determined that the presented power transmission condition has not been approved in step S406, the power transmission device 100 iterates the process from step S400. In the above-described case, for example, the power transmission device 100 may make a notification (for example, a visual notification and/or an audible notification) to cause the user to move a position of the power reception device 200 or exclude a device other than the power reception device 200.

If the presented power transmission condition is determined to have been approved in step S406, the power transmission device 100 sets a blacklist in which an excluded parameter unsuitable for power transmission among parameters of the power is recorded (S408). More specifically, for example, if there is a third power transmission efficiency outside the set standard range among the third power transmission efficiencies calculated in step S402, the power transmission device 100 sets a parameter of the power corresponding to the third power transmission efficiency outside the standard range to an exclusion parameter. The power transmission device 100 records the set exclusion parameter in the blacklist.

In the process (power transmission process) of (3) to be described later, the power transmission device 100 generates parameter information excluding the exclusion parameter recorded in the blacklist set in step S408. That is, the power transmission device 100 can more efficiently transmit power because the power is not transmitted on the basis of a parameter unsuitable for the power transmission. A parameter of power not recorded in the blacklist, that is, a parameter of power other than an exclusion parameter, can be a parameter of power to be transmitted to the power reception device 200. Consequently, the power transmission device 100 can determine parameter candidates of power to be transmitted to the power reception device 200 by performing the process of step S408.

Figure 20:
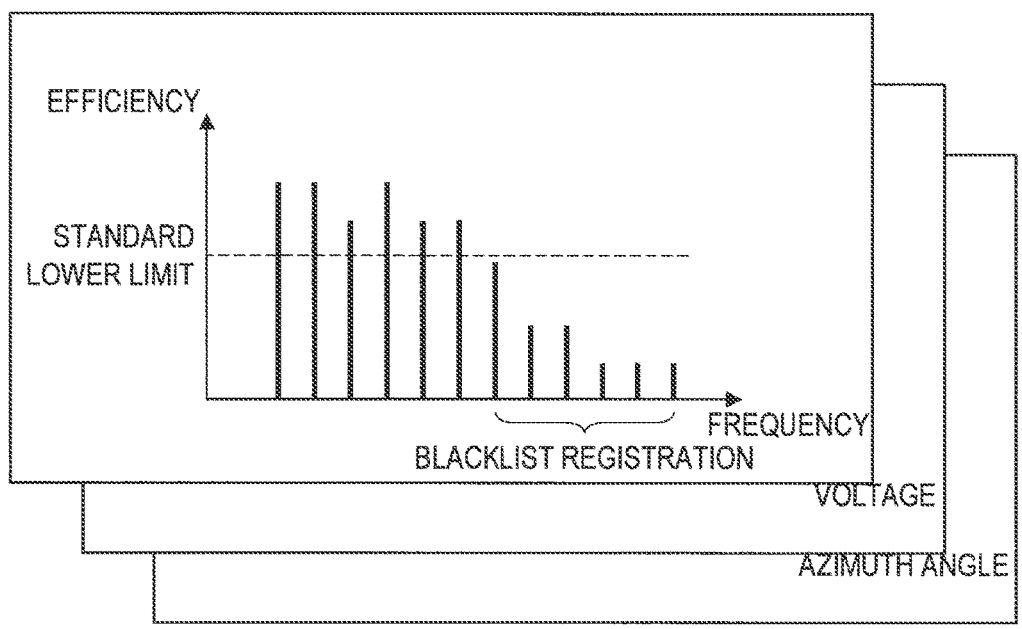
FIG. 20 is an explanatory diagram showing an example of power parameters recorded in a blacklist in the calibration process of the power transmission device according to an embodiment.

FIG. 20 is an explanatory diagram showing an example of a parameter of power to be recorded in the blacklist in the calibration process of the power transmission device 100 according to this embodiment. As shown in FIG. 20, if the third power transmission efficiency calculated in correspondence with each parameter is less than the lower limit of the standard efficiency range, it is recorded in the blacklist as an exclusion parameter.

The power transmission device 100 determines parameter candidates of power to be transmitted to the power reception device 200, for example, by performing the process shown in FIG. 15. Needless to say, the calibration process according to this embodiment is not limited to the process shown in FIG. 15.

In the power transmission system 1000, the power transmission type and the parameter candidates of power to be transmitted by the power transmission device 100 to the power reception device 200 are determined on the basis of the power capability information, for example, by performing the process (arbitration process) of (2-1) and the process (calibration process) of (2-2) as described above.

Process (Power Transmission Process) of (3)

If the above-described process (power-parameter candidate determination process) of (2) is performed, the power transmission device 100 transmits power by setting any one parameter among parameter candidates as a parameter to be transmitted for every session.

Figure 21:
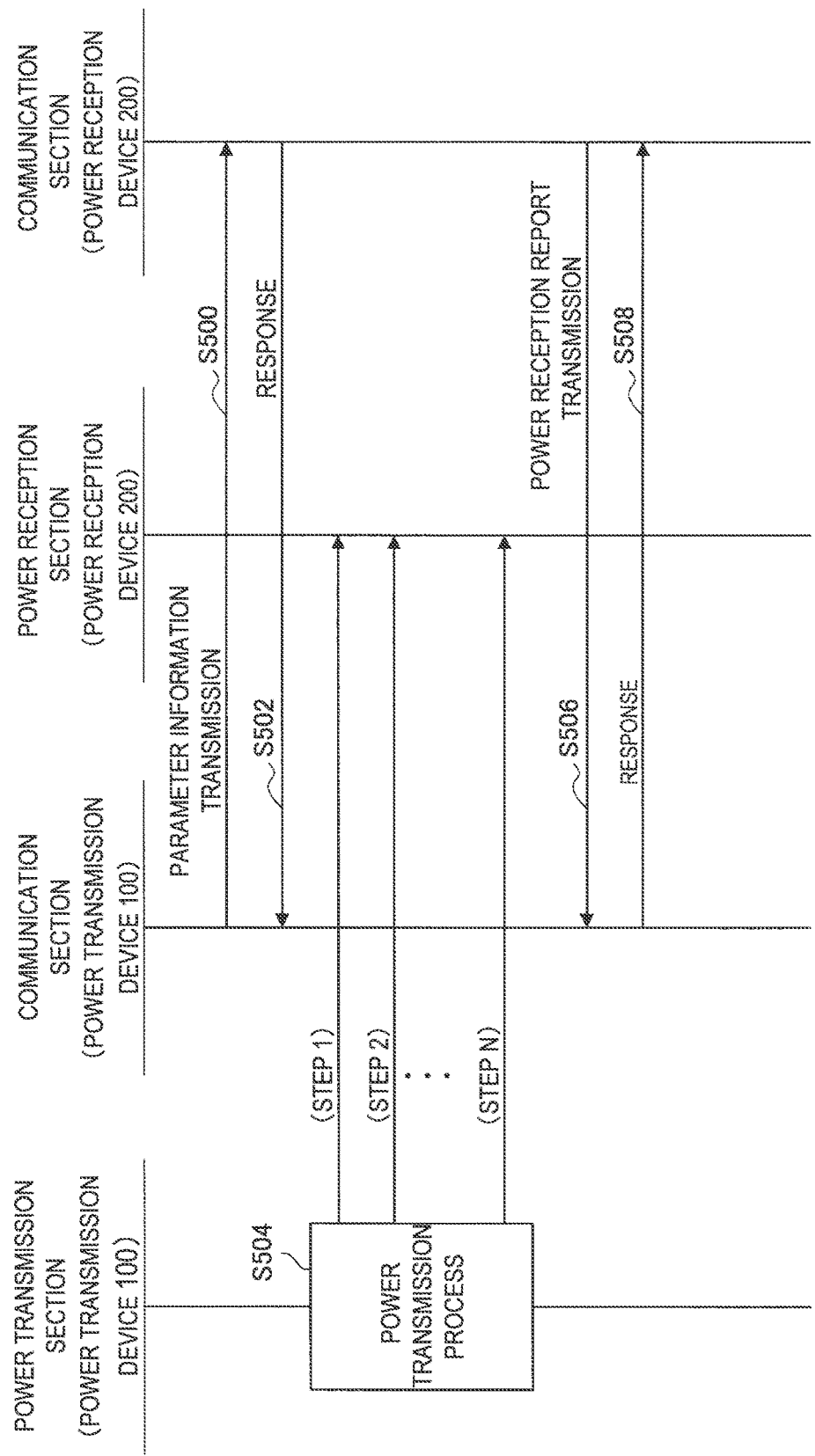
FIG. 21 is an explanatory diagram showing an example of a power transmission process in the power transmission system according to an embodiment.

FIG. 21 is an explanatory diagram showing an example of the power transmission process in the power transmission system 1000 according to this embodiment. Here, FIG. 21 shows an example of the power transmission process in one session (power transmission period). In the power transmission system 1000, the process shown in FIG. 21 is performed for every session.

In FIG. 21, a communication section (to be described later) and a power transmission section (to be described later) among configurations of the power transmission device 100 are shown, and a communication section (to be described later) and a power reception section (to be described later) among configurations of the power reception device 200 are shown. The communication section of the power transmission device 100 and the communication section of the power reception device 200 perform a communication via the encrypted first communication channel, or the power transmission section of the power transmission device 100 and the power reception section of the power reception device 200 transmit and receive power on the basis of a transmission type and a parameter defined by parameter information. Hereinafter, the process to be performed by the communication section or the power transmission section of the power transmission device 100 will be described as the process to be performed by the power transmission device 100, and the process to be performed by the communication section or the power reception section of the power reception device 200 will be described as the process to be performed by the power reception device 200.

The power transmission device 100 transmits the parameter information to the power reception device 200 (S500). For example, the process (power transmission process) of (3) in the power transmission device 100, such as a process of generating the parameter information, will be described later.

Figure 22:
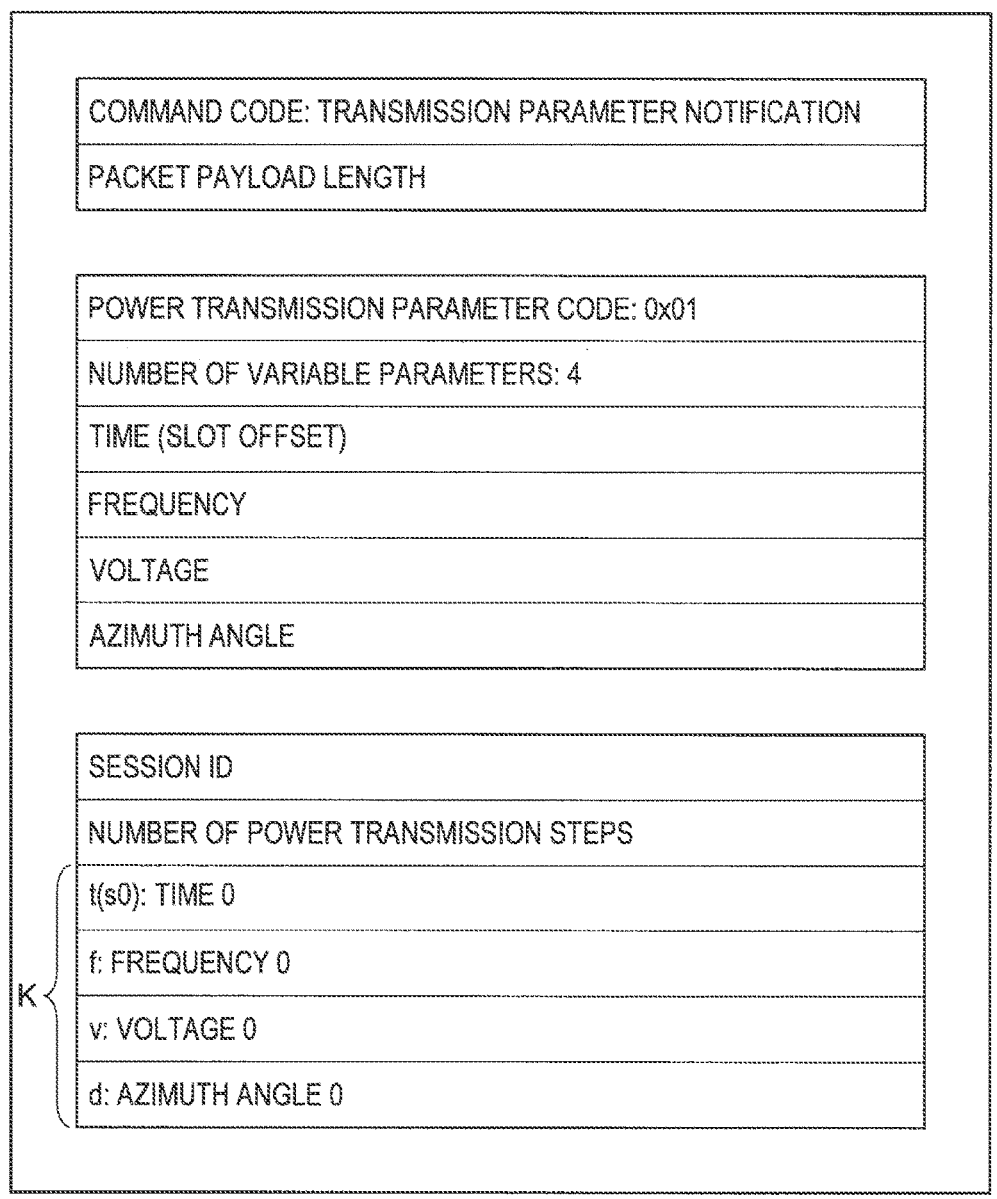
FIG. 22 is an explanatory diagram showing an example of parameter information to be transmitted by the power transmission device according to an embodiment.

FIG. 22 is an explanatory diagram showing an example of parameter information to be transmitted by the power transmission device 100 according to this embodiment. The parameter information is generated for every session. Parameters (K shown in FIG. 22) to be used for the transmission of power in the session are included in the parameter information. The parameter information according to this embodiment is not limited to the example shown in FIG. 22.

Figure 23:
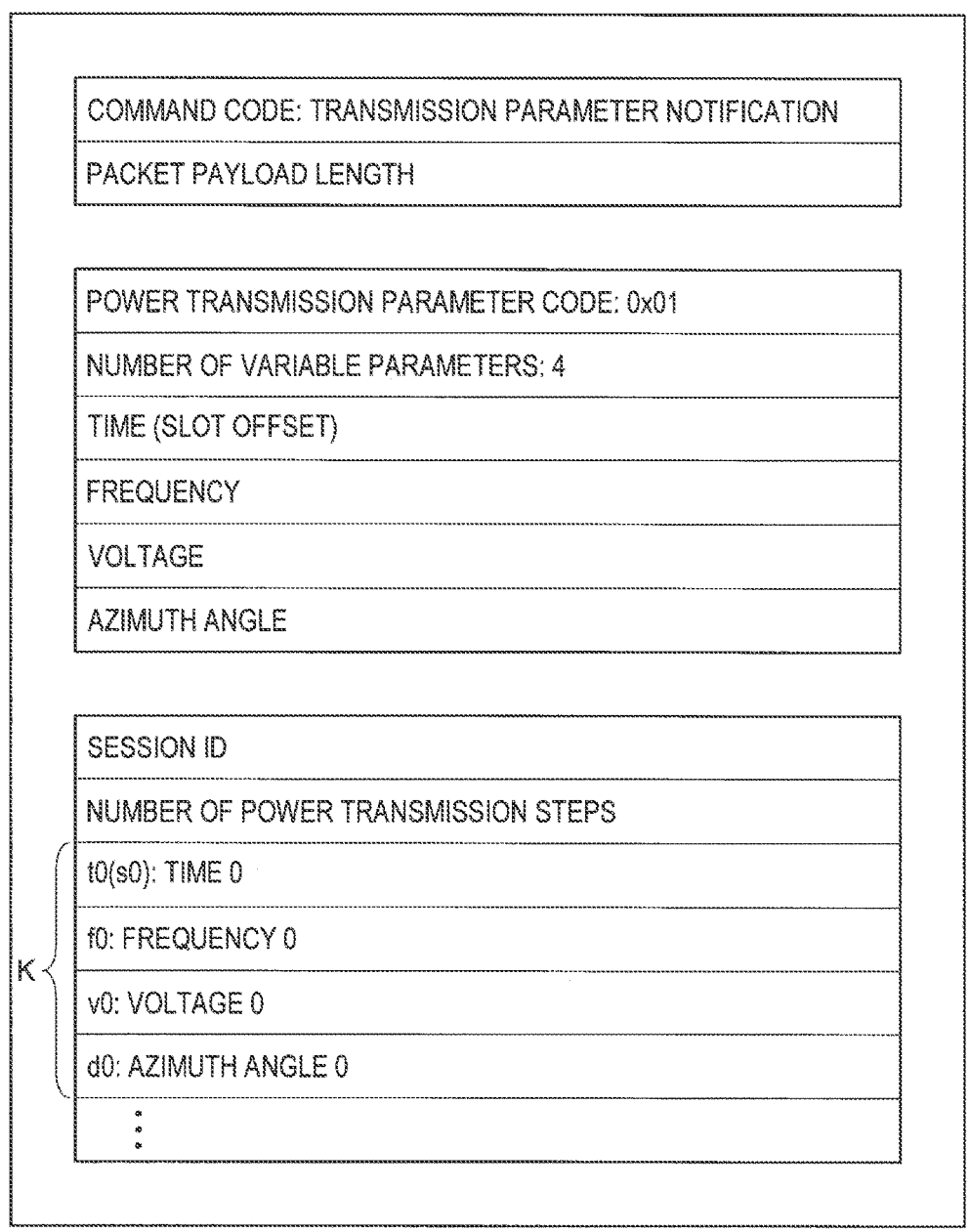
FIG. 23 is an explanatory diagram showing another example of the parameter information to be transmitted by the power transmission device according to an embodiment.

FIG. 23 is an explanatory diagram showing another example of parameter information to be transmitted by the power transmission device 100 according to this embodiment. The parameter information shown in FIG. 23 is generated for every session and the parameters (K shown in FIG. 23) of which the number corresponds to the number of steps in the session are included in the parameter information. The parameter in each step is set at random among parameter candidates. Needless to say, the parameter information according to this embodiment is not limited to the examples shown in FIGS. 22 and 23.

The example of the power transmission process in the power transmission system 1000 will be described with reference back to FIG. 21. The power reception device 200 receiving the parameter information transmitted from the power transmission device 100 in step S500 makes a response in response to a receipt of the parameter information (S502).

Figure 24:
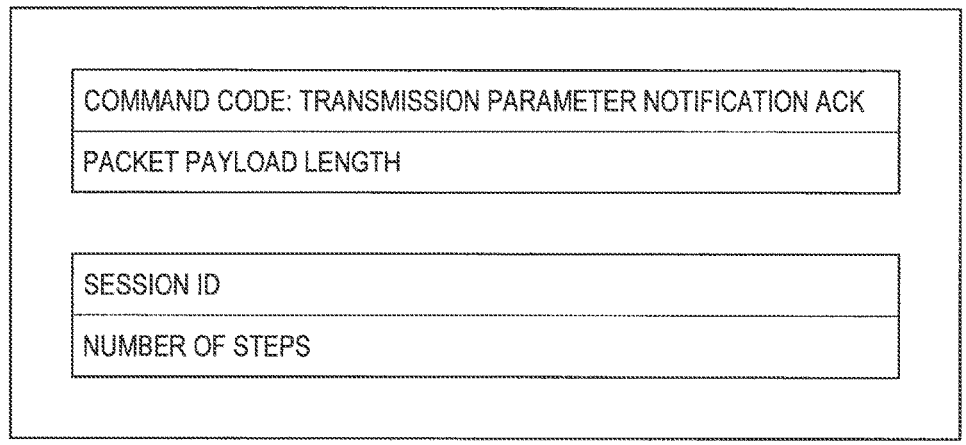
FIG. 24 is an explanatory diagram showing an example of a packet to be transmitted when a power reception device makes a response in response to a receipt of the parameter information according to an embodiment.

FIG. 24 is an explanatory diagram showing an example of a packet to be transmitted when the power reception device 200 makes a response in response to a receipt of the parameter information according to this embodiment. Here, FIG. 24 shows an example of an acknowledgement (ACK) packet. Needless to say, the packet to be transmitted when the power reception device 200, according to this embodiment, makes the response in response to the receipt of the parameter information is not limited to the example shown in FIG. 24.

The example of the power transmission process in the power transmission system 1000 will be described with reference back to FIG. 21. The power transmission device 100 receiving the response transmitted from the power reception device 200 in step S502 performs the power transmission using a parameter included in the transmitted parameter information if the response indicates an ACK (S504). For example, the power transmission device 100 may re-perform the process of step S500 and stop the power transmission by reporting the error to the user, if the response transmitted from the power reception device 200 in step S502 is a negative acknowledgement (NACK).

Figure 25:
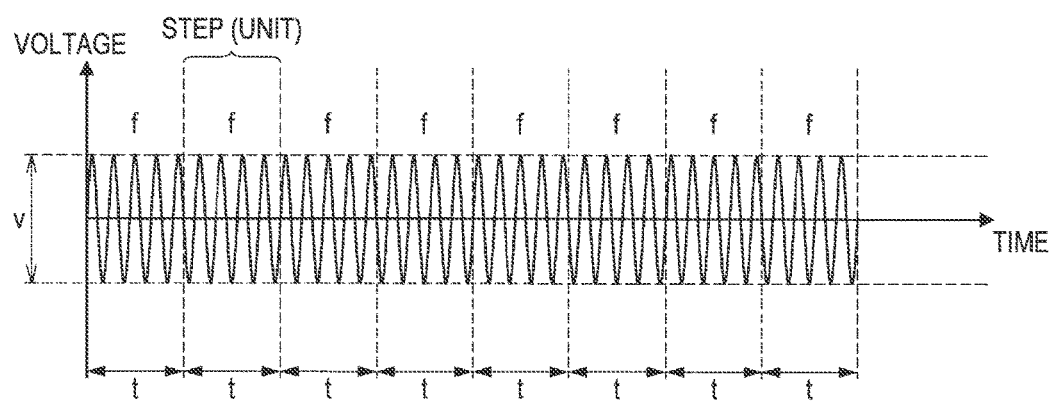
FIG. 25 is an explanatory diagram showing an example of power transmitted by the power transmission device on the basis of the parameter information according to an embodiment.
Figure 26:
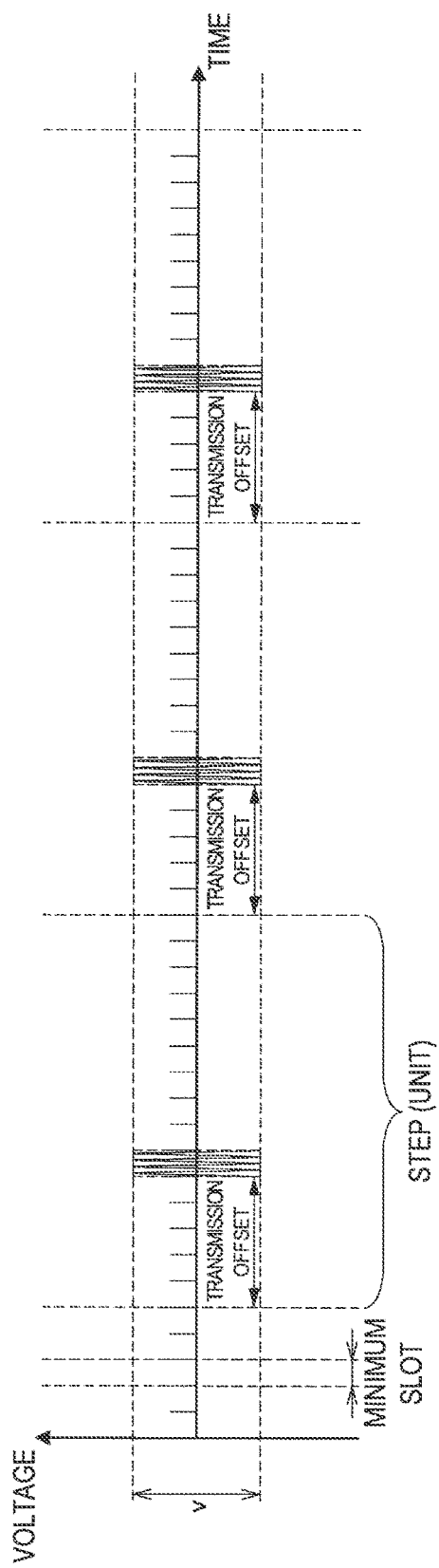
FIG. 26 is an explanatory diagram showing an example of power transmitted by the power transmission device on the basis of the parameter information according to an embodiment.
Figure 27:
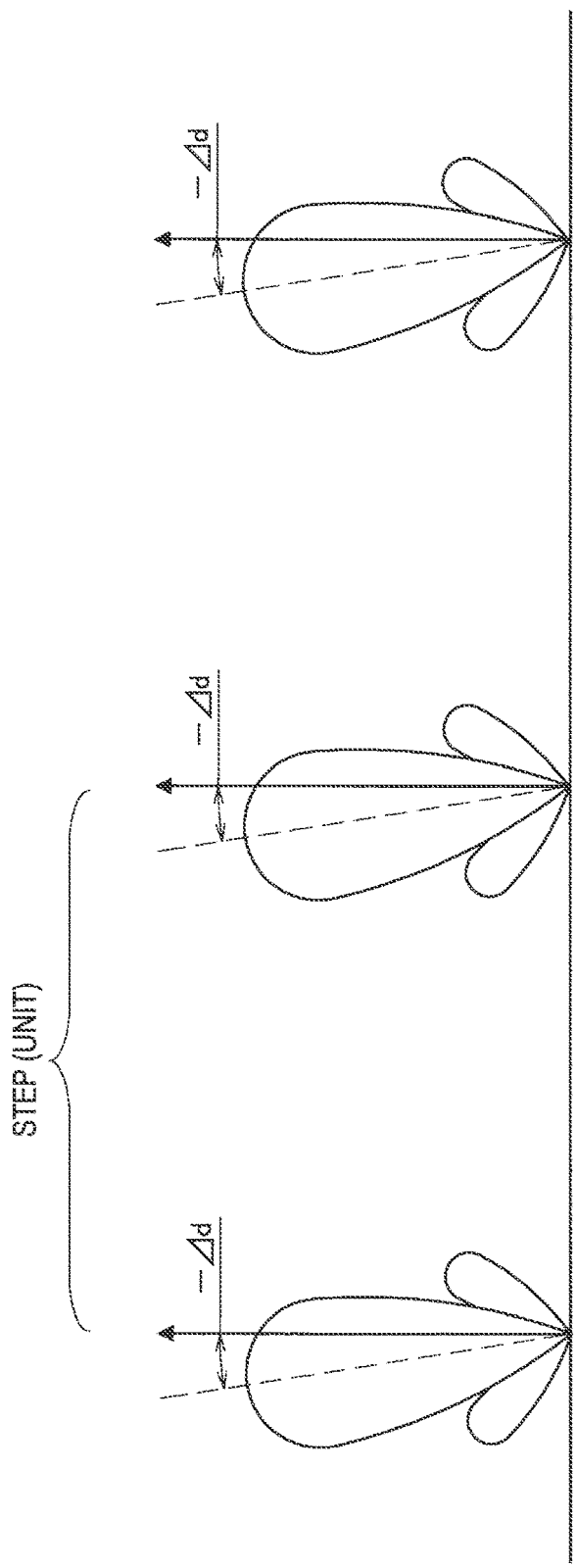
FIG. 27 is an explanatory diagram showing an example of power transmitted by the power transmission device on the basis of the parameter information according to an embodiment.

FIGS. 25 to 27 are explanatory diagrams showing examples in which the power transmission device 100 according to this embodiment transmits power on the basis of the parameter information. Here, FIGS. 25 to 27 show the examples in which the power transmission device 100, according to this embodiment, transmits power on the basis of the parameter information shown in FIG. 22. FIG. 25 shows an example in which power is transmitted by a continuous wave, and a frequency (f shown in FIG. 25), a voltage (v shown in FIG. 25), and a power transmission time (t shown in FIG. 25) are set on the basis of the parameter information in each step. FIG. 26 shows an example in which power is transmitted in a time division type, and a frequency (f shown in FIG. 26), a voltage (v shown in FIG. 26), and a power transmission slot offset are set on the basis of the parameter information in each step. FIG. 27 is an example in which an azimuth angle is controlled on the basis of parameter information, and the azimuth angle is set on the basis of the parameter information.

Power to be transmitted by the power transmission device 100 according to this embodiment on the basis of the parameter information is not limited to the examples shown in FIGS. 25 and 27. For example, if the power transmission device 100 transmits the power in the time division type, a minimum slot shown in FIG. 26 may be variable and/or the power may be continuously transmitted in a period of a plurality of minimum slots.

For example, if the parameter information shown in FIG. 23 is transmitted in step S500, the power transmission device 100 can also transmit power on the basis of parameter information in which a parameter of power to be transmitted for every session is set at random.

Figure 28:
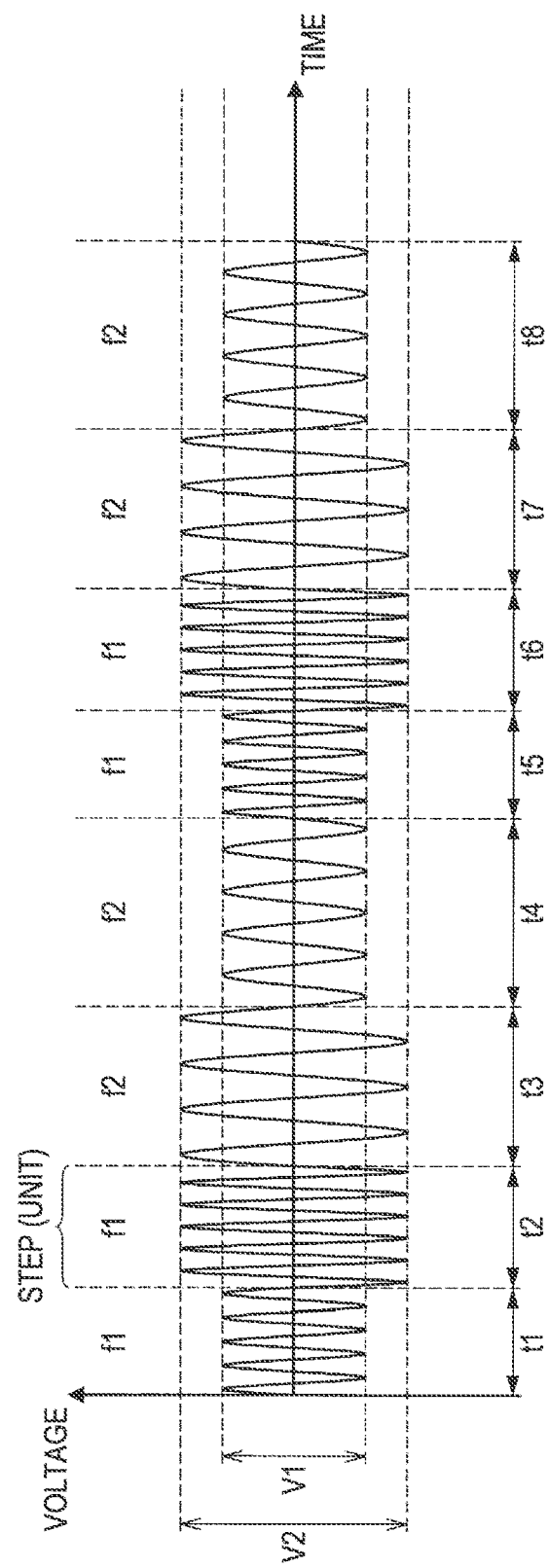
FIG. 28 is an explanatory diagram showing another example of power transmitted by the power transmission device on the basis of the parameter information according to an embodiment.
Figure 29:
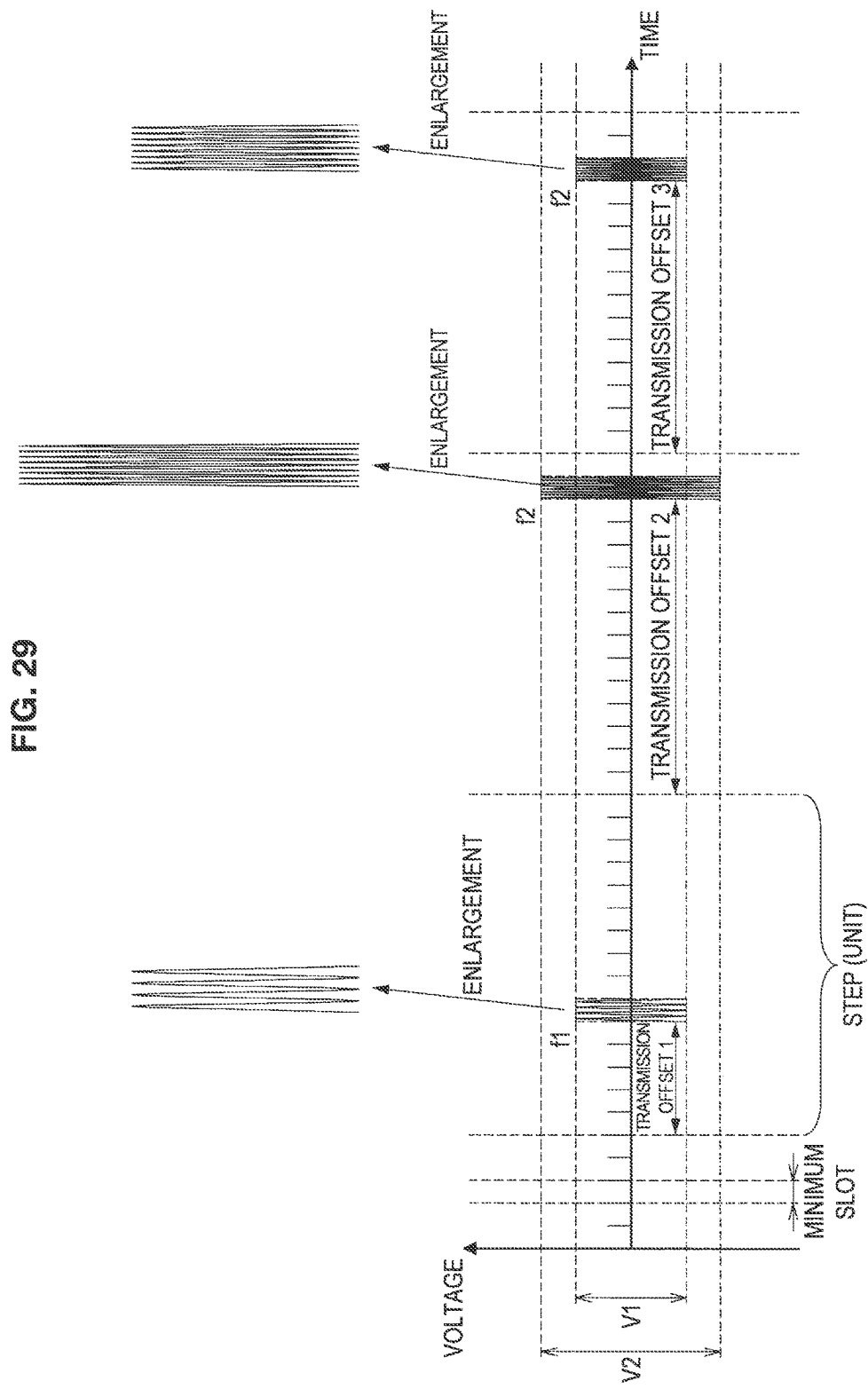
FIG. 29 is an explanatory diagram showing another example of power transmitted by the power transmission device on the basis of the parameter information according to an embodiment.
Figure 30:
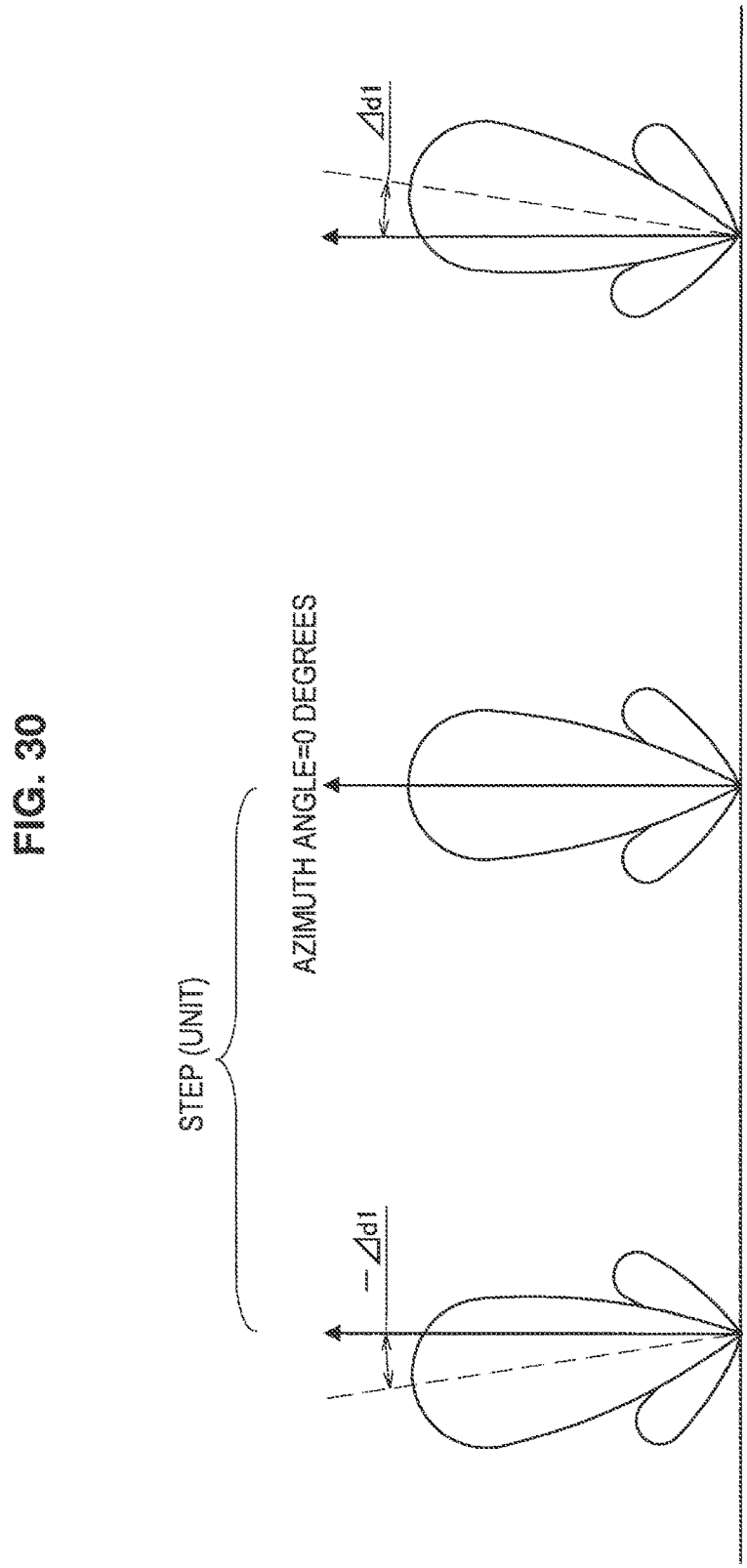
FIG. 30 is an explanatory diagram showing another example of power transmitted by the power transmission device on the basis of the parameter information according to an embodiment.

FIGS. 28 to 30 are explanatory diagrams showing other examples in which the power transmission device 100 transmits power on the basis of parameter information. Here, FIGS. 28 to 30 show examples of power to be transmitted by the power transmission device 100 on the basis of the parameter information shown in FIG. 23. FIG. 28 shows an example in which power is continuously transmitted as in FIG. 25, and a frequency (f shown in FIG. 28), a voltage (v shown in FIG. 28), and a power transmission time (t shown in FIG. 28) are variable on the basis of the parameter information in each step. A minimum slot shown in FIG. 29 may be variable, and/or power may be continuously transmitted in a period of a plurality of minimum slots. FIG. 29 shows an example in which power is transmitted in a time division type as in FIG. 26, and a frequency (f shown in FIG. 29), a voltage (v shown in FIG. 29), and a power transmission slot offset are variable on the basis of the parameter information in each step. FIG. 30 shows an example in which an azimuth angle is controlled on the basis of the parameter information as in FIG. 27, and the azimuth angle is variable on the basis of the parameter information.

The example of the power transmission process in the power transmission system 1000 will be described with reference back to FIG. 21. The power reception device 200 receiving the power transmitted in step S504 on the basis of the parameter information received in step S500 transmits a power reception report (S506).

Figure 31:
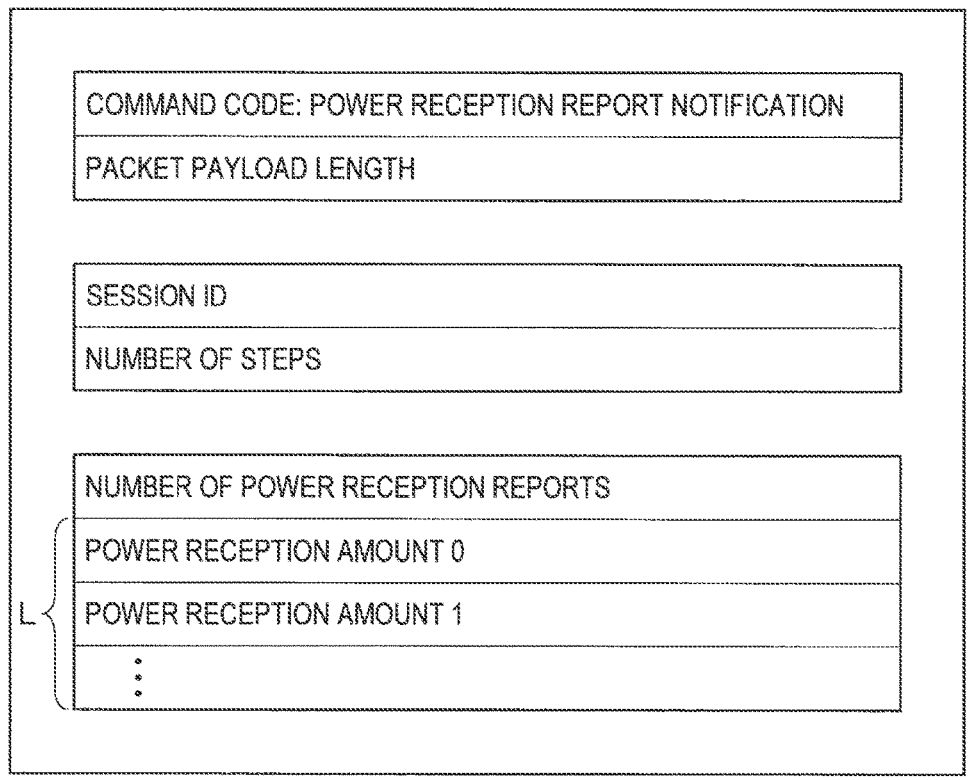
FIG. 31 is an explanatory diagram showing an example of a power reception report to be transmitted by the power reception device according to an embodiment.

FIG. 31 is an explanatory diagram showing an example of the power reception report transmitted by the power reception device 200 according to this embodiment. First power reception amount information (L shown in FIG. 31; each power reception amount is indicated, for example, in watts) indicating a power reception amount for every power parameter indicated by the parameter information is included in the power reception report. Needless to say, the power reception report according to this embodiment is not limited to the example shown in FIG. 31.

The example of the power transmission process in the power transmission system 1000 will be described with reference back to FIG. 21. The power transmission device 100 receiving the power reception report transmitted from the power reception device 200 in step S506 makes a response in response to a receipt of the power reception report (S508).

Figure 32:
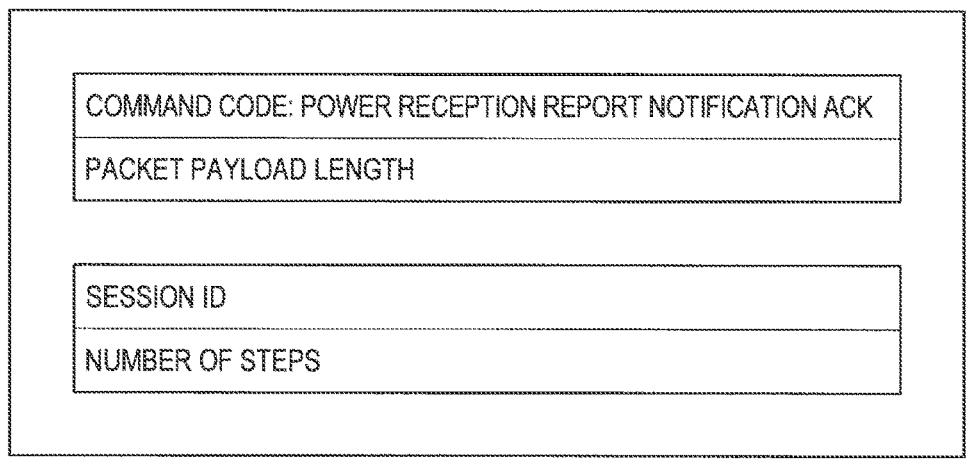
FIG. 32 is an explanatory diagram showing an example of a packet to be transmitted when the power transmission device makes a response in response to a receipt of the power reception report according to an embodiment.

FIG. 32 is an explanatory diagram showing an example of a packet to be transmitted when the power transmission device 100 makes a response in response to a receipt of the power reception report according to this embodiment. Here, FIG. 32 is an example of an ACK packet. Needless to say, the packet to be transmitted when the power transmission device 100 makes the response in response to the receipt of the power reception report according to this embodiment is not limited to the example shown in FIG. 32.

In the power transmission system 1000, for example, the process shown in FIG. 21 in each session (power transmission period) is performed between the power transmission device 100 and the power reception device 200. Next, the process (power transmission process) of (3) in the power transmission device 100 will be more specifically described.

[Specific Example of Power Transmission Process in Power Transmission Device 100]

Figure 33:
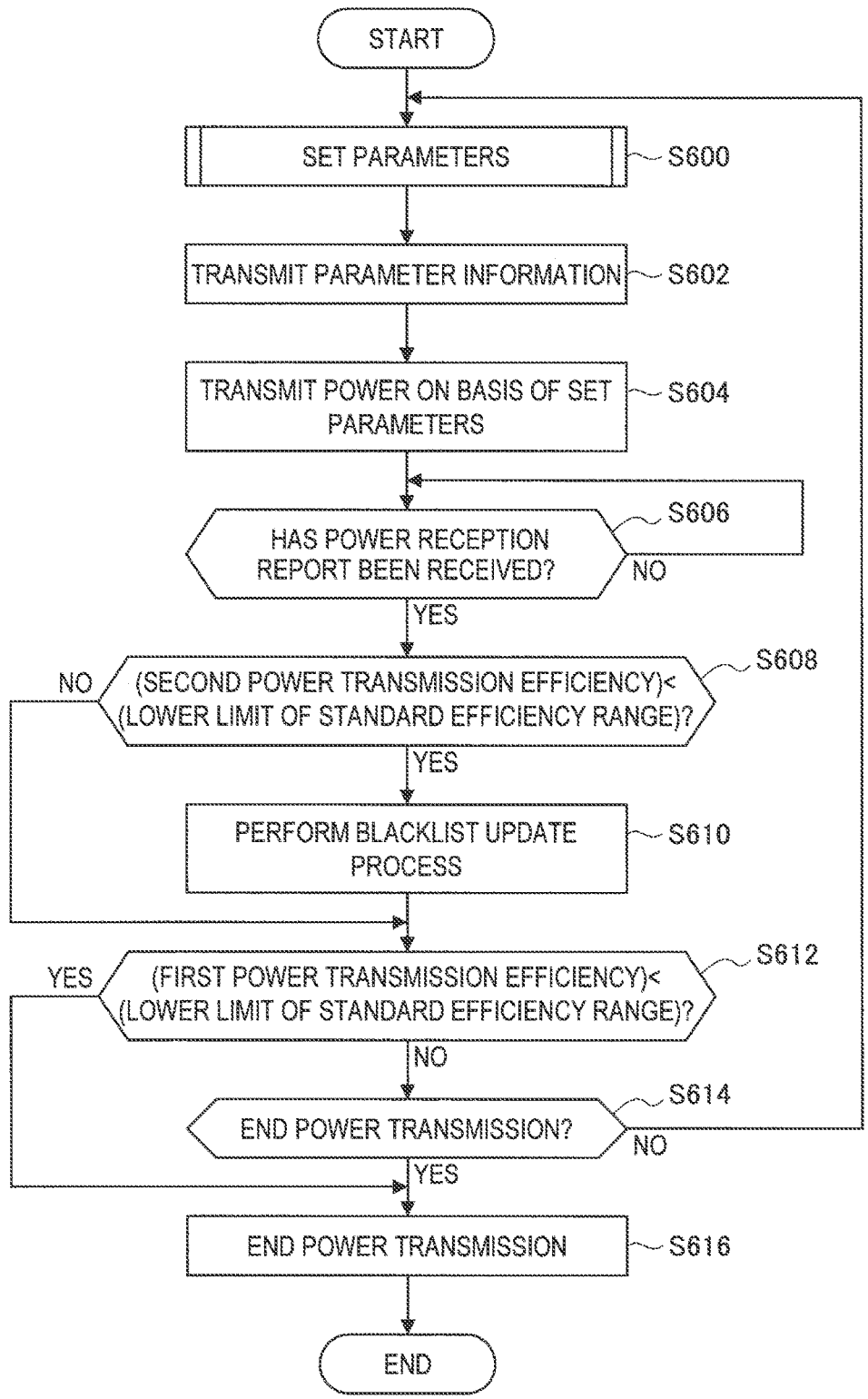
FIG. 33 is a flowchart showing an example of the power transmission process of the power transmission device according to an embodiment.

FIG. 33 is a flowchart showing an example of the power transmission process in the power transmission device 100 according to this embodiment. Here, a process of steps S600 to S612 shown in FIG. 33 corresponds to the power transmission process in one session (power transmission period).

The power transmission device 100 sets parameters (S600: parameter setting process). Here, for example, the power transmission device 100 sets the parameters by selecting one parameter at random among parameter candidates set in the above-described process (power-parameter candidate determination process) of (2) when the parameter information shown in FIG. 22 is transmitted in step S602 to be described later. A method of setting parameters in the power transmission device 100 according to this embodiment is not limited to the above.

<Other Example of Parameter Setting Process in Power Transmission Device 100>

FIG. 34 is a flowchart showing an example of the parameter setting process in the power transmission device 100 according to this embodiment. Here, FIG. 34 shows an example of the parameter setting method when the power transmission device 100 transmits the parameter information shown in FIG. 23 in step S602 of FIG. 33 to be described later.

The power transmission device 100 sets the value of n to n=0 (zero) (S700). Here, for example, the value of n indicates a number indicating a parameter type recorded in a parameter type list.

If the process of step S700 is performed, the power transmission device 100 determines whether or not the value of n is less than the number of parameter types recorded in the parameter type list (S702).

If the value of n is determined not to be less than the number of parameter types recorded in the parameter type list in step S702, the power transmission device 100 ends the parameter setting process.

If the value of n is determined to be less than the number of parameter types recorded in the parameter type list in step S702, the power transmission device 100 inputs a random number to a PN code, and calculates a random sequence from 0 to M−1 (the total number of steps per session) in each step (S704).

If the process of step S704 is performed, the power transmission device 100 derives a parameter corresponding to a parameter type n (S706). The power transmission device 100 performs the process of step S706, for example, by use of a conversion table corresponding to the parameter type n.

FIG. 35 is an explanatory diagram showing an example of a conversion table used by the power transmission device 100 to derive a parameter corresponding to a certain parameter type according to this embodiment. Here, FIG. 35 shows an example of the conversion table when the parameter type is a frequency. M shown in FIG. 35 indicates an exclusion parameter or a parameter (which is a parameter unused in power transmission; hereinafter, the parameter may be referred to as a "non-use parameter") newly recorded in the blacklist in step S610 of FIG. 33 to be described later. The power transmission device 100 updates the conversion table, for example, associated with the blacklist set in step S408 of FIG. 15. The conversion table according to this embodiment may function as the backlist itself. Needless to say, the conversion table according to this embodiment is not limited to FIG. 33.

The example of the parameter setting process in the power transmission device 100 will be described with reference back to FIG. 34. If the process of step S706 is performed, the power transmission device 100 updates the value of n to n=n+1 (S708).

The power transmission device 100 iterates the process from step S702.

The power transmission device 100 can set a random parameter for every step for each parameter type recorded in a parameter type list, for example, by performing the process shown in FIG. 34.

When the parameter information shown in FIG. 23 is transmitted in step S602 of FIG. 33 to be described later, the parameter setting process in the power transmission device 100 according to this embodiment is not limited to the process shown in FIG. 34. FIG. 36 is a flowchart showing another example of the parameter setting process in the power transmission device 100 according to this embodiment. Here, like FIG. 34, FIG. 36 shows an example of the parameter setting method when the power transmission device 100 transmits the parameter information shown in FIG. 23 in step S602 of FIG. 33 to be described later.

The power transmission device 100 sets the value of n to n=0 (zero) as in step S700 of FIG. 34 (S800).

If the process of step S800 is performed, the power transmission device 100 determines whether or not the value of n is less than the number of parameter types recorded in the parameter type list as in step S702 of FIG. 34 (S802).

If the value of n is determined not to be less than the number of parameter types recorded in the parameter type list in step S802, the power transmission device 100 ends the parameter setting process.

If the value of n is determined to be less than the number of parameter types recorded in the parameter type list in step S802, the power transmission device 100 inputs a random number to a PN code, and calculates a random sequence from 0 to M−1 (the total number of steps per session) in each step as in step S704 of FIG. 34 (S804).

If the process of step S804 is performed, the power transmission device 100 derives a parameter corresponding to a parameter type n (S806). The power transmission device 100 performs the process of step S806, for example, using a conversion table corresponding to the parameter type n.

FIG. 37 is an explanatory diagram showing another example of the conversion table used by the power transmission device 100 to derive a parameter corresponding to a certain parameter type according to this embodiment. Here, like FIG. 35, FIG. 37 shows an example of the conversion table when the parameter type is a frequency. N shown in FIG. 37 indicates an exclusion parameter, and O shown in FIG. 37 indicates a parameter (non-use parameter) newly recorded in the blacklist in step S610 of FIG. 33 to be described later.

A blacklist shown in FIG. 37 is a flag indicating a parameter recorded in the blacklist. In FIG. 37, the flag of "1" indicates that there is a parameter recorded in each blacklist. A blacklist candidate shown in FIG. 37 indicates a parameter that is likely to be registered in the blacklist.

More specifically, the power transmission device 100 sets a target parameter to a non-use candidate parameter serving as a non-use parameter candidate, for example, in step S610 of FIG. 33 to be described later, and updates a value of a blacklist candidate corresponding to the non-use candidate parameter every time the non-use candidate parameter is set. The power transmission device 100 sets a parameter of power, which is set to a non-use candidate parameter a predetermined number of times (for example, five times in an example shown in FIG. 37) in a fixed period, to a non-use parameter. The power transmission device 100 updates a blacklist value corresponding to a parameter set to the non-use parameter to "1" (blacklist).

For example, the power transmission device 100 may periodically or aperiodically release the setting of the non-use parameter or the non-use candidate parameter set in FIG. 37. Here, a parameter of power corresponding to a non-use parameter or a non-use candidate parameter according to this embodiment does not correspond to the exclusion parameter. That is, even when the above-described parameter is registered in the blacklist as the non-use parameter, it is possible to normally re-transmit/re-receive power if an environment according to power transmission in the power transmission system 1000 is varied. Consequently, the power transmission device 100 sets as many power parameters as possible to be used for power transmission by periodically or aperiodically releasing the setting of the non-use parameter or the non-use candidate parameter as described above, thereby preventing unauthorized power reception by a device other than the power reception device 200.

Needless to say, the conversion table according to this embodiment is not limited to FIG. 37.

Another example of the parameter setting process in the power transmission device 100 will be described with reference back to FIG. 36. If the process of step S806 is performed, the power transmission device 100 determines whether or not the parameter derived in step S806 is registered in the blacklist (S808). The power transmission device 100 determines whether the parameter set for each step is registered in the blacklist, for example, by referring to the conversion table shown in FIG. 37.

If it is determined that there is a parameter registered in the blacklist in step S808, the parameter sequence calculated in step S804 is updated by the newly generated random number value (S810), and the process from step S806 is re-performed.

If it is determined that there is not the parameter registered in the blacklist in step S808, the power transmission device 100 updates the value of n to n=n+1 as in step S708 of FIG. 34 (S812). The power transmission device 100 iterates the process from step S802.

The power transmission device 100 can set a random parameter for every step in each parameter type recorded in the parameter type list, as in the case where the process shown in FIG. 34 is performed, for example, by performing the process shown in FIG. 36.

When the parameter information shown in FIG. 23 is transmitted in step S602 of FIG. 33 to be described later, the power transmission device 100 sets a parameter, for example, by performing the process shown in FIG. 34 or 36. Needless to say, the parameter setting process in the power transmission device 100 according to this embodiment is not limited to the processes shown in FIGS. 34 and 36 when the parameter information shown in FIG. 23 is transmitted in step S602 of FIG. 33 to be described later.

The example of the power transmission process in the power transmission device 100 will be described with reference back to FIG. 33. If a parameter is set in step S600, the power transmission device 100 generates parameter information including a parameter set for every step, and transmits the parameter information to the power reception device 200 (S602). Here, the process of step S602 corresponds to the process of step S500 in FIG. 21.

Upon receipt of a response (for example, a response packet indicating the ACK shown in FIG. 24) from the power reception device 200 to the parameter information transmitted in step S602, the power transmission device 100 transmits power on the basis of the parameter information, that is, on the basis of the set parameter (S604). Here, the process of step S604 corresponds to the process of step S504 in FIG. 21.

If the power is transmitted in step S604, the power transmission device 100 determines whether or not a power reception report has been received (S606). If the power reception report is determined not to have been received in step S606, the power transmission device 100 does not perform the process until the power reception report is received. If the power reception report is not received a predetermined time after the power is transmitted, the power transmission device 100 may end the power transmission (timeout), for example, without transmitting power in a subsequent session.

If the power reception report is determined to have been received in step S606, the power transmission device 100 calculates a second power transmission efficiency (power transmission efficiency of every session), and determines whether or not the second power transmission efficiency is less than the lower limit of the standard efficiency range (S608).

If the second power transmission efficiency is determined not to be less than the lower limit of the standard efficiency range in step S608, the power transmission device 100 performs a process of step S612 to be described later.

If the second power transmission efficiency is determined to be less than the lower limit of the standard efficiency range in step S608, the power transmission device 100 performs a blacklist update process (S610).

More specifically, if the second power transmission efficiency is determined to be less than the lower limit of the standard efficiency range, the power transmission device 100 sets a non-use parameter, for example, on the basis of a parameter of the power indicated by parameter information corresponding to a session for which the second power transmission efficiency is calculated. The power transmission device 100 performs the process of step S610, for example, by recording a parameter set to the non-use parameter in the blacklist.

Here, for example, the power transmission device 100 immediately sets a parameter of power indicated by the above-described parameter information to the non-use parameter, but the process in the power transmission device 100 is not limited to the above. For example, the power transmission device 100 can set each parameter of power indicated by the above-described parameter information to the non-use candidate parameter, and, for example, can set a parameter of power, which is set to the non-use candidate parameter a predetermined number of times in a fixed period, to the non-use parameter. For example, the power transmission device 100 may periodically or aperiodically release the setting of the set non-use parameter or non-use candidate parameter. When power is transmitted on the basis of parameter information in which the parameter shown in FIG. 23 is set at random in step S604, the power transmission device 100 may update, for example, the conversion table shown in FIG. 37, as the process in step S610.

If the second power transmission efficiency is determined not to be less than the lower limit of the standard efficiency range in step S608, or if the process of step S610 is performed, the power transmission device 100 calculates the first power transmission efficiency (the power transmission efficiency in a power transmission period in which power has been transmitted), and determines whether or not the first power transmission efficiency is less than the lower limit of the standard efficiency range (S612).

If the first power transmission efficiency is determined to be less than the lower limit of the standard efficiency range in step S612, the power transmission device 100 ends the power transmission without transmitting the power in a subsequent session (S616). The power transmission is automatically stopped if the power transmitted by the power transmission device 100 is not received normally in the power reception device 200 when the process of step S616 is performed and the transmitted power is received by a non-target device of the power transmission. Therefore, the power transmission device 100 can prevent the power from being received by the non-target device of the power transmission by stopping the power transmission if the first power transmission efficiency is less than the predetermined value.

If the first power transmission efficiency is determined not to be less than the lower limit of the standard efficiency range in step S612, the power transmission device 100 determines whether or not to end the power transmission (S614). Here, for example, when a power transmission stop request for requesting the stop of transmission of power, transmitted from the power reception device 200, is received, or when the power transmission stop request is transferred on the basis of the user's operation from an operating section (to be described later) included in the power transmission device 100, the power transmission device 100 determines to end the power transmission. For example, if a total amount of power transmission exceeds a predetermined value (for example, a value set by the user before power transmission), the power transmission device 100 may determine to end the power transmission.

If the power transmission is determined not to be ended in step S614, the power transmission device 100 iterates the process from step S600.

If the power transmission is determined to be ended in step S614, the power transmission device 100 ends the power transmission (S616).

For example, the process shown in FIG. 33 is performed, so that the power transmission device 100 can transmit power by randomly setting a parameter of power to be transmitted for every session. Needless to say, the process (power transmission process) of (3) in the power transmission device 100 according to this embodiment is not limited to the process shown in FIG. 33.

In the power transmission system 1000, for example, the process (communication channel establishment process) of (1) to the process (power transmission process) of (3) are performed, so that power is transmitted between the power transmission device 100 and the power reception device 200. Here, in the power transmission system 1000, the transmission/reception of the parameter information in which a parameter of power is set is performed between the power transmission device 100 and the power reception device 200 by the encrypted first communication channel formed by the above-described process (communication channel establishment process) of (1). The power transmission device 100 transmits the power by use of a parameter indicated by the transmitted parameter information, and the power reception device 200 receives the power by use of the parameter indicated by the received parameter information. Here, the power transmission device 100 acquires power capability information from the power reception device 200 before the power transmission is performed, and sets parameter candidates of the power that does not exceed a power reception capability indicated by the acquired power capability information. In the above-described process (power-parameter candidate determination process) of (2), the power transmission device 100 sets a parameter at which a power transmission efficiency equal to or greater than a certain fixed level can be acquired in an actual environment where the power is transmitted from among parameters of the power that does not exceed the power reception capability indicated by the power capability information acquired from the power reception device 200, as a parameter candidate of power. The power transmission device 100 transmits the power by use of any one parameter among the set parameter candidates of the power. Therefore, the process (communication channel establishment process) of (1) to the process (power transmission process) of (3) are performed, so that the power transmission device 100 can transmit the power to the power reception device 200 by use of a parameter corresponding to an environment where the power is transmitted, and the power transmission system capable of reducing a power transmission loss is implemented.

(Power Transmission System According to One Embodiment)

Figure 38:
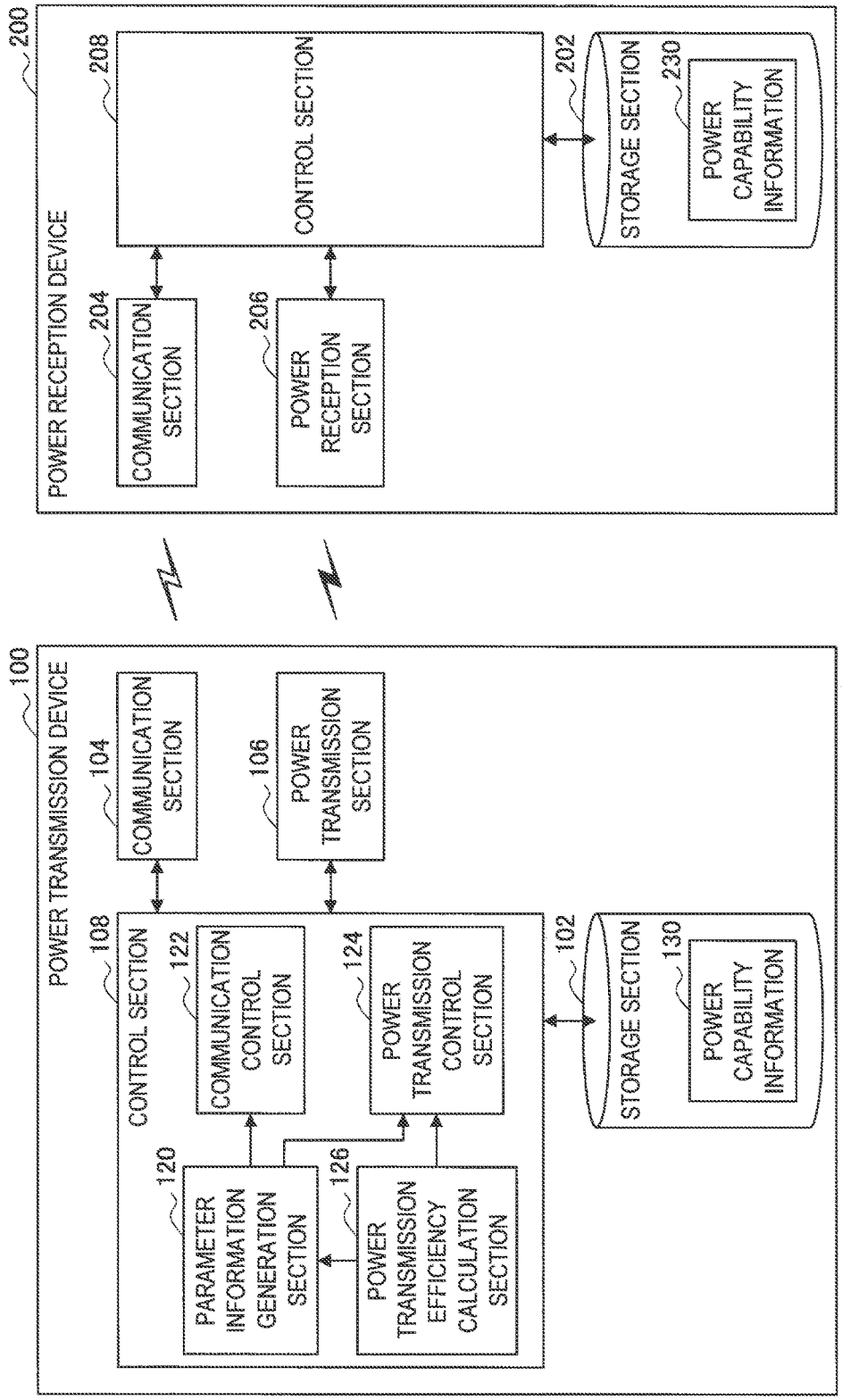
FIG. 38 is a block diagram showing an example of configurations of the power transmission device and the power reception device constituting the power transmission system according to an embodiment.

Next, a configuration example of the power transmission device 100 and the power reception device 200 constituting the power transmission system 1000 capable of implementing the process related to the power transmission approach according to this embodiment described above will be described. FIG. 38 is a block diagram showing an example of each configuration of the power transmission device 100 and the power reception device 200 constituting the power transmission system 1000 according to this embodiment.

[Power Transmission Device 100]

The power transmission device 100 includes a storage section 102, a communication section (first communication section) 104, a power transmission section 106, and a control section 108.

The power transmission device 100 may include, for example, a read only memory (ROM) (not shown) or a random access memory (RAM) (not shown), an operating section (not shown) capable of being operated by the user, a display section (not shown) that displays various screens on a display screen, and the like. The power transmission device 100 establishes a connection between the above-described components by a bus, for example, as a transmission path for data.

The ROM (not shown) stores programs to be used by the control section 108 and control data such as arithmetic parameters. The RAM (not shown) temporarily stores programs and the like to be executed by the control section 108.

An example of the operating section (not shown) may be a button, a direction key, or a combination thereof. An example of the display section (not shown) may be a liquid crystal display (LCD), an organic electroluminescence (EL) display (which is also called an organic light emitting diode (OLED) display), or the like. The power transmission device 100 may be connected to an operation input device (for example, a keyboard, a mouse, or the like) or a display device as an external device of the power transmission device 100.

[Hardware Configuration Example of Power Transmission Device 100]

FIG. 39 is an explanatory diagram showing the hardware configuration example of the power transmission device 100 according to this embodiment. Referring to FIG. 39, the power transmission device 100 includes, for example, an antenna circuit 150, a carrier transmission circuit 152, a micro processing unit (MPU) 154, a ROM 156, a RAM 158, a recording medium 160, an input/output interface 162, an operation input device 164, a display device 166, and a communication interface 168. The power transmission device 100 establishes a connection between the above-described components by a bus 170, for example, as a transmission path for data.

The antenna circuit 150 and the carrier transmission circuit 152 function as the power transmission section 106 of the power transmission device 100. Consequently, the antenna circuit 150 and the carrier transmission circuit 152 can be configured, for example, to have configurations corresponding to FIGS. 5 to 9, so as to implement the above-described first to fourth power transmission types. For example, the antenna circuit 150 related to the first transmission type includes a resonant circuit including a coil having a predetermined inductance and a capacitor having a predetermined capacitance as a transmitting/receiving antenna. The carrier transmission circuit 152 related to the first transmission type is configured, for example, to include an AC power supply, an amplification circuit that amplifies an output of the AC power supply, and the like.

The MPU 154 is a processing means and is constituted, for example, by an MPU, a power measurement circuit, an integrated circuit into which a plurality of circuits are integrated to implement a control function, or the like, and functions as the control section 108 that controls the entire power transmission device 100. In the power transmission device 100, the MPU 154 can function as a parameter information generation section 120, a communication control section 122, a power transmission control section 124, and a power transmission efficiency calculation section 126.

The ROM 156 stores programs to be used by the MPU 154 and control data such as arithmetic parameters, and the RAM 158 temporarily stores programs and the like to be executed by the MPU 154.

The recording medium 160 is a storage means included in the power transmission device 100, and functions as the storage section 102. The recording medium 160 stores, for example, power capability information, a blacklist, a conversion table, an application, and the like. Examples of the storage section 160 may be a magnetic recording medium such as a hard disk, a nonvolatile memory such as an electrically erasable programmable read-only memory (EEPROM), flash memory, magnetoresistive random access memory (MRAM), ferroelectric random access memory (FeRAM), or phase-change random access memory (PRAM), and the like.

The input/output interface 162 is connected to, for example, the operation input device 164 or the display device 166. The operation input device 164 functions as an operating section (not shown), and the display device 166 functions as a display section (not shown). Here, examples of the input/output interface 162 may be a universal serial bus (USB) terminal, a digital visual interface (DVI) terminal, a high-definition multimedia interface (HDMI) terminal, various processing circuits, and the like. The operation input device 164 is provided, for example, on the power transmission device 100, and is connected to the input/output interface 162 inside the power transmission device 100. An example of the operation input device 164 may be a button, a direction key, a rotary selector such as a jog dial, or a combination thereof. The display device 166 is provided, for example, on the power transmission device 100, and is connected to the input/output interface 162 inside the power transmission device 100. An example of the display device 166 may be an LCD or an organic EL display. Needless to say, the input/output interface 162 can be connected to an operation input device (for example, a keyboard, a mouse, or the like) or a display device (for example, an external display or the like) as an external device of the power transmission device 100. Needless to say, the display device 166 may be a device on which a displaying operation and the user's operation are possible such as a touch screen.

The communication interface 168 is a communication means included in the power transmission device 100, and functions as the communication section 104 for performing wireless/wired communication with an external device such as the power reception device 200. Here, examples of the communication interface 168 may be a communication antenna and a radio frequency (RF) circuit, an IEEE 802.15.1 port and a transmission/reception circuit, an IEEE 802.11b port and a transmission/reception circuit, a LAN terminal and a transmission/reception circuit (wired communication), and the like.

The power transmission device 100 performs the process related to the power transmission approach according to this embodiment described above, for example, by the hardware configuration as shown in FIG. 39. The hardware configuration of the power transmission device 100 according to this embodiment is not limited to the configuration shown in FIG. 39. For example, the power transmission device 100 may include a plurality of antenna circuits 150 and a plurality of carrier transmission circuits 152 related to different transmission types. The power transmission device 100 may include, for example, a digital signal processor (DSP) and an audio output display including an amplifier or a speaker. In the above-described case, the power transmission device 100 can audibly report an error, for example, by outputting an error sound from the above-described audio output device in step S304 of FIG. 12. The power transmission device 100 may not include, for example, the operating device 164 or the display device 166 shown in FIG. 39.

The configuration of the power transmission device 100 will be described with reference back to FIG. 38. The storage section 102 is a storage means included in the power transmission device 100. Here, examples of the storage section 102 may be a magnetic recording medium such as a hard disk, and a nonvolatile memory such as a flash memory.

The storage section 102 stores, for example, power capability information, a blacklist, a conversion table, an application, and the like. Here, an example in which power capability information 130 is stored in the storage section 102 is shown in FIG. 38.

The communication section 104 is a communication means included in the power transmission device 100, and functions to perform wireless/wired communication with an external device such as the power reception device 200. Here, examples of the communication interface 168 may be a communication antenna and an RF circuit, an IEEE 802.15.1 port and a transmission/reception circuit, a LAN terminal and a transmission/reception circuit, and the like, but the configuration of the communication section 104 is not limited to the above. The communication of the communication section 104 is controlled, for example, by the control section 108 (more precisely, the communication control section 122 to be described later).

The power transmission section 106 is a power transmission means included in the power transmission device 100, and functions to wirelessly transmit power to the power reception device 200. Here, the power transmission section 106 transmits the power to the power reception device 200 by use of electromagnetic induction (the first transmission type), electric waves (the second transmission type), or electric- or magnetic-field resonance (the third or fourth transmission type). The power transmission of the power transmission section 106 is controlled, for example, by the control section 108 (more precisely, the power transmission control section 124 to be described later).

The control section 108 is constituted, for example, by an MPU or the like, and functions to control the entire power transmission device 100. The control section 108 includes a parameter information generation section 120, a communication control section 122, the power transmission control section 124, and a power transmission efficiency calculation section 126, and functions to initiatively perform a process related to the power transmission approach according to this embodiment.

The parameter information generation section 120 functions to initiatively perform parts of the above-described process (power-parameter candidate determination process) of (2) and the above-described process (power transmission process) of (3). More specifically, for example, the parameter information generation section 120 generates parameter information including any one parameter among set power parameter candidates for every session (power transmission period).

Here, the parameter information generation section 120 sets the standard efficiency range, for example, on the basis of the third power transmission efficiency (power transmission efficiency in each power parameter corresponding to experimentally transmitted power) calculated by the power transmission efficiency calculation section 126, in the above-described process (power-parameter candidate determination process) of (2), and sets a parameter of power corresponding to the third power transmission efficiency to an exclusion parameter if the third power transmission efficiency is outside the standard range. If the second power transmission efficiency (power transmission efficiency for every session) calculated by the power transmission efficiency calculation section 126 is less than a predetermined value (for example, the lower limit of the standard efficiency range) in the above-described process (power transmission process) of (3), the parameter information generation section 120 sets a non-use parameter candidate or a non-use parameter on the basis of a parameter of power indicated by the parameter information corresponding to a session of the second power transmission efficiency. In the above-described process (power transmission process) of (3), the parameter information generation section 120 generates parameter information excluding an exclusion parameter or a non-use parameter. The parameter information generation section 120 may periodically or aperiodically release the setting of the non-use parameter or the non-use candidate parameter.

For example, if the communication section 104 has received the power transmission start request transmitted from the power reception device 200, the parameter information generation section 120 generates the parameter information.

The communication control section 122 controls communication of the communication section 104, and functions to initiatively perform part of the above-described process (communication channel establishment process) of (1) and the above-described process (power transmission process) of (3). More specifically, in the above-described process (communication channel establishment process) of (1), the communication control section 122 causes the communication section 104 to transmit the power capability information transmission request before the power transmission of the power transmission section 106 is started, for example, after the encrypted first communication channel is formed, and causes the power reception device 200 to transmit the power capability information. The communication control section 122 transfers the power capability information received by the communication section 104 to the parameter information generation section 120. The power capability information is transferred, so that the parameter information generation section 120 can generate the parameter information including a parameter of power that does not exceed the power reception capability of the power reception device 200 indicated by the power capability information.

In the above-described process (power transmission process) of (3), for example, the communication control section 122 causes information indicating a power transmission unit price calculated by the power transmission control section 124 to be transmitted to the power reception device 200. Upon receipt of the power transmission start request transmitted from the power reception device 200 according to the information indicating the above-described power transmission unit price, the communication section 104 transfers a power transmission start request to the parameter information generation section 120.

In the above-described process (power transmission process) of (3), the communication control section 122 sequentially transmits, for example, the parameter information generated by the parameter information generation section 120, to the communication section 104 for every session.

The power transmission control section 124 controls a power transmission of the power transmission section 106, and functions to initiatively perform part of the above-described process (power-parameter candidate determination process) of (2) and the above-described process (power transmission process) of (3). More specifically, in the above-described process (power-parameter candidate determination process) (2), the power transmission control section 124 transmits power to the power transmission section 106 on the basis of a parameter of power that does not exceed the power reception capability of the power reception device 200 indicated by the power capability information. The power transmission control section 124 calculates a power transmission unit price corresponding to the standard efficiency range set by the parameter information generation section 120, and transfers the calculated power transmission unit price to the communication control section 122.

In the above-described process (power transmission process) of (3), for example, the power transmission control section 124 causes the power transmission section 106 to transmit the power on the basis of a parameter of power indicated by the parameter information. For example, if the first power transmission efficiency calculated by the power transmission efficiency calculation section 126 is less than a predetermined value (for example, the lower limit of the standard efficiency range), the power transmission control section 124 causes the power transmission section 106 not to transmit the power. In the above-described case, the power transmission from the power transmission device 100 to the power reception device 200 is automatically stopped.

The power transmission efficiency calculation section 126 functions to initiatively perform part of the above-described process (power-parameter candidate determination process) of (2) and the above-described process (power transmission process) of (3). More specifically, the power transmission efficiency calculation section 126 functions to calculate the first power transmission efficiency, the second power transmission efficiency, and the third power transmission efficiency.

The control section 108 can initiatively perform the process (the process of (1) to the process of (3)) related to the power transmission approach related to the embodiment described above, for example, by including the parameter information generation section 120, the communication control section 122, the power transmission control section 124, and the power transmission efficiency calculation section 126. The configuration of the control section 108 according to this embodiment is not limited to the above. For example, the control section 108 of the power transmission device 100 according to this embodiment may include a part having a plurality of functions among the parameter information generation section 120, the communication control section 122, the power transmission control section 124, and the power transmission efficiency calculation section 126. In the control section 108, each of the parameter information generation section 120, the communication control section 122, the power transmission control section 124, and the power transmission efficiency calculation section 126 may have a configuration sub-divided into a plurality of parts for each function.

The power transmission device 100 can perform the process (communication channel establishment process) of (1) to the process (power transmission process) of (3) related to the power transmission approach related to the embodiment described above, for example, by the configuration shown in FIG. 38. Therefore, the power transmission device 100 can reduce power transmission loss, for example, by the configuration shown in FIG. 38.

The configuration of the power transmission device 100 according to this embodiment is not limited to the configuration shown in FIG. 38. For example, the power transmission device 100 may have a second communication section (not shown) capable of communicating with an external device such as the power reception device 200 by the second communication channel. Here, examples of the second communication section (not shown) may be a resonant circuit including a coil having a predetermined inductance and a capacitor having a predetermined capacitance as a transmission/reception antenna, an AC power supply, an amplification circuit that amplifies an output of the AC power supply, and the like (an example of a configuration for performing a communication by a communication channel formed by NFC). The configuration of the second communication section (not shown) is not limited to the above, and the second communication section (not shown) may be constituted, for example, by an infrared port and a transmission/reception circuit (an example of a configuration for performing a communication by a communication channel formed by an infrared communication).

In the above-described case, the communication control section 122 of the power transmission device 100 can improve the convenience of the user in the above-described process (communication channel establishment process) of (1) by causing connection information to be transmitted to the power reception device 200 via the second communication channel. In the above-described case, the communication control section 122 of the power transmission device 100 transmits the power capability information transmission request to the second communication section, and transfers the power capability information received by the second communication section (not shown) to the parameter information generation section 120. The power capability information is transferred, so that the parameter information generation section 120 can generate parameter information including a parameter of power that does not exceed the power reception capability of the power reception device 200 indicated by the power capability information.

If the second communication channel is formed by NFC, the second communication section (not shown) can function as the power transmission section 106.

[Power Reception Device 200]

Next, an example of a configuration of the power reception device 200 according to this embodiment will be described. The power reception device 200 includes a storage section 202, a communication section 204, a power reception section 206, and a control section 208.

The power reception device 200 may include, for example, a ROM (not shown) storing programs to be used by the control section 208 and control data such as arithmetic parameters or a RAM (not shown) temporarily storing programs and the like to be executed by the control section 208, an operating section (not shown) capable of being operated by the user of the power reception device 200, a display section (not shown) that displays various screens on a display screen, and the like. The power reception device 200 establishes a connection between the above-described components by a bus, for example, as a transmission path for data.

Here, an example of the operating section (not shown) may be an operation input device such as a keyboard or a mouse, a button, a direction key, or a combination thereof. An example of the display section (not shown) may be an LCD, an EL display, or the like. The power reception device 200 may be connected to an operation input device (for example, a keyboard, a mouse, or the like) or a display device as an external device of the power reception device 200.

[Hardware Configuration Example of Power Reception Device 200]

FIG. 40 is an explanatory diagram showing the hardware configuration example of the power reception device 200. Referring to FIG. 40, the power reception device 200 includes, for example, an antenna circuit 250, an MPU 252, a ROM 254, a RAM 256, a recording medium 258, an input/output interface 260, an operation input device 262, a display device 264, a communication interface 266, and an internal power supply 268. The power reception device 200 establishes a connection between the above-described components by a bus 270, for example, as a transmission path for data.

The antenna circuit 250 functions as the power reception section 206 in the power reception device 200. The antenna circuit 250 is configured, for example, in correspondence with FIGS. 5 to 9, so as to implement the above-described first to fourth power transmission types. The power reception device 200 may include a plurality of antenna circuits 250 related to different transmission types.

The MPU 252 is a processing means and is constituted, for example, by an MPU, a power measurement circuit, an integrated circuit into which a plurality of circuits are integrated to implement a control function, or the like, and functions as the control section 208 that controls the entire power reception device 200. The ROM 254 stores programs to be used by the MPU 252 and control data such as arithmetic parameters, and the RAM 256 temporarily stores programs and the like to be executed by the MPU 252.

The recording medium 258 is a storage means included in the power reception device 200, and stores power capability information, an application, and the like. Here, examples of the recording medium 258 may be a magnetic recording medium such as a hard disk, a nonvolatile memory such as EEPROM, flash memory, MRAM, FeRAM, and PRAM, and the like.

The input/output interface 260 is connected to, for example, the operation input device 262 or the display device 264. The operation input device 262 functions as an operating section (not shown), and the display device 264 functions as a display section (not shown). Here, examples of the input/output interface 260 may be a USB terminal, a DVI terminal, an HDMI terminal, various processing circuits, and the like. The operation input device 262 is provided, for example, on the power reception device 200, and is connected to the input/output interface 260 inside the power reception device 200. An example of the operation input device 262 may be a button, a direction key, a rotary selector such as a jog dial, or a combination thereof. The display device 264 is provided, for example, on the power reception device 200, and is connected to the input/output interface 260 inside the power reception device 200. An example of the display device 264 may be an LCD or an organic EL display. Needless to say, the input/output interface 260 can be connected to an operation input device (for example, a keyboard, a mouse, or the like) or a display device (for example, an external display or the like) as an external device of the power reception device 200. Needless to say, the display device 264 may be a device on which a displaying operation and the user's operation are possible such as a touch screen.

The communication interface 266 is a communication means included in the power reception device 200, and functions as the communication section 204 for performing wireless/wired communication with an external device such as the power transmission device 100. Here, examples of the communication interface 266 may be a communication antenna and an RF circuit (wireless communication), an IEEE 802.15.1 port and a transmission/reception circuit (wireless communication), an IEEE 802.11b port and a transmission/reception circuit (wireless communication), a LAN terminal and a transmission/reception circuit (wired communication), and the like.

The internal power supply 268 is a power supply that can charge the received power and supply a driving voltage to drive each part of the power reception device 200 and is included in the power reception device 200. Here, an example of the internal power supply 268 may be a secondary battery such as a lithium-ion rechargeable battery.

The power reception device 200 can receive power transmitted from the power transmission device 100 by the hardware configuration as shown in FIG. 40. Therefore, the power reception device 200 can configure the power transmission system 1000 capable of wirelessly transmitting power to the power reception device 200 while preventing devices other than the power reception device 200 from performing unauthorized power reception by the hardware configuration as shown in FIG. 40.

The configuration of the power reception device 200 according to this embodiment is not limited to the configuration shown in FIG. 40. For example, the power reception device 200 may further include the carrier transmission circuit 152 shown in FIG. 39. In the above-described case, the power reception device 200 has a function as the power transmission device. The power reception device 200 may include, for example, a DSP and an audio output display including an amplifier or a speaker. In the above-described case, the power reception device 200 can audibly report an error, for example, by outputting an error sound from the above-described audio output device in step S304 of FIG. 12. For example, the power reception device 200 may not include the operating device 262 or the display device 264 shown in FIG. 40.

The configuration of the power reception device 200 will be described with reference back to FIG. 38. The storage section 202 is a storage means included in the power reception device 200. Here, examples of the storage section 202 may be a magnetic recording medium such as a hard disk, and a nonvolatile memory such as a flash memory. The storage section 202 stores, for example, power capability information, an application, or the like. Here, an example in which power capability information 230 is stored in the storage section 202 is shown in FIG. 38.

The communication section 204 is a communication means included in the power reception device 200, and functions to perform a wireless/wired communication with an external device such as the power transmission device 100. Here, the communication section 204, for example, which corresponds to the communication section 104 of the power transmission device 100 can be configured.

The power reception section 206 is a power reception means included in the power reception device 200, and functions to wirelessly receive power transmitted from the power transmission device 100. Here, the power reception section 206 receives the power by use of electromagnetic induction (the first transmission type), electric waves (the second transmission type), or electric- or magnetic-field resonance (the third or fourth transmission type).

The control section 208 is constituted, for example, by an MPU, a power measurement circuit, an integrated circuit into which a plurality of circuits are integrated to implement a control function, or the like, and functions to control the entire power reception device 200 or functions to perform various processing operations related to the power transmission approach according to this embodiment described above in the power reception device 200. An example of the process related to the power transmission approach according to this embodiment in the power reception device 200 may be a process related to the process (communication channel establishment process) of (1) shown in FIG. 3 or 10, the process (power transmission process) of (3) shown in FIG. 21, or the like.

The power reception device 200 can receive power transmitted from the power transmission device 100 in a parameter of power based on parameter information, charge the received power to the internal power supply 268, or perform various processing operations using the received power, for example, by the configuration shown in FIG. 38. Consequently, the power reception device 200 can implement the power transmission system 1000 capable of wirelessly transmitting power to the power reception device 200 while preventing devices other than the power reception device 200 from performing unauthorized power reception, for example, by the configuration as shown in FIG. 38.

As described above, the power transmission system 1000 according to this embodiment has the power transmission device 100 and the power reception device 200, and, for example, the process (communication channel establishment process) of (1) to the process (power transmission process) of (3) are performed, so that power is transmitted between the power transmission device 100 and the power reception device 200. In the power transmission system 1000, the transmission/reception of the parameter information in which a parameter of power is set is performed between the power transmission device 100 and the power reception device 200 by the encrypted first communication channel formed by the above-described process (communication channel establishment process) of (1). The power transmission device 100 transmits power using a parameter indicated by the transmitted parameter information. Here, the power transmission device 100 acquires power capability information from the power reception device 200 before the power transmission is performed, and sets parameter candidates of the power that does not exceed a power reception capability indicated by the acquired power capability information. In the above-described process (power-parameter candidate determination process) of (2), the power transmission device 100 sets a parameter, at which a power transmission efficiency equal to or greater than a certain fixed level can be acquired in an actual environment where the power is transmitted from among parameters of power that does not exceed the power reception capability indicated by the power capability information acquired from the power reception device 200, as a parameter candidate of power. The power transmission device 100 transmits the power by use of any one parameter among the set parameter candidates of the power. Consequently, the process (communication channel establishment process) of (1) to the process (power transmission process) of (3) are performed, so that the power transmission device 100 can transmit the power to the power reception device 200 using a parameter corresponding to an environment where the power is transmitted.

Because the power reception device 200 receives the parameter information via the first communication channel, the power reception device 200 can efficiently receive the transmitted power on the basis of the parameter indicated by the parameter information even when the power transmission device 100 transmits power using any one parameter among the parameter candidates of the power in a certain power transmission period. Consequently, it is possible to further increase the power transmission efficiency in the power transmission system 1000.

Therefore, the process (communication channel establishment process) of (1) to the process (power transmission process) of (3) are performed, so that the power transmission system capable of reducing the power transmission loss is implemented.

If the calculated first power transmission efficiency (the power transmission efficiency in the power transmission period in which the power has been transmitted) is less than the predetermined value (for example, the lower limit of the set standard efficiency range), the power transmission device 100 stops the power transmission. That is, the power transmission device 100 can automatically stop the power transmission if the transmitted power is received by a non-target device of the power transmission and the power transmitted by the power transmission device 100 is not received normally in the power reception device 200. Therefore, the power transmission device 100 stops the power transmission if the calculated first power transmission efficiency is less than the predetermined value, thereby preventing the power from being continuously transmitted in a state in which the power transmission loss is greater than a predetermined value. The power transmission device 100 can prevent the power from being received by the non-target device of the power transmission by stopping the power transmission if the calculated first power transmission efficiency is less than the predetermined value.

The power transmission device 100 generates parameter information excluding an exclusion parameter or a non-use parameter for every power transmission period, and transmits power on the basis of a parameter indicated by the parameter information in each power transmission period. Therefore, because it is possible to transmit power on the basis of a parameter in which the power transmission efficiency is better, the power transmission device 100 can prevent the power transmission efficiency from being degraded in the power transmission for the power reception device 200 (that is, can reduce the power transmission loss).

Further, the power transmission device 100 displays, for example, a display screen on which a power transmission condition as shown in FIG. 18 or 19 is presented, and performs the process (power transmission process) of (3) by determining that the presented power transmission condition has been approved when a power transmission start request transmitted from the power reception device 200 has been received. Consequently, in the power transmission system 1000, it is possible to cause the power transmission device 100 to start the transmission of power after the user of the power reception device 200 has pre-approved the presented power transmission condition.

Although the power transmission device 100 has been described above as a component constituting the power transmission system 1000 according to this embodiment, this embodiment is not limited to the above-described type. This embodiment can be applied to various equipments capable of transmitting power, for example, such as a vehicle as shown in FIG. 1, a table as shown in FIG. 2, a computer such as a personal computer (PC) or server, a device having a reader/writer or a reader/writer function, a mobile communication device such as a mobile phone or a personal handy-phone system (PHS), a video/music player device (or video/music recorder/player device), a game machine, and the like.

Although the power reception device 200 has been described above as a component constituting the power transmission system according to this embodiment, this embodiment is not limited to the above-described type. This embodiment can be applied to various equipments capable of receiving power, for example, such as a computer such as a PC or server, a mobile communication device such as a mobile phone, a video/music player device (or video/music recorder/player device), a game machine, a vehicle such as an electric vehicle (EV), and the like.

The power transmission system 1000 according to this embodiment can be applied to various use cases in which power is transmitted, for example, as shown in FIG. 1 or 2.

(Program According to One Embodiment)
[Program Related to Power Transmission Device]

It is possible to transmit power to the power reception device 200 by use of a parameter corresponding to an environment where the power is transmitted by a program for causing a computer to function as the power transmission device according to this embodiment (for example, a program for implementing the above-described process (communication channel establishment process) of (1) to the above-described process (power transmission process) of (3)). It is possible to implement the power transmission system capable of reducing a power transmission loss by a program for causing the computer to function as the power transmission device according to this embodiment.

[Program Related to Power Reception Device]

It is possible to implement the power transmission system capable of reducing a power transmission loss by a program for causing a computer to function as the power reception device (for example, a program for implementing a process related to the power transmission approach related to this embodiment in the power reception device 200).

It should be understood by those skilled in the art that various modifications, combinations, sub-combinations and alterations may occur depending on design requirements and other factors insofar as they are within the scope of the appended claims or the equivalents thereof.

For example, the power transmission device according to this embodiment can separately include the parameter information generation section 120, the communication control section 122, the power transmission control section 124, and the power transmission efficiency calculation section 126 shown in FIG. 38 (for example, which can be respectively implemented by separate processing circuits).

For example, although the program (computer program) for causing the computer to function as the power transmission device provided according to this embodiment and the program (computer program) for causing the computer to function as the power reception device provided according to this embodiment have been shown above in transitory embodiments, non-transitory storage media respectively storing the programs may be further provided in this embodiment. Thus, in a transitory embodiment, the program is embodied in software or a propagating signal or wave. In a non-transitory embodiment, the program is stored in a memory, such as a RAM.

The above-described configuration shows an example of this embodiment, and, of course, is included in a technical scope of the present disclosure. It should be noted that the present disclosure can also take the following configurations.

(1). A power transmission device comprising:
a first communication section for communicating with a power reception device by an encrypted first communication channel;
a power transmission section for wirelessly transmitting power to the power reception device;
a parameter information generation section for generating parameter information indicating a parameter of the power to be transmitted in a power transmission period for every power transmission period;
a communication control section for causing the first communication section to sequentially transmit the parameter information generated for every power transmission period; and
a power transmission control section for causing the power transmission section to transmit the power on the basis of the parameter of the power indicated by the parameter information sequentially transmitted to the power reception device,
wherein the communication control section causes the first communication section to transmit a power capability information transmission request for causing the power reception device to transmit power capability information indicating capability regarding transmission/reception of the power before the power transmission section starts the transmission of the power, and
wherein the parameter information generation section generates the parameter information on the basis of parameter candidates of the power, corresponding to an environment where the power is transmitted, set on the basis of the power capability information transmitted from the power reception device.

(2). The power transmission device according to (1), further comprising:
a power transmission efficiency calculation section for calculating first power transmission efficiency indicating power transmission efficiency in the power transmission period in which the power has been transmitted on the basis of first power reception amount information, indicating a power reception amount for every parameter of the power indicated by the parameter information in the power reception device, received by the first communication section,
wherein the power transmission control section causes the power transmission section not to transmit the power if the calculated first power transmission efficiency is less than a predetermined value.

(3). The power transmission device according to (2),
wherein the power transmission efficiency calculation section calculates second power transmission efficiency indicating power transmission efficiency in each power transmission period, and
wherein the parameter information generation section
sets a non-use parameter unused in the transmission of the power on the basis of the parameter of the power indicated by the parameter information corresponding to one power transmission period if the second power transmission efficiency calculated for the one power transmission period is less than a predetermined value, and
generates parameter information excluding the set non-use parameter.

(4). The power transmission device according to (3),
wherein the parameter information generation section
sets the parameter of the power, indicated by the parameter information corresponding to the one power transmission period, to a non-use candidate parameter serving as a candidate of the non-use parameter, if the second power transmission efficiency calculated for the one power transmission period is less than a predetermined value, and
sets the parameter of the power, set to the non-use candidate parameter a predetermined number of times in a fixed period, to the non-use parameter.

(5). The power transmission device according to (4), wherein the parameter information generation section periodically or aperiodically releases the setting of the non-use parameter or the non-use candidate parameter.

(6). The power transmission device according to (1),
wherein the power transmission control section causes the power transmission section to transmit the power on the basis of the parameter of the power that does not exceed power reception capability indicated by the power capability information,
wherein the power transmission efficiency calculation section calculates third power transmission efficiencies, which are power transmission efficiencies of parameters of the power, on the basis of second power reception amount information, indicating a power reception amount for every parameter of the power corresponding to the transmitted power in the power reception device, received by the first communication section, and
wherein the parameter information generation section
sets a standard range of the power transmission efficiency on the basis of the calculated third power transmission efficiencies,
sets a parameter of the power corresponding to the third power transmission efficiency outside the standard range to an exclusion parameter unsuitable for the transmission of the power if there is the third power transmission efficiency outside the standard range among the calculated third power transmission efficiencies, and
generates parameter information excluding the set exclusion parameter.

(7). The power transmission device according to (6),
wherein the power transmission control section calculates a power transmission unit price corresponding to the set standard range of the power transmission efficiency,
wherein the communication control section causes information indicating the calculated power transmission unit price to be transmitted to the power reception device, and
wherein the parameter information generation section generates the parameter information if the first communication section has received a power transmission start request for requesting a start of the transmission of the power transmitted from the power reception device according to the information indicating the power transmission unit price.

(8). The power transmission device according to (1), further comprising:
a second communication section for communicating with the power reception device in a non-contact type by a second communication channel different from the first communication channel using a carrier of a predetermined frequency,
wherein the communication control section causes connection information for forming the encrypted first communication channel with the power reception device to be transmitted to the power reception device via the second communication channel.

(9). The power transmission device according to (8),
wherein the communication control section causes the second communication section to transmit the power capability information transmission request for causing the power reception device to transmit the power capability information indicating the capability regarding the transmission/reception of the power, and
wherein the parameter information generation section generates the parameter information including a parameter of the power that does not exceed power reception capability indicated by the power capability information on the basis of the power capability information transmitted from the power reception device according to the power capability information transmission request, received by the second communication section.

(10). The power transmission device according to (1), wherein the parameter information generation section generates the parameter information including a parameter of the power that does not exceed power reception capability indicated by the power capability information.

(11). A power transmission method comprising:
transmitting a power capability information transmission request for causing a power reception device to transmit power capability information indicating capability regarding transmission/reception of the power before transmission of power is started;
generating the parameter information, including a parameter of the power for every power transmission period on the basis of parameter candidates of the power, corresponding to an environment where the power is transmitted, set on the basis of the power capability information transmitted from the power reception device;
sequentially transmitting the parameter information generated for every power transmission period to the power reception device via an encrypted communication channel; and
wirelessly transmitting the power to the power reception device on the basis of the parameter of the power indicated by the parameter information sequentially transmitted to the power reception device.

(12). A program for causing a computer to execute:
transmitting a power capability information transmission request for causing a power reception device to transmit power capability information indicating capability regarding transmission/reception of the power before transmission of power is started;
generating the parameter information, including a parameter of the power for every power transmission period on the basis of parameter candidates of the power, corresponding to an environment where the power is transmitted, set on the basis of the power capability information transmitted from the power reception device;

sequentially transmitting the parameter information generated for every power transmission period to the power reception device via an encrypted communication channel; and wirelessly transmitting the power to the power reception device on the basis of the parameter of the power indicated by the parameter information sequentially transmitted to the power reception device.

(13). A power transmission system comprising:
a power transmission device for transmitting power; and
a power reception device for communicating with the power transmission device and receiving the power transmitted from the power transmission device,
wherein the power transmission device includes
a communication section for communicating with the power reception device via an encrypted communication channel;
a power transmission section for wirelessly transmitting the power to the power reception device;
a parameter information generation section for generating parameter information indicating a parameter of the power to be transmitted in a power transmission period for every power transmission period;
a communication control section for causing the communication section to sequentially transmit the parameter information generated for every power transmission period; and
a power transmission control section for causing the power transmission section to transmit the power on the basis of the parameter of the power indicated by the parameter information sequentially transmitted to the power reception device,
wherein the communication control section causes the communication section to transmit a power capability information transmission request for causing the power reception device to transmit power capability information indicating capability regarding transmission/reception of the power before the power transmission section starts the transmission of the power, and
wherein the parameter information generation section generates the parameter information on the basis of parameter candidates of the power, corresponding to an environment where the power is transmitted, set on the basis of the power capability information transmitted from the power reception device.

The above-described configuration shows an example of this embodiment, and, of course, is included in a technical scope of the present disclosure.

What is claimed is:

1. A power transmission device, comprising:
a communication unit configured to:
transmit a power capability information transmission request via a communication channel; and
receive power capability information based on the power capability information transmission request, wherein the power capability information indicates a transmission type;
a processing unit configured to:
set a parameter based on the received power capability information; and
calculate a plurality of power transmission efficiencies based on the power capability information; and
a power transmission unit configured to wirelessly transmit power based on a first power transmission efficiency of the plurality of power transmission efficiencies, wherein:
the parameter is within a power reception capability indicated by the power capability information, the communication unit is further configured to:
transmit parameter information,
receive second power reception amount information after the power transmission unit wirelessly transmits the power, and
the processing unit is further configured to:
calculate a plurality of second power transmission efficiencies of a plurality of parameters based on the second power reception amount information,
set a standard range based on the plurality of second power transmission efficiencies, and
exclude one of the plurality of parameters from the parameter information when a second power transmission efficiency, of the plurality of second power transmission efficiencies, of the one of the plurality of parameters is outside the standard range.

2. The power transmission device according to claim 1, wherein the power capability information further indicates a parameter type.

3. The power transmission device according to claim 2, wherein:
the transmission type is defined by at least one of an electromagnetic induction, electric waves, a magnetic-field resonance, or an electric-field resonance, and
the power transmission unit is further configured to wirelessly transmit the power based on at least one of the electromagnetic induction, the electric waves, the magnetic-field resonance, or the electric-field resonance.

4. The power transmission device according to claim 2, wherein:
the parameter type is defined by at least one of a frequency, a voltage, or an azimuth angle, and
the power transmission unit is further configured to wirelessly transmit the power based on at least one of the frequency, the voltage, or the azimuth angle.

5. The power transmission device according to claim 2, further comprising a storage unit configured to store transmission power capability information,
wherein the processing unit is further configured to set the parameter by comparison of the parameter type indicated by the received power capability information and a parameter type indicated by the transmission power capability information to add the parameter type indicated by the received power capability information to a parameter type list.

6. The power transmission device according to claim 2, wherein the processing unit is further configured to:
calculate the plurality of power transmission efficiencies for each parameter of a plurality of parameters of the parameter type; and
set the standard range based on a maximum power transmission efficiency of the plurality of power transmission efficiencies.

7. The power transmission device according to claim 1, wherein the communication channel is encrypted.

8. The power transmission device according to claim 1, wherein:
the communication unit is further configured to receive first power reception amount information for the parameter, after the transmission of the power, and
the processing unit is further configured to:
calculate the first power transmission efficiency based on the first power reception amount information, and
control the power transmission unit to stop the transmission of the power when the first power transmission efficiency is less than a value.

9. The power transmission device according to claim 1, wherein:
the communication unit is further configured to receive first power reception amount information for the parameter after the transmission of the power, and
the processing unit is further configured to:
calculate a third power transmission efficiency based on the first power reception amount information, and
generate parameter information excluding the parameter when the third power transmission efficiency is less than a value.

10. The power transmission device according to claim 9, wherein, when the communication unit receives additional first power reception amount information for the parameter, the processing unit is further configured to calculate an additional third power transmission efficiency based on the additional first power reception amount information, and
wherein, when the additional third power transmission efficiency is less than the value a number of times in a period corresponding to the first power reception amount information and the additional first power reception amount information, the processing unit is further configured to exclude the parameter from the parameter information.

11. The power transmission device according to claim 10, wherein the processing unit is further configured to one of periodically or aperiodically include the parameter in the parameter information after the processing unit has excluded the parameter from the parameter information.

12. The power transmission device according to claim 1, wherein:
the processing unit is further configured to calculate a power transmission unit price corresponding to the standard range,
the communication unit is further configured to transmit information indicating the power transmission unit price, and
the power transmission unit is further configured to wirelessly transmit the power based on the parameter when the communication unit receives a power transmission start request based on the information indicating the power transmission unit price.

13. The power transmission device according to claim 1, wherein, when the second power transmission efficiency of the one of the plurality of parameters is outside the standard range, the power transmission unit is further configured to stop wireless transmission of the power.

14. The power transmission device according to claim 1, wherein the communication unit is further configured to one of transmit or receive connection information for formation of the communication channel via a non-contact communication based on a carrier of a frequency.

15. The power transmission device according to claim 14, wherein the communication unit is further configured to:
transmit the power capability information transmission request via the non-contact communication, and
receive the power capability information via the non-contact communication, and
wherein the parameter is within a power reception capability indicated by the power capability information.

16. The power transmission device according to claim 1, wherein:
the processing unit is further configured to generate parameter information indicating the parameter, based on parameter candidates of the power,
the parameter candidates of the power correspond to an environment where the power is transmitted, and
the parameter candidates of the power is set based on the power capability information.

17. A power transmission method, comprising:
transmitting a power capability information transmission request via a communication channel;
receiving power capability information based on the power capability information transmission request, wherein the power capability information indicates a transmission type;
setting a parameter based on the received power capability information;
calculating a plurality of power transmission efficiencies based on the power capability information; and
wirelessly transmitting power based on a first power transmission efficiency of the plurality of power transmission efficiencies,
wherein the parameter is within a power reception capability indicated by the power capability information;
transmitting parameter information;
receiving second power reception amount information after the wirelessly transmission of the power;
calculating a plurality of second power transmission efficiencies of a plurality of parameters based on the second power reception amount information;
setting a standard range based on the plurality of second power transmission efficiencies; and
excluding one of the plurality of parameters from the parameter information when a second power transmission efficiency, of the plurality of second power transmission efficiencies, of the one of the plurality of parameters is outside the standard range.

18. A non-transitory computer-readable medium having stored thereon, computer-executable instructions that, when executed by a processor, cause a computer to execute operations, the operations comprising:
transmitting a power capability information transmission request via a communication channel;
receiving power capability information based on the power capability information transmission request, wherein the power capability information indicates a transmission type;
setting a parameter based on the received power capability information;
calculating a plurality of power transmission efficiencies based on the power capability information; and
wirelessly transmitting power based on a first power transmission efficiency of the plurality of power transmission efficiencies,
wherein the parameter is within a power reception capability indicated by the power capability information;
transmitting parameter information;
receiving second power reception amount information after the wirelessly transmission of the power;
calculating a plurality of second power transmission efficiencies of a plurality of parameters based on the second power reception amount information;
setting a standard range based on the plurality of second power transmission efficiencies; and
excluding one of the plurality of parameters from the parameter information when a second power transmission efficiency, of the plurality of second power transmission efficiencies, of the one of the plurality of parameters is outside the standard range.

* * * * *